US012267253B2

(12) United States Patent
Lee et al.

(10) Patent No.: US 12,267,253 B2
(45) Date of Patent: *Apr. 1, 2025

(54) DATA PLANE TECHNIQUES FOR SUBSTRATE MANAGED CONTAINERS

(71) Applicant: Oracle International Corporation, Redwood Shores, CA (US)

(72) Inventors: Quintin Lee, Seattle, WA (US); Amr Mohamed AbdelHamid, Snohomish, WA (US); Balbir Singh, Canberra (AU); Olga Kechina, Kirkland, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,907

(22) Filed: May 23, 2024

(65) Prior Publication Data

US 2024/0314088 A1 Sep. 19, 2024

Related U.S. Application Data

(63) Continuation of application No. 18/457,335, filed on Aug. 28, 2023, now Pat. No. 12,034,647.

(Continued)

(51) Int. Cl.
*H04L 47/78* (2022.01)
*G06F 9/455* (2018.01)
(Continued)

(52) U.S. Cl.
CPC ........ *H04L 47/781* (2013.01); *G06F 9/45558* (2013.01); *H04L 41/0806* (2013.01);
(Continued)

(58) Field of Classification Search
None
See application file for complete search history.

(56) References Cited

U.S. PATENT DOCUMENTS

| 8,296,459 | B1 | 10/2012 | Brandwine et al. |
| 11,226,372 | B2 * | 1/2022 | Singer .................. G01R 1/0433 |

(Continued)

FOREIGN PATENT DOCUMENTS

| CN | 112491984 A | 3/2021 |
| CN | 112667362 A | 4/2021 |
| WO | 2021016475 A1 | 1/2021 |

OTHER PUBLICATIONS

"Configuring Each Kubelet in Your Cluster Using Kubeadm", Available Online at: https://kubernetes.io/docs/setup/production-environment/tools/kubeadm/kubelet-integration/, May 2022, 4 pages.

(Continued)

*Primary Examiner* — Quang N Nguyen
(74) *Attorney, Agent, or Firm* — Kilpatrick Townsend & Stockton LLP

(57) ABSTRACT

Techniques discussed herein include providing a cloud computing environment in which applications are deployed by a deployment orchestrator using virtual-machine-based virtualization with a static pool of computing nodes (e.g., substrate nodes, overlay nodes) and container-based virtualization with a dynamic pool of computing nodes (e.g., nodes managed by a container orchestration platform). Components of a data plane may be used to deploy containers to micro-virtual machines. A container runtime interface (CRI) may receive a deployment request from the deployment orchestrator. A container networking interface of the data plane may configure network connections and allocate an IP address for the container. A container runtime of the data pane may generate and configure the container with the IP (Continued)

address and run the container within a micro-virtual machine that is compatible with the container orchestration platform.

20 Claims, 22 Drawing Sheets

Related U.S. Application Data

(60) Provisional application No. 63/381,715, filed on Oct. 31, 2022, provisional application No. 63/402,024, filed on Aug. 29, 2022.

(51) Int. Cl.
*H04L 41/0806* (2022.01)
*H04L 41/0895* (2022.01)
*H04L 47/80* (2022.01)
*H04L 61/5007* (2022.01)

(52) U.S. Cl.
CPC ........ *H04L 41/0895* (2022.05); *H04L 47/803* (2013.01); *H04L 61/5007* (2022.05)

(56) References Cited

U.S. PATENT DOCUMENTS

| | | | |
|---|---|---|---|
| 11,764,978 B2* | 9/2023 | Mallikarjuna Durga Lokanath .... | H04L 9/083 713/158 |
| 12,034,647 B2 | 7/2024 | Lee et al. | |
| 2017/0126469 A1* | 5/2017 | Liang | H04L 41/042 |
| 2019/0087244 A1 | 3/2019 | Turner | |
| 2019/0377604 A1 | 12/2019 | Cybulski | |
| 2020/0076685 A1 | 3/2020 | Vaidya et al. | |
| 2020/0314015 A1 | 10/2020 | Mariappan et al. | |
| 2020/0379812 A1 | 12/2020 | Ranjan et al. | |
| 2021/0271565 A1* | 9/2021 | Bhavanarushi | G06F 9/45558 |
| 2021/0328858 A1 | 10/2021 | Asveren et al. | |
| 2022/0004410 A1 | 1/2022 | Chen | |
| 2022/0210113 A1 | 6/2022 | Pillareddy et al. | |
| 2022/0239503 A1 | 7/2022 | Mallikarjuna Durga Lokanath et al. | |
| 2022/0329651 A1 | 10/2022 | Kim et al. | |
| 2022/0391294 A1 | 12/2022 | Kulkarni et al. | |
| 2023/0070242 A1 | 3/2023 | Smith et al. | |
| 2023/0105744 A1 | 4/2023 | Lin et al. | |
| 2023/0153162 A1 | 5/2023 | Baillargeon | |
| 2023/0231827 A1 | 7/2023 | Tang et al. | |
| 2023/0412526 A1 | 12/2023 | Nallamothu et al. | |
| 2024/0037001 A1 | 2/2024 | Kong et al. | |
| 2024/0078132 A1* | 3/2024 | Christodoulou | G06F 9/547 |
| 2024/0370306 A1* | 11/2024 | Hopper | G06F 9/5094 |

OTHER PUBLICATIONS

U.S. Appl. No. 18/457,332, "Non-Final Office Action", mailed Aug. 5, 2024, 11 pages.
"Cisco Intersight Kubernetes Service", Available Online at: https://www.cisco.com/c/en/us/products/collateral/cloudsystemsmanagement/intersight/intersight-kubernetes-service-ds.pdf, 2022, pp. 1-5.
"Cloud Native Contrail Networking", Juniper Networks, Incorporation, Available Online at: https://www.juniper.net/documentation/us/en/software/cn-cloud-native22.4/cn-cloud-native-feature-guide/cn-cloud-native-feature-guide.pdf, Jan. 10, 2023, 315 pages.
"Data Plane", Available Online at: https://docs.vmware.com/en/VMware-NSX-Data-Center-for-vSphere/6.4/com.vmware.nsx.install.doc/GUID-B715387F-983D-4458-B9FB-AD49FCE03E04.html, May 31, 2019, 2 pages.
"Data Plane on Kubernetes", Available Online at: https://kuma.io/docs/2.0.x/explore/dpp-on-kubernetes/, Jan. 16, 2023, 5 pages.
"GKE Dataplane V2", Available Online at: https://cloud.google.com/kubernetes-engine/docs/concepts/dataplane-v2, Feb. 21, 2023, 6 pages.
"Orchestrating the Containers", Available Online at: https://docs.aws.amazon.com/prescriptive-guidance/latest/container-platform-management/orchestrate-containers.html, 2023, 2 pages.
U.S. Appl. No. 18/457,335, Notice of Allowance, Mailed on Apr. 11, 2024, 16 pages.
Olabemiwo , "Kubernetes Control Plane : Tutorial and Best Practices", Available Online at: https://www.containiq.com/post/kubernetes-control-plane, Jul. 3, 2022, 7 pages.
Orive et al., "Quality of Service Aware Orchestration for Cloud-Edge Continuum Applications", Sensors (Basel, Switzerland), vol. 22, No. 1755, Available Online at: https://www.ncbi.nlm.nih.gov/pmc/articles/PMC8914660/, Feb. 23, 2022, 21 pages.
Prada , "Deploying Multicluster Kubernetes Applications with Gitops: What Architects Need to Know", Available Online at: https://www.redhat.com/architect/kubernetes-multicluster-applications-gitops, Aug. 9, 2022, 19 pages.
Rosoff , "Project Pacific—Technical Overview", Available Online at: https://blogs.vmware.com/vsphere/2019/08/project-pacific-technical-overview.html, Aug. 26, 2019, 7 pages.

\* cited by examiner

DATA PLANE TECHNIQUES FOR SUBSTRATE MANAGED CONTAINERS

CROSS REFERENCES TO RELATED APPLICATIONS

The present application is a continuation of U.S. Non-Provisional patent application Ser. No. 18/457,335, filed Aug. 28, 2023, entitled "Data Plane Techniques For Substrate Managed Containers," now U.S. Pat. No. 12,034,647, issued Jul. 9, 2024, which claims priority to U.S. Provisional Application No. 63/402,024, filed Aug. 29, 2002, entitled "Substrate Managed Containers," and U.S. Provisional Application No. 63/381,715, filed Oct. 31, 2022, entitled "Substrate Managed Containers," the content of which are herein incorporated by reference in their entirety for all purposes.

BACKGROUND

Cloud-based computing platforms offer significant advantages over traditional on-premises computing platforms. For instance, cloud-based computing platforms provide scalable and flexible computing resources for users and can be deployed across geographic regions that are widely spaced apart (e.g., in different countries). Cloud-based computing platforms can provide one or more categories of services, including Software as a Service (SaaS), Platform as a Service (PaaS), or Infrastructure as a Service (IaaS). Under an IaaS cloud service model, one or more types of resources are hosted by a cloud service provider and made available to a client (e.g., an enterprise customer). Such resources can include computing resources (e.g., compute instances), networking resources (e.g., a virtual private network), storage resources (e.g., cloud-based databases), and other hardware or software resources.

However, the utilization of virtual machines in these environments may present drawbacks. For example, utilizing virtual machines may present a suboptimal layer of abstraction which wastes capacity due to resource quantization as well as duplicated copies of operating systems, agents, and other support software. In practice, service teams may over-allocate resources to handle worst case scenarios because scaling with virtual machines is difficult to achieve on demand due to capacity and operational constraints. As the number of regions managed by a cloud provider grow, flexibility and manual curation of services is rapidly becoming untenable.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Some embodiments may include a method. The method may include providing, by a control plane of a computing cluster of a cloud computing environment. In some embodiments, a set of applications may be configured to communicate with a plurality of core services of the cloud computing environment. The control plane may further provide control plane components of a container orchestration platform (e.g., Kubernetes). The method may include receiving, by the control plane, a deployment request initiated by a deployment orchestrator that deploys applications within the cloud computing environment using: 1) virtual-machine-based virtualization with a static pool of computing nodes and 2) container-based virtualization with a dynamic pool of computing nodes of the computing cluster. The method may include generating, by the control plane and based at least in part on the deployment request, a pod comprising one or more containers corresponding to the deployment request. The method may include assigning, by the control plane, the pod comprising the one or more containers to a computing node of the dynamic pool of computing nodes. The method may include generating, by the control plane, an Internet Protocol (IP) address for the one or more containers of the pod. The method may include updating, by the control plane, a load balancer with the IP address for the set of one or more containers. In some embodiments, the updating may cause the one or more containers to be available for receiving subsequent network traffic of the cloud computing environment.

In some embodiments, the static pool of computing nodes comprises a first set of computing nodes corresponding to a substrate network and a second set of computing nodes corresponding to an overlay network. The dynamic pool of resources may correspond to a set of computing nodes managed by the container orchestration platform.

In some embodiments, the deployment request initiated by the deployment orchestrator is received, by a control plane component of the container orchestration platform, from a client that is configured to communicate with the control plane component to perform the container-based virtualization.

In some embodiments, the set of applications provided by the control plane comprises a certificate exchange service that provides data plane components of the container orchestration platform with configuration data for joining the dynamic pool of computing nodes. The configuration data may be provided based at least in part on authenticating the data plane agents using corresponding client certificates provided by the data plane agents.

In some embodiments, the set of applications is provided by the control plane comprise a cluster nanny that: 1) generates private keys and certificates for the control plane components and data plane components of the container orchestration platform, the certificates being generated based on a first certificate authority certificate, 2) uploads the certificates to a secrets service of the set of core services, 3) obtains a second certificate authority certificate and regenerates the certificates based at least in part on the second certificate authority certificate, and 4) updates the certificates with the secrets service.

In some embodiments, the set of applications is provided by the control plane comprises a namespace and quota manager that maintains records of registered namespaces, respective quota cap values associated with the registered namespaces, and respective cluster utilization data corresponding to the registered namespaces.

In some embodiments, the set of applications provided by the control plane comprises a metrics service that obtains metrics data from at least one of the control plane components of the container orchestration platform and transmits the metrics data to a monitoring and alarming service of the plurality of core services of the cloud computing environment.

In some embodiments, a cloud computing system is disclosed. The cloud computing system may comprise one or more memories storing computer-executable instructions that, when executed by one or more processors of the computing system, cause the cloud computing system to perform any suitable method disclosed herein.

In some embodiments, a non-transitory computer readable medium is disclosed. The non-transitory computer readable medium may store computer-executable instructions that, when executed by one or more processors, cause the one or more processors to perform any suitable method disclosed herein.

Another method is disclosed. The method may include receiving, by a container runtime interface of a data plane associated with a container orchestration platform, a deployment request to deploy a container to a computing node. In some embodiments, the deployment request may be received from a deployment orchestrator that is configured to provide virtual-machine-based virtualization and container-based virtualization within a cloud computing environment. The method may include configuring, by a container networking interface, network connections associated with the container. The method may include allocating, by the container networking interface, an Internet Protocol (IP) address for the container. The method may include generating, by a container runtime of the data plane, the container, the container being configured with the IP address. The method may include running, by the container runtime of the data plane, the container within a micro-virtual machine that is compatible with the container orchestration platform.

In some embodiments, the container runtime is a first container runtime of a plurality of container runtimes, and the container runtime interface selects the container runtime from the plurality of container runtimes based at least in part on determining an isolation type for the container. The first container runtime may isolate containers within respective micro-virtual machines. The second container runtime of the plurality of container runtimes may isolate a first set of containers associated with a first network namespace from a second set of containers that are associated with a second network namespace.

The method may further include generating, by the container networking interface of the data plane, a network namespace for the container. The method may further include inserting, by the container networking interface, the IP address in the network namespace for the container.

In some embodiments, the container is a first container of a service that is implemented by a plurality of containers. The container networking interface may assign the IP address to each of the plurality of containers that implement the service.

In some embodiments, the container is a first container, and the data plane further comprises a container storage interface that provides, to a second container managed by the container orchestration platform, access to workload data associated with the first container.

In some embodiments, the container is a first container of a service that is implemented by a plurality of containers and the container networking interface assigns the IP address to each of the plurality of containers that implements the service. In some embodiments, the container networking interface manages respective endpoints within the plurality of containers, the plurality of containers being communicatively connected with one another through the respective endpoints.

Systems, devices, and computer media are disclosed, each of which may comprise one or more memories on which instructions corresponding to the methods disclosed herein may be stored. The instructions may be executed by one or more processors of the disclosed systems and devices to execute the methods disclosed herein. One or more computer programs can be configured to perform operations corresponding to the described methods by virtue of including instructions that, when executed one or more processors, cause the one or more processors to perform the operations.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
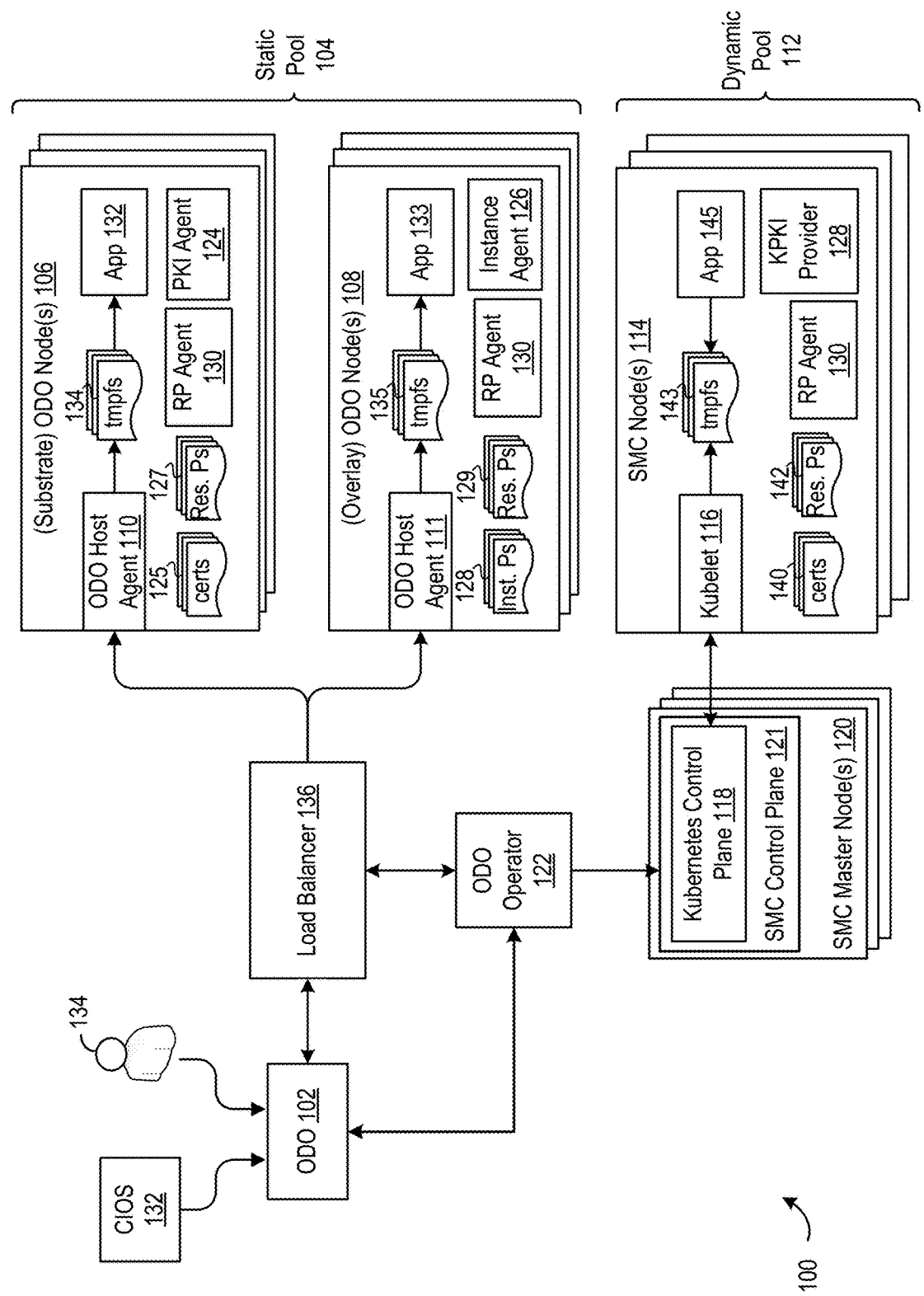
FIG. 1 is a block diagram for illustrating an example architecture for providing virtual-machine-based virtualization and container-based virtualization within a cloud computing environment, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

INTRODUCTION

Infrastructure as a service (IaaS) is one type of cloud computing. IaaS can be configured to provide virtualized computing resources over a public network (e.g., the Internet). Some conventional cloud computing systems utilize virtual machines for virtualization. A virtual machine is a software program that emulates the functionality of hardware or a computing system and enable the execution of what appear to be separate computers using the hardware resources of a single computer. In an IaaS model, a cloud computing provider can host the infrastructure components (e.g., servers, storage devices, network nodes (e.g., hardware), deployment software, platform virtualization (e.g., a hypervisor layer), or the like). The provisioning of and deployment to these infrastructure components can be managed by a deployment orchestrator (e.g., Oracle Deployment Orchestrator (ODO)).

In some instances, IaaS customers may access resources and services through a wide area network (WAN), such as the Internet, and can use the cloud provider's services to install the remaining elements of an application stack. In conventional systems that utilize virtual machine virtualization (hereinafter, "VM based cloud computing environments"), the user can log in to the IaaS platform to create VMs, install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc. A number of core services implemented and/or managed by service teams, may be provided in a dedicated virtual private network (VPN) of the cloud computing environment. This dedicated VPN may be referred to herein as "the substrate" or the "service enclave." Customers can deploy applications to overlay virtual private networks. The interactions between various resources of a VPN or between VPNs may be managed by an identity provider (e.g., one of the core services provided in the service enclave).

However, the utilization of virtual machines in these environments may present drawbacks. For example, utilizing virtual machines may present a suboptimal layer of abstraction which wastes capacity due to resource quantization as well as duplicated copies of operating systems, agents, and other support software. In practice, service teams may over-allocate resources to handle worst case scenarios because scaling with virtual machines is difficult to achieve on demand due to capacity and operational constraints. As the number of regions managed by a cloud provider grow, flexibility and manual curation of services is rapidly becoming untenable.

In some systems, service teams are required to own, manage, and patch a dedicated compute instance with its own copy of an OS and agent(s). It may be the case that a single hypervisor host may be running multiple (e.g., up to 10, 15, etc.) copies of the OS and agents (e.g., one per virtual machine), leading to wasted memory, disk, and CPU cycles. This makes it more difficult to reduce the footprint of the service enclave. This is especially problematic for limited-capacity environments (e.g., a Dedicated Region at Customer Premises (DRCC) environments, Private Label Clouds (PLCs), etc.).

In VM-based cloud computing environments, there is limited or no capacity headroom to handle rescheduling workloads if a server goes down. This is an ever-increasing risk as hardware ages and breaks and can lead to compromised redundancy and availability for critical services.

In previous implementations of cloud infrastructure (e.g., Oracle Cloud Infrastructure (OCI), the dedicated VMs used for service workloads are tied to physical networking locations, and service teams are exposed to physical aspects of the underlying host (e.g., IP, hardware issues, downtime, etc.). If a hypervisor has to be taken down, all of the VMs on it need to be manually re-provisioned and the containerized workload configs have to be updated to point to a new physical location/IP. It is advantageous to abstract away hardware and operating systems from deployed workloads.

Additionally, the base operating system (OS) may be owned by one entity (e.g., a service team), but the workloads running in that operating system are owned by another entity (e.g., another team, all service teams, etc.). This violates principles of ownership boundaries and increases the difficulty of having clear interface contracts between service provider and consumer. Service teams have previously been provided elevated access to modify their OS out of compliance parameters, and also have the responsibility of patching it periodically. Patching and updates to the OS involves execution of code at runtime in production—in the form of Chef, Shell Scripts, or Yellowdog Updater Modified (YUM) package installs. All of these approaches are fallible even when correct and are vulnerable to drift issues. They are also comparatively slow, making OCI-wide rollouts slower than necessary.

In light of the aforementioned drawbacks, it is desirable to provide a managed infrastructure service, in the substrate network or elsewhere, that enables a more advantageous use of resources and footprint reduction. By way of example, container-based virtualization may provide advantages over the previous virtual-machine-based virtualization provided by OCI. Some popular container-based orchestrators are available. For example, Kubernetes is a widely used, open-source container orchestration platform that provides declarative infrastructure management and that uses containers for virtualization. A single container can be used to run small microservices or larger applications. A container provides an application layer abstraction that packages code and dependencies together. Unlike virtual machines, these containers share a host OS kernel and usually the binaries and libraries as well. Containers are lightweight and can be small in size and can boot faster than virtual machines. Containers can also be more quickly scaled than virtual machines. In some embodiments, the open-source container orchestration platform may leverage existing core services for secrets management, logging, certificate generation, or the like. This enables changes to existing configurations to be minimized or avoided. In some embodiments, features of the open-source container orchestration platform can be disabled to avoid changes to pod/workload states. This may avoid introducing discrepancies between the desired state of the workload instance (e.g., a pod) after deployment and its actual state that can be changed due to events such as voluntary pod evictions. It may also simplify the design since change in POD states (e.g., assigned Ips) require designing a reconciliation component that keeps external services up to date and avoids service outages due to invalid Ips or outdated Ips DNS entries.

In some embodiments, a managed infrastructure service may be provided in the substrate (e.g., the service enclave) that allows running multiple containerized service workloads in micro-VMs, on a bare metal (BM) instance running a shared copy of Evergreen OS (e.g., an immutable operating system). Micro-VMs use a combination of kernel virtualization with container runtime interfaces. Micro-VMs allow running a containerized workload as if it's a normal container but wrap that execution in a virtualization layer just for the container. The disclosed infrastructure (e.g., instances and OS) and the service used to orchestrate changes to this infrastructure may be managed by a service enclave compute team. This approach alleviates other service enclave teams from having direct access to the infrastructure and OS that their containers execute on. The service may provide multiple virtualization options. For example, ODO may be configured to manage virtual-machine-based virtualization and another infrastructure offering (referred to as "substrate managed containers") that includes container-based virtualization. ODO may interface with an open-source container orchestration platform (e.g., Kubernetes) to leverage its container-based management functionality. In some embodiments, both options may be available indefinitely or for a limited time, or in some embodiments as part of an effort to migrate the whole of the cloud computing environment toward adopting container-based virtualization.

Utilizing the techniques discussed herein, the use of substrate (e.g., service enclave) capacity may be reduced by reducing duplicated copies of OS and agents and mitigating resource quantization. The use of developer time may be reduced through reducing duplicative manual operational burdens with respect to patching and fleet management. Efforts to scale up or down and laterally migrating workloads are made easier. The techniques further enable rapid and confident deployment of patches, updates, and new deployments while reducing overall machine access by service teams.

Multiple service workloads may be co-located on a single bare metal instance, similar to what happens conventionally on hypervisor hosts. However, the mapping between the containerized workloads and the underlying instance may cease to be static since the workloads may no longer be tied to a dedicated VM/OS, nor will there be visibility into the underlying BM instance. This will allow efficient bin-packing and better failure recovery options. Resource quotas will be still applied to workloads to mitigate noisy neighbors. Service teams may deploy and manage workloads using Oracle Deployment Orchestrater (ODO) as they do today. However, abstracting the underlying infrastructure via ODO allows for system-wide compliance and operational improvements without the need for each service team to implement the migration independently. This allows migration toward a container-based infrastructure to be conducted in an incremental and non-disruptive fashion since ODO is conventionally already used for deploying workloads.

In the case of total failure of an underlying physical machine, affected workloads may be automatically redeployed to a different machine without human intervention to maintain redundancy defined by the service. Because the migration cost for stateful services is real, moving stateful workloads from one machine to another as part of redeploying them will be avoided. As long as services are set up properly for high availability, machine failure and subsequent redeployment may be unnoticeable by the service team, reducing operational burden as well as opportunity for operator error.

The techniques described herein increase efficiencies of the system in a variety of ways. Rather than running a copy of OS and agents in each dedicated VM, per workload, the OS and agents may be centralized and shared across container workloads and a single instance of each agent can run on the underlying shared OS. An immutable base OS (e.g., "Evergreen") may be used allow the scope and size of some of the agents to be reduced. Limiting access to this OS allows for more efficient and tighter security control. Using a shared OS may also free up on average 15% CPU capacity per current hypervisor host. This also reduces and/or eliminates duplicative maintenance burdens.

The use of an immutable base OS ("Evergreen") and container images allow for atomic update and rollback and provide benefits of being unchangeable at run time. This allows OS updates to be rolled out safely and atomically and allows OS patching to be managed by a central team, eliminating the need for individual teams to patch their corresponding OS and instances. Therefore, service team can focus on their containerized service workloads which can be updated atomically via ODO, The disclosed techniques allow security and compliance validation to be performed statically at build time and eliminates the risk of divergence and the cost of recurring runtime compliance validation, which waste machine resources.

Due to efficient bin-packing techniques and ceasing to quantize service enclave capacity into statically allocated and managed VMs, the cost of spare capacity needed to handle outages across the entire service enclave can be amortized. Conventional techniques waste capacity by pre-allocating every service's needed spare capacity, and potentially miss the spare capacity needed to handle the loss of entire bare metal machines.

The layers of abstraction used between the container and the underlying infrastructure allows for service workloads to be scaled up and down, and redeployed across machines transparently, without manual operational engagement from service teams. During the outage of a physical machine, the infrastructure orchestration service may redeploy affected workloads on different hosts-along with updating load balancer config and putting them back in service.

The techniques described herein can be similarly used in any suitable cloud computing environment (e.g., OCI) including a Dedicated Region at Customer Cloud (DRCC) and/or a Private Label Cloud (PLC). DRCCs/PLCs are described in more detail in more detail in U.S. Application No. 63/379,427, filed Oct. 13, 2022, entitled "Dedicated Cloud Regions at Customer Premises," and U.S. Application No. 63/402,026, filed Aug. 29, 2022, entitles "Dedicated Cloud Regions at Customer Premises," the entire contents of which are incorporated in their entirety for all purposes.

Certain Definitions

"Public Key Infrastructure (PKI)" refers to set of policies, hardware, software, and procedures used to create, manage, and distribute digital certificates and/or to manage public-key encryption. Some cloud infrastructure environment (e.g., OCI) include private certificate authorities. In some cases, each region contains a regional root of trust, and there is a cross-region root of trust that signs client and server certificates for cross-region communication. One of the primary functions of PKI is to bootstrap trust internally.

A "region" is a logical abstraction corresponding to a geographical location. A region can include any suitable number of one or more execution targets. In some embodiments, an execution target could correspond to a data center.

An "ODO application" is a control plane concept that ties together application metadata with one or more node pools. For example, an ODO application refers to an association between ownership data, runtime specifications, deployment specifications, node pool membership, and deployment history. Applications have a single intended version of software at any given time. Artifact versions (e.g., a version of a Docker image, etc.) may be pushed to an application (e.g., via a deployment), and may be pushed to all nodes in all pools associated with the application.

An "ODO Docker Application" refers to an ODO application that deploys docker containers. The deployment may pull down an appropriate container image (e.g., from a Docker container registry).

An "ODO Plain Old Process (POP) Application" refers to an ODO application that deploys a bare process. The deployment may extract a tarball on the host as the application root.

An "ODO pool," "node pool," or "pool" refers to a grouping of nodes, with management and ownership metadata. A "static pool" refers to a static set of host computing nodes that are owned by application owners (e.g., specific hosts provided by application teams). In some embodiments, there is one pool per application and all nodes in the pool are intended to be running the same application version and configuration in the steady state. A "dynamic pool" refers to a set of host computing nodes that are not tied to application owners. A dynamic pool can contain dynamic instances for a specific application, rather than hosts that can run multiple applications.

A "computing node," an ODO node, (or "node," for brevity) is a virtual machine or bare metal instance to which ODO may deploy. running an agent (e.g., a host agent associated with ODO, a Kubernetes Kubelet ("kubelet," for brevity)). An "ODO node" refers to a computing node that is running one or more host agents that are associated with ODO. An "SMC node" refers to a node that is running an agent (e.g., a kubelet) that is associated with the container orchestration platform (e.g., Kubernetes). An ODO host agent may be any suitable piece of software that is configured to communicate with ODO (e.g., via an ODO agent application programming interface (API)). Similarly, a Kubelet may be an agent of Kubernetes that is configured to communicate with the Kubernetes control plane. If ODO host agents are used, two host agents may be deployed on a typical node. One host agent ("odo-hostagent") can be used to carry out on-node deployments for all user applications. The other host agent ("odo-bedrock") may handle on-node deployment actions for just two applications: odo-bedrock itself and odo-hostagent.

An "instance" refers to a specific instance of a running application (e.g., a logical representation of a running docker container). An instance may be a static instance, a dynamic instance, an ephemeral instance, or a stateful instance. An "static instance" refers to Points of Presence (POPs) or Docker containers running on computing nodes of a static pool. These instances may run as root and may granted almost arbitrary access to the host. A "dynamic instance" refers to an instance with no relationship to any particular host. These instances run with many constraints (e.g., non-root with no special capabilities). An "ephemeral instance" refers to a dynamic instance that does not inherit any persisted state between deployments (e.g., a stateless service may choose to persist a large cache between deployments as a Berkeley Database). A "stateful instance" refers to a dynamic instance that inherits persisted state from its predecessors.

"Substrate Managed Containers" refers to an infrastructure offering in the substrate to run containers directly, instead of providing substrate hosts to teams.

"Evergreen" refers to an operating system that includes an immutable root file system (/usr) with mutation capabilities in /etc, /opt, /var, and/home directories. The use of an immutable root file system reduces the attack surface of the operating system, reducing the burden on scanning agents like anti-virus agents. Evergreen may provide atomic rollbacks to protect against erroneous/faulty deployments. Changes and updates made on the base operating system image may not visible until next reboot (upgrades/updates require reboot). Atomic changes and visibility of those changes allows for uniformity among fleet instances. Evergreen may provide the stack with the latest version of Oracle Linux (e.g., OL8) and simplifies patching and updates. Any changes or updates may cause a new version of the filesystem to be checked out and updated. These aspects enable easier fallback to a previous stable configuration when needed.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. The infrastructure component can be referred to as a "resource" after provisioning has concluded. Examples of resources may include, but are not limited to, virtual machines, databases, object storage, block storage, load balancers, and the like. Once the infrastructure component has been provisioned (e.g., acquired, assigned, prepared, etc.), additional software may be deployed (e.g., provided to and installed on the infrastructure component). In some embodiments, a deployment refers to an update workflow that is carried out over the nodes associated with an application. By way of example, one deployment may include pushing a new version of an artifact and/or application configuration to a pool. Another example deployment may include rolling a previous artifact and/or application configuration change back. "Node deployment" may refer to the update process on a single node during a deployment. Node deployment may include any suitable combination of pulling a new artifact to a machine, stopping an old version of an application instance, deploying new code and/or a new configuration, making the node code/configuration active, starting any suitable processes associated with the new code and/or configuration, and running configured validation scripts in the context of the new application instance.

Moving on to the figures, FIG. 1 is a block diagram for illustrating an example architecture for providing virtual machine-based virtualization and container-based virtualization within a cloud computing environment 100, in accordance with at least one embodiment. Environment 100 include ODO 102 (e.g., Oracle Deployment Orchestrator, an example of a deployment orchestrator). ODO 102 is a deployment system that is configured to deploy service applications in a service enclave and customer overlay network. Static pool 104 may include any suitable number of nodes including ODO node(s) 106 and ODO nodes 108. ODO node(s) 106 and 108 may individually be configured to execute one or more agents associated with ODO 102 (e.g., ODO host agent 110 and ODO host agent 111, respectively) In some embodiments, static pool 104 (e.g., a virtual machine hosting environment) may include a collection of ODO node(s) 106 that are individually configured and intended to run the same application version (e.g., application 132, application 133) and configuration (stored in temporary files 134, temporary files 135, respectively), although not necessarily so. In some embodiments, each of the ODO node(s) 106 may include any suitable number of computing nodes, each being owned and/or associated with a service team of the service enclave. ODO node(s) 106 may be configured to host various core services of a service enclave of the cloud computing environment 100. ODO nodes 108 may likewise include any suitable number of computing nodes associated with a customer overlay network.

ODO node(s) 106 and ODO node(s) 108 may individually be configured with an instance of ODO host agent 110 and ODO host agent 111, respectively. ODO host agents 110 and 111 may be configured to communicate with ODO 102 via any suitable number of application programming interface(s) (API(s)). ODO 102 may be configured to utilize virtual machine (VM) based virtualization with ODO node(s) of static pool 104. In this type of hosting environment, workloads are deployed to virtual machines of the ODO node(s) 106 or 108 (not depicted in FIG. 1).

In some embodiments, ODO 102 may be configured to communicate with ODO host agents 110 and 111 to mount secrets at the ODO node(s) 106 and/or 108. In some embodiments, the ODO node(s) 106 may be configured to utilize certificates (e.g., certificates 125) from a certificate authority for authentication within the service enclave. Certificates 125 can be mounted or otherwise stored by the ODO host agent 110 at ODO node(s) 106. A PKI Agent 124 may execute at each of ODO node(s) 106 and may be configured to obtain certificates 125 from a certificate authority or other storage location and store those certificates at the ODO node(s) 106. The certificates can be used to uniquely identify the individual node. These certificates work well for applications with dedicated hosting such as static pool 104, but if a node is shared by multiple workloads, these certificates are less secure, as each of the workloads operating on the host share the same identity.

The ODO node(s) 108 may configured to communicate with an instance metadata server (e.g., via Instance Agent 126) to obtain instance principal tokens (e.g., Instance Principals 128, tokens that uniquely identify the node) during deployment or at any suitable time. Both the certificates 125 used in the service enclave (e.g., ODO node(s) 106) and the instance principals utilized in the customer overlay (e.g., ODO node(s) 108) may derive application identity from the host identity, as both application types conventionally assume dedicated ownership of the underlying host (VM or Bare Metal (BM)). This violates the principle of least privilege when different workloads on the same host cannot be disambiguated.

In some embodiments, the ODO node(s) 106 may be configured to store principal tokens (e.g., Resource Principals 127), obtained by Resource Principal Agent 130. Likewise, the ODO node(s) 108 may be configured to store principal tokens (e.g., Resource Principals 129) obtained by the Resource Principal Agent 130 executing at ODO node(s) 108. Resource Principal Agent 130 may be configured to communicate with a resource principal provider (e.g., an identity management service, not depicted in FIG. 1). Each resource principal may be a token that uniquely identifies the instance. Using the Resource Principals 127 and 129 (e.g., a resource principal token that is associated with a type "ODO application"), each of the applications/instances may be uniquely identified across all host offerings (e.g., VM-based virtualization, container-based virtualization).

Dynamic pool 112 may include any suitable number substrate managed container (SMC) node(s) 114. In some embodiments, ODO 102 may be configured to utilize container-based virtualization with SMC node(s) 114. In container-based virtualization, workloads are deployed as containers (e.g., pods). A more detailed description of virtual and container-based virtualization is discussed below in connection with FIGS. 2A and 2B.

SMC node(s) 114 may each be configured with a kubelet 116. Kubelet 116 may be a data plane component of a container orchestration system (e.g., Kubernetes). Kubernetes refers to an open-source container orchestration system for automating software deployment, scaling, and management. A more detailed description of Kubernetes is discussed below in connection with FIG. 3. The Kubelet 116 may the primary point of contact both to and from the Kubernetes control plane 118, where control loops run, and an API server is hosted (not depicted here). The Kubelet 116 uses a secure communication channel to the Kubernetes control plane 118 and presents authorization credentials, which grant it the privileges it needs to carry out the communication. In some embodiments, the Kubernetes control plane 118 may be executed at an SMC master node 120 (e.g., a computing node configured to host Kubernetes control plane components) that is associated with managing SMC Node(s) 114.

ODO operator 122 may be a client configured to handle deployment on the SMC node(s) 114 and reconcile state with OCI's core services (not depicted here). ODO operator 122 may be configured to issue calls to a Kubernetes API Server of the Kubernetes control plane 118. For example, ODO operator 122 may be configured to issue calls to Kubernetes API server to create/delete pods (e.g., workload objects), and determine their successful creation/deletion. A Kubernetes PKI (KPKI) Provider 128 may be configured to obtain PKI certificates from a certificate authority or other storage location, or generate new PKI certificates, and store those certificates at the ODO node(s) 106. PKI certificates (e.g., certificates 140, and likewise certificates 125) can be used to encrypt or sign data and with which the users, devices, or services can be authenticated over Transport Layer Security (TLS)). In some embodiments, ODO 102 may utilize ODO operator 122 to communicate with SMC control plane 121 and/or Kubernetes control plane 118 (e.g., via an API server). SMC control plane 121 may include additional components (e.g., a cluster nanny, a namespace and quota manager, a credential manager, etc.). These components will be discussed in further detail with respect to FIG. 9.

As described above in connection with ODO node(s) 106 and 108, SMC node(s) 114 may be similarly configured to store principal tokens (e.g., Resource Principals 142), obtained by Resource Principal Agent 130 executing at a given SMC node. Using the Resource Principals 142, each of the applications/instances (e.g., application 145) may be uniquely identified across all host offerings (e.g., VM-based virtualization, container-based virtualization). SMC node(s) 114 may similarly store configuration data corresponding to application 145 in temporary files 143.

In some embodiments, ODO 102 may be configured to generate and deploy a resource principal session token (e.g., resource principals 127, 129, and 142) with an application (e.g., application 132, 133, and 145, respectively) to enable finer granularity with respect to identity and access control. A resource principal session token may provide the ability for an application to identify itself without tying its identity to a particular host. In some embodiments, the resource principal session tokens may be stored as part of temporary files (e.g., temporary files 134, 135, and 143 of ODO node(s), 106, 108, and/or SMC node(s) 114, respectively) or separately at each node. Resource principal session tokens may be utilized for any or all hosting environments (e.g., for ODO node(s) 106, 108, and/or SMC node(s) 114).

In some embodiments, a deployment process used by ODO 102 may include writing (e.g., via ODO operator 122) one or more secrets (e.g., a resource principal session token) in a namespace (e.g., a namespace associated with a service team). Writing these secrets to a namespace associated with a team can ensure that the secrets will be mounted into the workload's corresponding pods. A sidecar container or plugin (e.g., instance agent 126, resource principal (RP) agent 130, etc.) may be utilized by ODO node(s) 106, ODO node(s) 108, and/or SMC node(s) 114 as depicted in FIG. 1 to fetch required secrets to a mounted volume from a Secret Service (e.g., a core OCI service configured to manage secrets of the cloud computing environment) using the resource principal session token. A sidecar and/or plugin (e.g., PKI agent 124, Kubernetes PKI (KPKI) provider 128, etc.) may also be provided to obtain/refresh PKI certificates.

In some embodiments, ODO 102 may receive a provisioning and/or deployment request from Cloud Infrastructure Orchestration Service (CIOS) 132 or user 134 (e.g., via an interface exposed by ODO 102). A provisioning and/or deployment request (also referred to herein as a "bootstrap request") may corresponding to a request for provisioning one or more infrastructure resources (e.g., nodes, OCI compute instances, virtual machines, micro-virtual machines etc.) and/or deploying one or more artifacts (e.g., workloads, images, containers, etc.). CIOS 132 may be an orchestration service configured to enable world-wide infrastructure provisioning and code deployment. An example of CIOS 132 is discussed in more detail with respect to FIG. 17. In some embodiments, a provisioning and/or deployment request may be received (e.g., from CIOS 132) as part of an automated region build. In some embodiments, ODO 102 (or any suitable component of the cloud computing environment such as load balancer 136) may execute any suitable operations of a predefined protocol set for identifying whether to fulfill the provisioning and deployment request using the static pool 104 or the dynamic pool 112. In some embodiments, a predefined protocol set including rules and/or thresholds may indicate that a certain percentage (e.g., 13%) of all provisioning and deployment requests are to be utilized using resources of the dynamic pool 112, while the remaining requests are to be processed using resources of the static pool 104. These rules may be defined/utilized to migrate toward fulfilling incrementally more requests using resources of one pool (e.g., the dynamic pool 112) over the other. For example, the percentage of provisioning and deployment requests to be utilized by the static pool 104 may be incrementally decreased over time, while incrementally increasing the percentage corresponding to the dynamic pool 112, such that over time, more and more requests are fulfilled with the dynamic pool 112. In some embodiments, data provided in a provisioning and deployment request may specific or be utilized to select resources of one pool over the other.

ODO 102 may be configured to generate an identifier (e.g., an Oracle cloud identifier (OCID)) for each resource (e.g., each application 132, 133, and 145 of FIG. 1). In some embodiments, the identifier (the OCID) may uniquely identify the resource (e.g., instance/application) from among resources of a cloud computing environment. In some embodiments, the identifier may be deployed with the application and/or to the node (and stored in tmpfs 134, 135, and/or 143). ODO 102 may be configured to maintain metadata corresponding to each resource within storage (e.g., at ODO Control Plane Database 406 of FIG. 4) as discussed below.

Figure 2B:
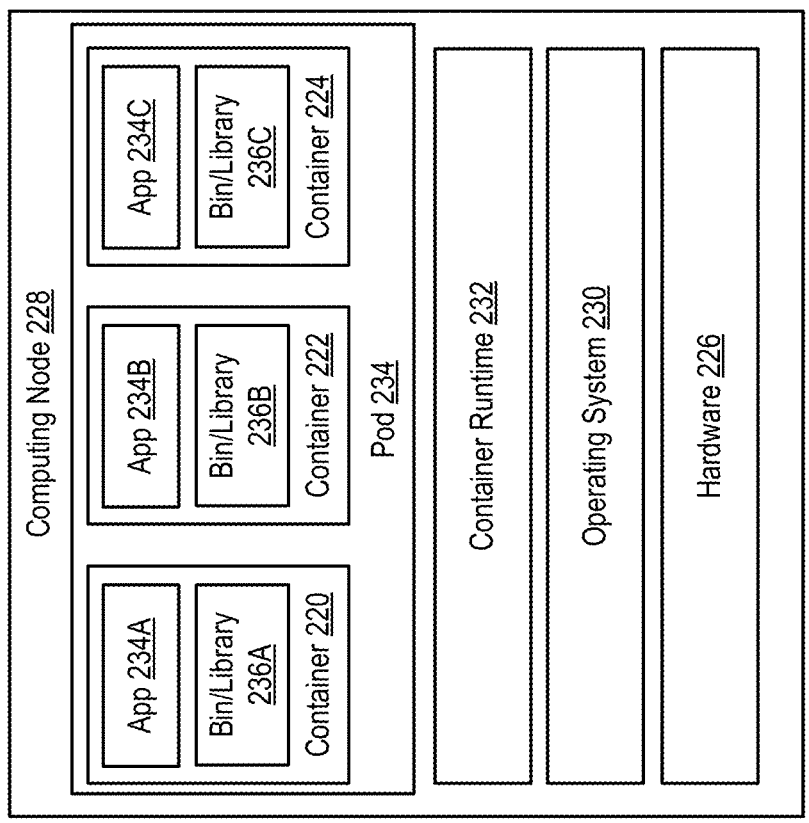
FIGS. 2A and 2B are block diagrams for illustrating differences between providing virtual-machine-based virtualization and container-based virtualization, in accordance with at least one embodiment.
Figure 2A:
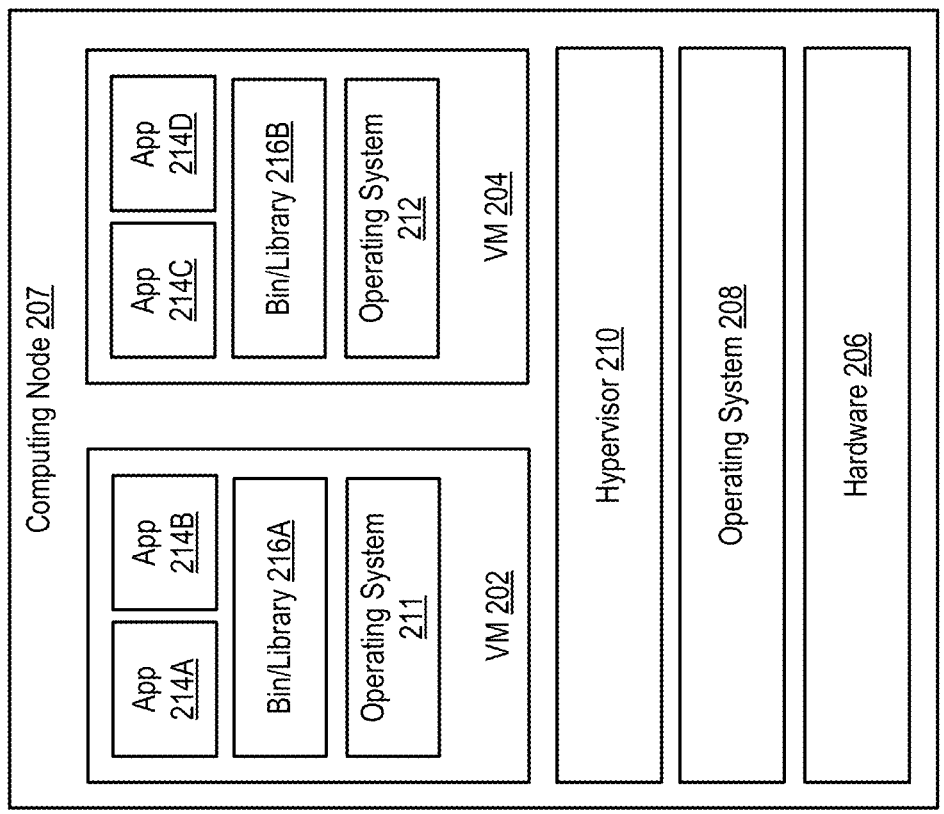

FIGS. 2A and 2B are block diagrams for illustrating differences between providing virtual-machine-based virtualization and container-based virtualization, in accordance with at least one embodiment.

FIG. 2A is a block diagram depicting virtual-machine-based virtualization. In the example depicted, multiple virtual machines are used (e.g., VM 202 and VM 204). VMs 202 and 204 may be run on a single physical server's hardware (e.g., hardware 206 of computing node 207, an example of one the ODO node(s) 106 or 108 of FIG. 1) configured to run operating system 208. A hypervisor (e.g., hypervisor 210) may be a program executed on operating system 208 (or directly on hardware 206 as an embedded bare metal hypervisor) that is configured to create and manage the VMs 202 and 204 (or any suitable number of VMs). The hypervisor may be specialized software that runs on the node and is responsible for managing the physical resources of the node. The hypervisor may ensure that each VM is isolated from all other VMs, that they each have their own operating system (sometimes referred to as a "guest operating system") and kernel. Operating systems 211 and 212 are intended to represent individual operating system and kernels.

Virtualization allows applications (e.g., applications 214A-D) to be isolated between VMs (e.g., VM 202 and VM 204) and provides a level of security as the information of one application cannot be freely accessed by another application. Virtualization allows better utilization of resources (over non-virtualized environments) in a physical server and allows better scalability because an application can be added or updated easily, reduces hardware costs, and much more. With virtualization one can present a set of physical resources as a cluster of disposable virtual machines. As depicted, each VM is a full machine running all the components needed (e.g., Applications 214A-D, bins/libraries 216A-B, etc.), including its own operating system (e.g., OS 211, OS 212), on top of the virtualized hardware. Each VM running on a hypervisor provides logical isolation in which no VM shares memory space with or awareness of other VMs of the host.

There are drawbacks to using virtual machines (VMs) as well. Because they are designed to run any operating system without modification (e.g., OS 211, OS 212), they must provide broad functionality and a robust set of simulated hardware. Consequently, VMs are "heavyweight" solutions that require significant computing resources, which lead to poor resource utilization. VMs also typically have long boot times, making VMs difficult to scale.

FIG. 2B is a block diagram depicting container-based virtualization. In the example depicted, multiple containers are used (e.g., container 220, container 222, container 224). The configuration of containers depicted in FIG. 2B depicts an embodiment in which the container is run in a namespace in which each container shares a single operating system (e.g., operating system 230) and hardware (e.g., hardware 226). Any suitable number of containers may be utilized despite the number used for illustration in FIG. 2B. Containers are similar to VMs, in that they run on hardware 226 of the same node (e.g., computing node 228, an example of the SMC node(s) 114 of FIG. 1) but they have relaxed isolation properties to share the Operating System (OS) (e.g., operating system 230) among the applications (e.g., application 234A-C). Therefore, containers are considered more lightweight than VMs. Similar to a VM, a container has its own filesystem, share of CPU, memory, process space, and more. The containers of a node are managed by the container runtime 232. The containers are packaged together in one or more pods (e.g., pod 234) to maximize the benefits of resource sharing, where all of the containers of a pod share the same resources and local network. Grouping containers this way allows the containers of a pod to communicate between each other as if they shared the same physical hardware, while still remaining isolated to some degree. As the containers are decoupled from the underlying infrastructure, they may be portable across clouds and OS distributions.

Containers have additional benefits over VMs such as:
Increasing the ease and efficiency of container image creation as compared to VM image use.
Providing for reliable and frequent container image build and deployment with quick and efficient rollbacks (due to image immutability).
Providing the ability to create application container images at build/release time rather than deployment time, thereby decoupling applications from infrastructure.
Enabling the collection of OS-level information and metrics, but also application health and other signals.
Providing environmental consistency across development, testing, and production (e.g., runs the same on a laptop as it does in the cloud).
Enabling execution on Ubuntu, RHEL, CoreOS, on-premises, on major public clouds, and anywhere else.
Raising the level of abstraction from running an OS on virtual hardware to running an application on an OS using logical resources.
Providing loosely coupled, distributed, elastic, liberated micro-services in which applications are broken into smaller, independent pieces and can be deployed and managed dynamically-rather than using a monolithic stack running on one big single-purpose machine.
Providing resource isolation leading to predictable application performance.
Providing high efficiency and density Although not depicted, the containers may be run in individual micro-VMs using the container runtime 232 (e.g., Kata Containers, an open-source container runtime). A micro-VM may include the enhanced security and workload isolation of virtual machines, while preserving the speed resource efficiency and ecosystem of containers. A micro-VM includes a container architecture that provides VM isolation for each instance. The container runtime may implement a minimal set of features when compared to the hypervisor 210, making the container runtime extremely fast with low overhead. A micro-VM environment includes hardware and an operating system (e.g., such as hardware 226 and operating system 230). A micro-VM engine such as container runtime 232 (e.g., Kata, Firecracker, etc.) runs atop the operating system 230 acting as a hypervisor or engine that supplies API, network, storage, and management tools needed to operate each micro VM. The micro-VM engine may be configured to create isolated virtual machine instances that can run a guest OS and a container-type workload.

Figure 3:
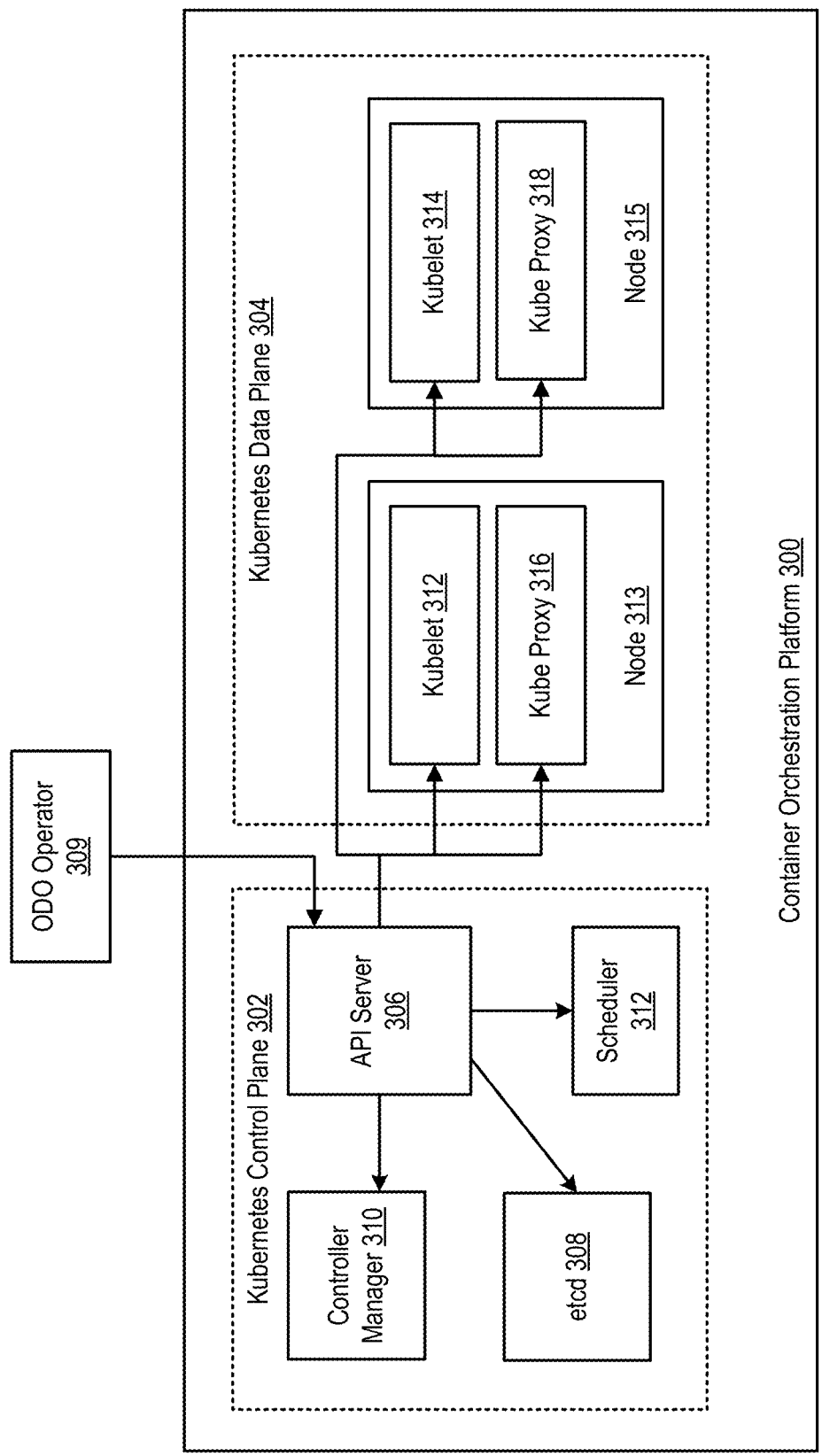
FIG. 3 is a simplified block diagram of an example container orchestration platform, in accordance with at least one embodiment.

FIG. 3 is a simplified block diagram of an example container orchestration platform 300, in accordance with at least one embodiment. Container orchestration platform 300 is an example of Kubernetes, an open-source platform for managing containerized workloads and services that facilitates declarative configuration and automation. Kubernetes provides an architecture that consists of a control plane (e.g., Kubernetes control plane 302, an example of the Kubernetes control plane 118 of FIG. 1) and data plane (e.g., Kubernetes data plane 304). The data plane components operate on worker nodes (e.g., nodes 313 and 315, each an example of the SMC node(s) 114 of FIG. 1). Worker nodes are responsible for running the various workloads as pods (e.g., pod 234 of FIG. 2). The control plane is responsible for the orchestration of the worker nodes, it is responsible for scheduling workloads on the worker nodes, managing a number of pods, performing security policy management, enforcing quotas and resources for workloads, and providing availability management of the workloads. The Kubernetes data plane 304 provides functionality such as interacting with the Kubernetes control plan 302 to carry out various functions such as: 1) spawning new pods, 2) communicating the status of pods and nodes, 3) providing up to date metrics about one or more nodes to the Kubernetes control plane 302, 4) working with a networking interface (not depicted) to associated networking with pods, 5) working with a storage interface (not depicted) to provide persistent storage to pods, 6) enforcing limits and quotas for each pod, and/or 7) injecting specific devices into pods (as needed). In some embodiments, the Kubernetes data plane 304 may provide secret injection capabilities into pods (e.g., using the RP Agent 130 and/or the KPKI Provider 128 of FIG. 1) and may pull images (e.g., container images) from specific registries (e.g., from object storage and/or a designated storage location of the cloud computing environment, not depicted) for execution in pods.

The API server 306 may be a RESTFUL API for the Kubernetes control plane 302. The API server 306 may be configured to carry out cluster operations such as deployment and pod deletion and queries the cluster state and its objects. API server 306 may be stateless and may be configured to use etcd 308 as storage. The ODO operator 309 (an example of the ODO operator 122 of FIG. 1) may be configured to communicate with API server 306 to initiate and manipulate deployments on an SMC cluster (e.g., SMC node(s) 114) that includes nodes 313 and 315. API server 306 may be designed to scale horizontally—that is, it scales by deploying more instances. Several instances of API server 306 may be run, concurrently, and traffic may be balanced between those instances.

Etcd 308 may be a distributed key/value storage used by Kubernetes Control Plane 302 to store cluster data. Etcd 308 may be configured to utilize a consensus algorithm (e.g., reliable, replicated, redundant, and fault-tolerant (RAFT) algorithm) to elect a leader and achieve strong data consistency. Etcd 308 may be regularly backed up for disaster recovery according to any suitable predefined schedule or frequency.

Controller manager 310 may include any suitable number of the controllers shipped with Kubernetes, such as replication controller (not depicted) and a namespace controller (not depicted), as a part of its binaries. Controller manager 310 represents the Kubernetes control loop which automatically responds to new events by checking the API Server 306 and modifies the cluster state to match the desired cluster state. For example, upon manual deletion of a pod, the controller manager 310, or a controller of the controller manager 310, may be configured to attempt spin up a new pod to modify the cluster state to match a number of pods (corresponding to a "Replica Count") to that of a desired state (corresponding to a "Replica Spec"). Some example controllers include: a node controller (e.g., a controller responsible for noticing and responding when nodes go down), a job controller (e.g., a controller configured to watch for job objects that represent one-off tasks, then creates pods to run those tasks to completion), an EndpointSlice controller (e.g., a controller configured to populate EndpointSlice objects to provide a link between Services and pods), and a ServiceAccount controller (e.g., a controller for creating default ServiceAccounts for new namespaces), to name a few.

Scheduler 312 may be configured to assign pods (e.g., pod 234) to cluster nodes (e.g., node 313 and 315, each an example of the SMC node(s) 114). Upon creating a new pod, the scheduler 312 may compile a list of feasible nodes (a "candidate list") in which the pod can be placed. This is referred to as "filtering." The nodes in the candidate list may be scored based on constraints and criteria (e.g., based on individual and collective resource requirements, hardware/software/policy constraints, affinity and anti-affinity specifications, data locality, inter-workload interference, and/or deadlines). The pod (e.g., pod 234) may be assigned to the node (e.g., node 313) with the highest score. The scheduler 312 may be configured to notify the API Server 306 of the assignment decision. The API server 306 may be configured to handle communicating with the selected node's Kubelet (e.g., Kubelet 312, Kubelet 314, each an example of Kubelet 116 of FIG. 1) to spawn the pod (e.g., pod 234) and deploy its containers (e.g., containers 220, 222, and 224 of FIG. 2). The Kubelet of each node uses a secure communication channel to the Kubernetes control plane 302 and presents authorization credentials, which grant it the privileges it needs to carry out the communication. The Kubelet in turn communicates with the container runtime (e.g., the container runtime 232 of FIG. 2) via a container runtime interface (not depicted) to manage pods.

In some embodiments, the Kubelets (e.g., Kubelets 312 and 314) may be individually configured to ensure that containers are running in a pod. The Kubelets may obtain pod specifications that are provided through various mechanisms to ensure that the containers described in those pod specifications are running and healthy.

Kube proxy 316 and Kube proxy 318 may be network proxies that run on each node (e.g., node 313 and 315, respectively) and maintain network rules on each node. These network rules allow network communication to these pods from network sessions inside or outside the cluster (e.g., a cluster of nodes including the nodes 313 and 315)

Figure 4:
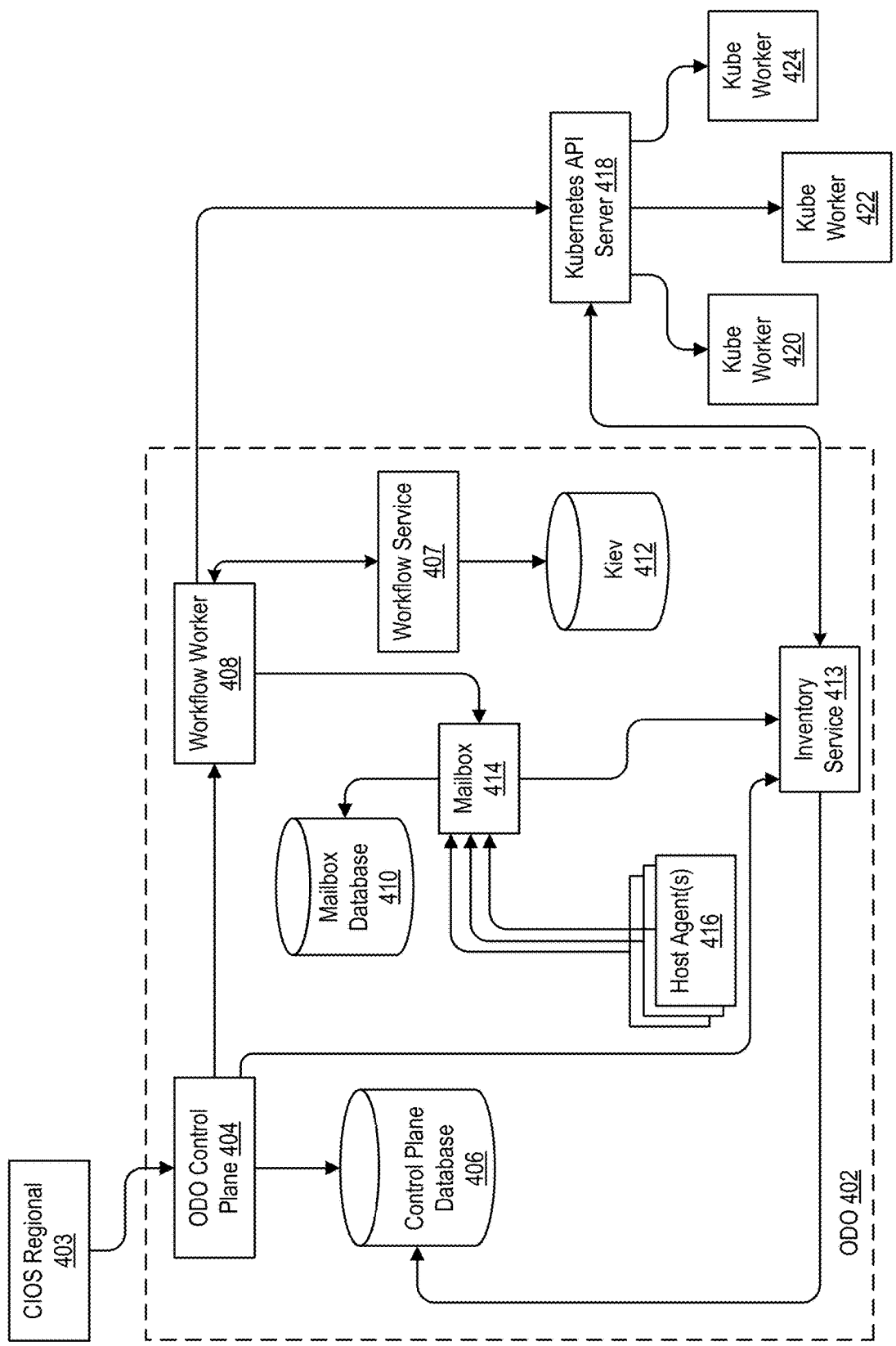
FIG. 4 is a simplified block diagram of an example architecture of a deployment orchestrator, in accordance with at least one embodiment.

FIG. 4 is a simplified block diagram of an example architecture 400 of a deployment orchestrator (e.g., ODO 402, an example of ODO 102 of FIG. 1), in accordance with at least one embodiment. The functionality of ODO 402 may be invoked (e.g., by CIOS Regional 403, a component of a cloud infrastructure orchestration service such as CIOS 132 of FIG. 1, CIOS 2110 of FIG. 21, etc.). Previous implementations of ODO 402 were designed around a bring-your-own-node model. When a node first communicates with the ODO control plane 404, a node object is added to the control plane database 406. Nodes can be added to pools manually, through a cloud infrastructure orchestration system (e.g., CIOS 132 of FIG. 1), or automatically by ODO 402 (e.g., using a manage pools feature). Pools are added to applications, and deployments are made for applications. Deployments are discrete entities with a known set of work.

The ODO control plane 404 may communicate with one or more services. For example, ODO 402 may communicate with workflow service 407 and inventory service 413. In some embodiments, the ODO control plane 404 may communicate with associated control plane databases (e.g., control plane database 406). The inventory service 413 may be, as depicted, separate from the control plane and may mitigate circular dependencies while ODO 402 is deploying itself. The mailbox 414 may be provided separately and may be configured to scale with the number of hosts instead of management changes (odo-cp-service) or deployments (workflow worker(s) 408).

Host agent(s) 416 (e.g., ODO host agents 110 and/or 111 of FIG. 1) may run on VMs or BMs owned by application teams and may communicate with the mailbox 414. Host agent(s) 416 can run in the substrate (e.g., on ODO node(s) 106 of FIG. 1), in an overlay (e.g., on ODO node(s) 108 of FIG. 1), and in points-of-presence. The mailbox 414 may act as a bounded queue to send commands from the workflow workers 408 to the host agent(s) 416, and to report the result of commands from the host agents 416 to the workflow worker(s) 408. For instance, the workflow worker(s) 408 may send a PULL_IMAGE command to the host agent(s) 416 via mailbox 414. The host agent(s) 416 may also be configured to report node inventory to the mailbox 414, which may then be forwarded to the inventory service 413. The host agent(s) 416 may be configured to start static instances (e.g., virtual machines within the static pool 104 of FIG. 1) as a docker container, systemd unit (pop), or by executing a command once during a deployment. The deployment of an instance onto a VM or BM may be performed in accordance with a workflow executed by the workflow worker 408. The workflow may terminate when the deployment to the instance fails or succeeds. An example of such a workflow is provided in FIG. 5.

In addition to deploying ODO applications onto servers, ODO 402 may be configured to create Kubernetes pods running services. By way of example, ODO 402 may be configured to communicate with Kubernetes API Server 418 (e.g., API Server 306 of FIG. 3), which in turn utilizes a number of kube workers 420, 422, and 424, to deploy pods to dynamic pool nodes (e.g., SMC node(s) 114 of FIG. 1). Kubernetes API Server 418 may utilize any suitable Kube workers (e.g., worker threads initiated by the Kubernetes API Server 418). ODO 402 may be configured to be the point of interaction between users and the SMC node(s) 114. Service teams can specify instance shapes, volumes, and counts in dynamic pools. Hosts can be managed by a central team in lieu of the bring-you-own-node model that was previously used. A container runtime environment may be kept as similar as possible between static and dynamic instances. Deployments can support fully static, mixed, or fully dynamic instance allotments. In addition to the execution of containers, ODO 402 can lever functionality provided by Kubernetes for scheduling decisions and quota enforcement.

ODO 402 may operate on naked pods using a per-instance deployment workflow to maintain similar behavior with static instances. Pods can be assigned IP addresses on the substrate's physical network. Once allocated, pod IP addresses may be immutable, but subsequent deployments may cause ODO 402 to replace pods. This means that load balancing, discovery and proxy services may only need to be updated during deployments, and not if a host power cycles. This allows services to restart after a large power event without updating all DNS records and load balancer backends. Evictions may be avoided, so that Kubernetes cause outages and break the initial dependency on runtime reconciliation. Involuntary evictions can be avoided by never over-committing nodes: workloads may use the guaranteed quality of service (the scheduler 312 of FIG. 3 guarantees resource availability), pod overheads, kube reservations (the resources needed by the kubelet, and other Kubernetes components on the node), system reservations (the resources needed by the operating system, and other system components), and containerized host agents (host agents provided by a specialized operating system called "Evergreen," where Evergreen may be configured to place all of OCI's agents into groups, so their resources can be bounded). Reconciling deployments may follow, with anti-entropy being available to both static and dynamic instances, but auto-healing and auto-scaling will only be available for dynamic instances. ODO 402 may maintain mappings between dynamic instances and resources that are preserved across deployments (e.g., persistent volumes). This may allow ODO 402 to provide coherent inventory and behavior between static and dynamic instances.

Over time, ODO 402 can utilize more of Kubernetes' core features coherently across both static and dynamic instances, like multiple container pods, to gradually decrease the impedance mismatch between OCI's substrate applications and Kubernetes.

ODO 402 may include two integration points to support Kubernetes: inventory and deployments. The workflow worker(s) 408 may manage pods by talking to the Kubernetes API Server 418, which is analogous to managing hosts by talking to the mailbox 414. In some embodiments, workflow worker(s) 408 may include or may be an example of ODO operator 122 of FIG. 1. In some embodiments, workflow worker(s) 408 may be configured to communicate with Kubernetes API server 418 via an ODO operator (not depicted here). The inventory service 413 may communicate with the Kubernetes API 418 to learn about running pods. The inventory service 413 may map these pods back to dynamic instances.

The deployment of a dynamic instance can be performed from a per-instance workflow, much like static instances are done, but instead of using the mailbox 414 as an intermediate to a host agent, the workflow worker(s) 408 may use Kubernetes API Server 418 (e.g., kube-apiserver) as an intermediate to the kubelet. Another difference is that the workflow worker(s) 408 may send specific commands to the mailbox 414, but may set desired states for Kubernetes, and waits for intermediate and final states to be achieved.

Figure 5:
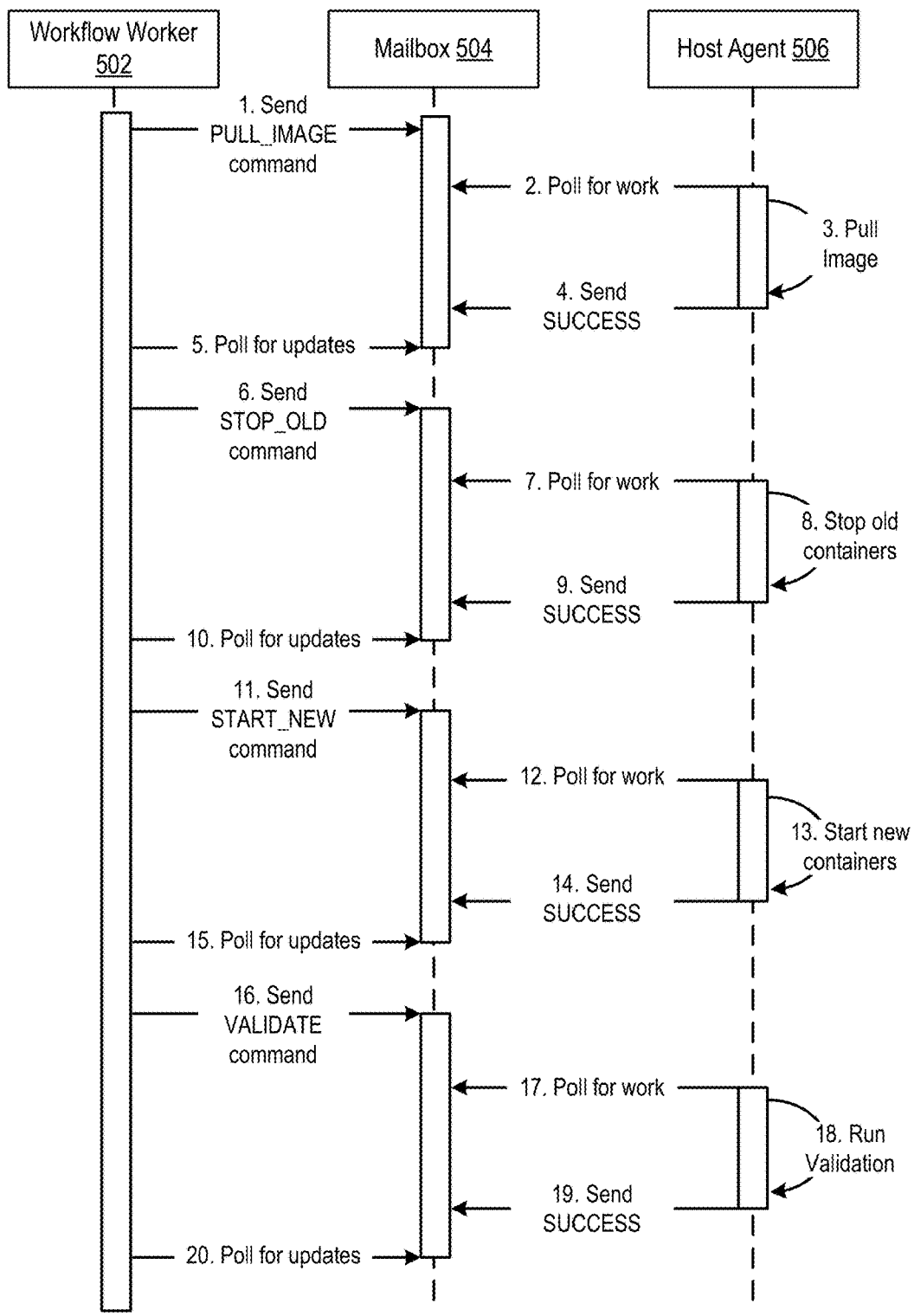
FIG. 5 is a flow diagram illustrating an example method for deploying a workload to a single node (e.g., ODO Node(s) of FIG. 1), in accordance with at least one embodiment.

FIG. 5 is a flow diagram illustrating an example method for deploying a workload to a single node, in accordance with at least one embodiment. Method 500 may be performed with workflow worker 502 (e.g., workflow worker 408 of FIG. 4), mailbox 504 (e.g., mailbox 414 of FIG. 4), and host agent 506 (e.g., host agent 416 of FIG. 4).

At step 1, workflow worker 502 (e.g., a workflow worker 408 FIG. 4) may send a command (e.g., a PULL_IMAGE command) to mailbox 504. Mailbox 504 may store the command in a mailbox database (e.g., mailbox database 410 of FIG. 4). In some embodiments, the command may identify a storage location (e.g., an object storage location) from which a particular image may be retrieved. In some embodiments, the command may be sent with the image.

At step 2, host agent 506 may poll mailbox 504 for work. In some embodiments, mailbox 504 may retrieve the command received at step 1 from mailbox database 410. The command may be received by host agent 506.

At step 3, host agent 506 may execute the command (e.g., the PULL_IMAGE command). As part of this execution, the host agent 506 may retrieve an image from a storage location (e.g., a storage location specified by the command, a (Docker) registry of containers, etc.). In some embodiments, the image may be contained in a container (e.g., a docker container containing the image and a runtime configuration). In some embodiments, the image (or container) may be received with the command. If the image is successfully obtained (e.g., received, retrieved, etc.), at step 4, the host agent 506 may send a message indicating the image was obtained successfully by the host agent 506. Alternatively, if receiving/retrieving the image was unsuccessful, the host agent 506 may send a message indicating that execution of the container was unsuccessful.

At step 5, workflow worker 502 may poll for updates from mailbox 504. In some embodiments, information retrieved from the polling may indicate the image (e.g., a container containing the image and runtime configuration) was successfully obtained by host agent 506.

At step 6, workflow worker 502 may send a second command (e.g., a STOP_OLD command) to mailbox 504. Mailbox 504 may store the command in a mailbox database (e.g., mailbox database 410). In some embodiments, the command may indicate a previously running container is to be stopped.

At step 7, host agent 506 may poll mailbox 504 for work. In some embodiments, mailbox 504 may retrieve the command received at step 6 from mailbox database 410. The command may be received by host agent 506.

At step 8, host agent 506 may execute the command (e.g., the STOP_OLD command). As part of this execution, the host agent 506 may execute instructions to stop the execution of a previously running container. If stopping the container is successful, at step 9, the host agent 506 may send a message indicating that execution of the container was successfully stopped by host agent 506. Alternatively, if stopping the container was unsuccessful, the host agent 506 may send a message indicating that execution of the container was unsuccessful.

At step 10, workflow worker 502 may poll for updates from mailbox 504. In some embodiments, information retrieved from the polling may indicate that the execution of the container was successfully stopped by host agent 506.

At step 11, workflow worker 502 may send a third command (e.g., a START_NEW command) to mailbox 504. Mailbox 504 may store the command in a mailbox database (e.g., mailbox database 410). In some embodiments, the command may indicate a container is to be started. In some embodiments, the third command may identify the container to be started (e.g., the docker container containing the image and runtime configuration received/retrieved at step 3).

At step 12, host agent 506 may poll mailbox 504 for work. In some embodiments, mailbox 504 may retrieve the command received at step 11 from mailbox database 410. The command may be received by host agent 506.

At step 13, host agent 506 may execute operations corresponding to the command (e.g., the START_NEW command). As part of this execution, the host agent 506 may execute instructions to start the container containing the image (and runtime configuration) obtained at step 3. If starting the container is successful, at step 14, the host agent 506 may send a message indicating that execution of the container was successfully started by host agent 506. Alternatively, if starting the container was unsuccessful, the host agent 506 may send a message indicating that the container is failing to start.

At step 15, workflow worker 502 may poll for updates from mailbox 504. In some embodiments, information retrieved from the polling may indicate that the container was successfully started by host agent 506.

At step 16, workflow worker 502 may send a third command (e.g., a VALIDATE command) to mailbox 504. Mailbox 504 may store the command in a mailbox database (e.g., mailbox database 410). In some embodiments, the command may indicate that operations for validating the operation of the service/application corresponding to the container started at step 13 are to be executed, or the operations for validating the operation of the service/application may be received as a post-startup validation script received with the image. In some embodiments, the third command may identify the container started at step 13. In some embodiments, executing the startup script may include utilizing a 'strartupProbe' feature of the container orchestration platform 300 of FIG. 3 to execute the validation script inside the container.

At step 17, host agent 506 may poll mailbox 504 for work. In some embodiments, mailbox 504 may retrieve the command received at step 16 from mailbox database 410. The command may be received by host agent 506.

At step 18, host agent 506 may execute any suitable instructions for validating the service/application of the container started at step 13. In some embodiments, the host agent 506 executes a post-startup validation script received with the image (e.g., via the docker container obtained at step 12) to validate that the container has started up and/or one or more other validation test. If validation is successful (e.g., one or more tests executed via the validation script have all passed), at step 19, the host agent 506 may send a message indicating that validation has been successful. Alternatively, if validation is unsuccessful (e.g., at least one test of the validation script has failed), the host agent 506 may send a message indicating that validation is unsuccessful. In some embodiments, At step 20, workflow worker 502 may poll for updates from mailbox 504. In some embodiments, information retrieved from the polling may indicate that validating the execution of the container was successful.

Figure 6:
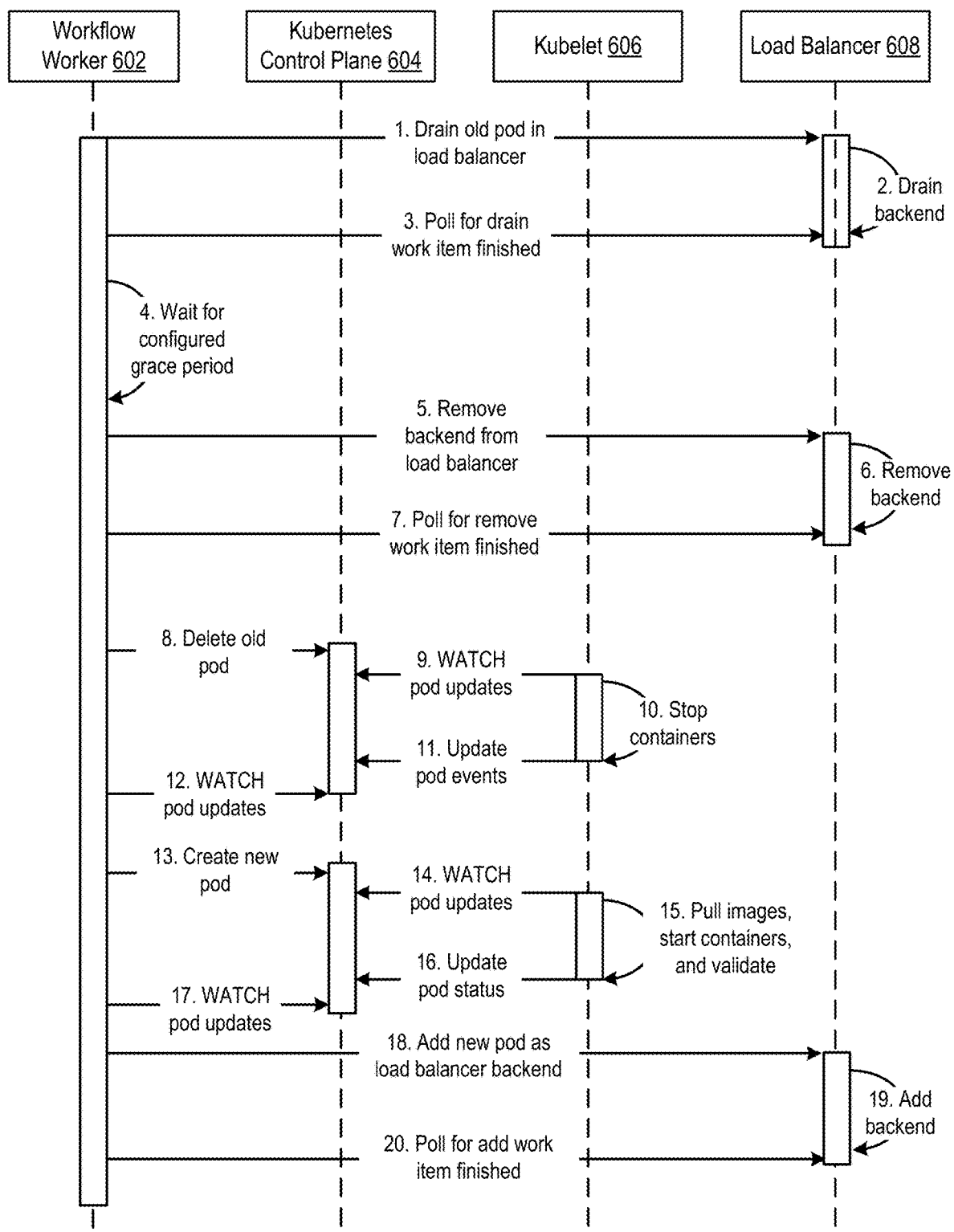
FIG. 6 is a flow diagram illustrating an example method for deploying a workload to an SMC node (e.g., to SMC Node(s) of FIG. 1), in accordance with at least one embodiment.

FIG. 6 is a flow diagram illustrating an example method for deploying a workload to an SMC node, in accordance with at least one embodiment. Method 600 may be performed with workflow worker 602 (e.g., workflow worker 408 of FIG. 4), Kubernetes control plane 604 (e.g., Kubernetes control plane 302 of FIG. 3), Kubelet 606 (e.g., Kubelet 312 of FIG. 3), and load balancer 608 (e.g., load balancer 136 of FIG. 3). In some embodiments, communications from workflow worker 602 to Kubernetes control plane 604 may be performed using ODO operator 122 of FIG. 1. ODO operator 122 may operate as part of, or separate from, workflow worker 602.

At step 1, workflow worker 602 (e.g., workflow worker 408 of FIG. 4) may send a command to load balancer 608 instructing load balancer 608 to drain an old pod (e.g., pod 234 of FIG. 2, operating on node 228 of FIG. 2, one of SMC node(s) 114 of FIG. 1). The command may indicate a particular pod to be drained.

At step 2, load balancer 608 may execute any suitable instructions for setting a drain status of the pod to true. Once set, the drain status may be used by the load balancer to ensure that new connections and/or requests are no longer forwarded to the pod.

At step 3, workflow worker 602 may poll the load balancer 608 to determine if the work corresponding to draining the old pod has been completed. The data obtained at step 3 may indicate whether the draining of the old pod was completed. The workflow worker 602 may continue to poll the load balancer 608 until the data obtained indicates that the draining of the pod has been completed.

At step 4, after the draining of the node has been completed, workflow worker 602 may be configured to wait for a configured grace period before proceeding to step 5.

At step 5, workflow worker 602 may send a command to load balancer 608 instructing load balancer 608 to remove the backend (e.g., the pod 234) from its pool of backends.

At step 6, the load balancer 608 may execute any suitable instructions for removing the backend (e.g., pod 234) from its pool of backends.

At step 7, workflow worker 602 may poll the load balancer 608 to determine if the work corresponding to removing the backend (e.g., pod 234) has been completed. The data obtained at step 7 may indicate whether the removal of the backend was completed. The workflow worker 602 may continue to poll the load balancer 608 until the data obtained indicates that the removal of the backend has been completed.

At step 8, workflow worker 602 may transmit a command (e.g., using ODO operator 122) to Kubernetes control plane 604. The command may be received by an API server (e.g., API server 306 of FIG. 3) of the Kubernetes control plane 604. In some embodiments, the command may include a desired state of a cluster, where the desired state indicates deletion of a pod (e.g., pod 234 of FIG. 2) that executes on a node (e.g., node 228) on which kubelet 606 executes. The API server may be configured to carry out pod deletion in accordance with the command. In some embodiments, the command may be a SIGTERM command indicating a signal to terminate a pod. In some embodiments, deleting a pod may include storing the desired state of the cluster that indicates deletion of the pod.

At step 9, kubelet 606 may obtain the command received at step 13 and/or the desired state based on watching for cluster updates. In some embodiments, the kubelet 606 may have previously executed operations for setting up a Kubernetes watcher to watch for desired state changes for the cluster (e.g., SMC node(s) 114) in which kubelet 606 executes (e.g., on node 228, one of SMC node(s) 114). The watcher may be configured to notify the kubelet 606 based on changes to the desired state of the cluster.

At step 10, kubelet 606 may execute any suitable operations that stop containers (e.g., containers 220, 222, and 224) of the pod (e.g., pod 234) and delete the pod from the node.

At step 11, kubelet 606 may send current state data updating the pod's status. In some embodiments, the status may indicate that the pod (e.g., pod 234) has been deleted.

At step 12, the workflow worker 602 may obtain pod updates. In some embodiments, the workflow worker 602 may have previously executed operations for setting up a Kubernetes watcher to watch for pod status updates. Upon detecting the change in pod status stemming from the update at step 11, the workflow worker 602 may receive the current state data indicating the pod has been deleted.

At step 13, workflow worker 602 may transmit a command (e.g., using ODO operator 122) to Kubernetes control plane 604. The command may be received by an API server (e.g., API server 306 of FIG. 3) of the Kubernetes control plane 604. In some embodiments, the command may include a desired state of a cluster, where the desired state indicates creation of a pod (e.g., a new pod similar to pod 234 of FIG. 2) to execute on a node (e.g., node 228) on which kubelet 606 executes. The API server may be configured to carry out pod creation in accordance with the command. In some embodiments, creation of a pod may include storing the desired state of the cluster that indicates creation of the pod. A controller manager (e.g., controller manager 310) of Kubernetes control plane 604 may respond to the desired state by spinning up a new pod (e.g., pod 234). A scheduler of Kubernetes control plane 604 (e.g., scheduler 312 of FIG. 3) may be assign the pod to a node (e.g., node 228) on which kubelet 606 executes. The scheduler may be configured to notify the API Server of the assignment decision At step 14, kubelet 606 may update the desired state indicating the creation of the new pod (e.g., pod 234) at step 13.

At step 15, kubelet 606 may execute instructions to pull images (e.g., contained in containers 220, 222, and 224) and start the containers of the new pod (e.g., pod 234). In some embodiments, the kubelet 606 communicates with a container runtime (e.g., the container runtime 232 of FIG. 2) via a container runtime interface (not depicted) to manage the new pod. The kubelet 606 may execute any suitable validation operations to ensure that the containers are running in a pod. The kubelet 606 may obtain pod specifications that are provided through various mechanisms to ensure that the containers described in those pod specifications are running and healthy.

At step 16, kubelet 606 may send current state data updating the pod's status. In some embodiments, the status may indicate that the new pod (e.g., pod 234) has been created and/or that the containers (e.g., containers 220, 222, and 224) have been validated as being operational/healthy.

At step 17, the workflow worker 602 may obtain pod updates via a Kubernetes watcher. Upon detecting the change in pod status stemming from the update at step 16, the workflow worker 602 may receive the current state data indicating the new pod has been created successfully.

At step 18, workflow worker 602 may send a command to load balancer 608 instructing load balancer 608 to add a new backend (e.g., the new pod started at step 15).

At step 19, load balancer 608 may execute any suitable instructions for adding the new pod as a backend.

At step 20, workflow worker 602 may poll the load balancer 608 to determine if the work corresponding to adding the new pod has been completed. The workflow worker 602 may continue to poll the load balancer 608 until the data obtained indicates that adding the new pod as a backend has been completed.

Figure 7:
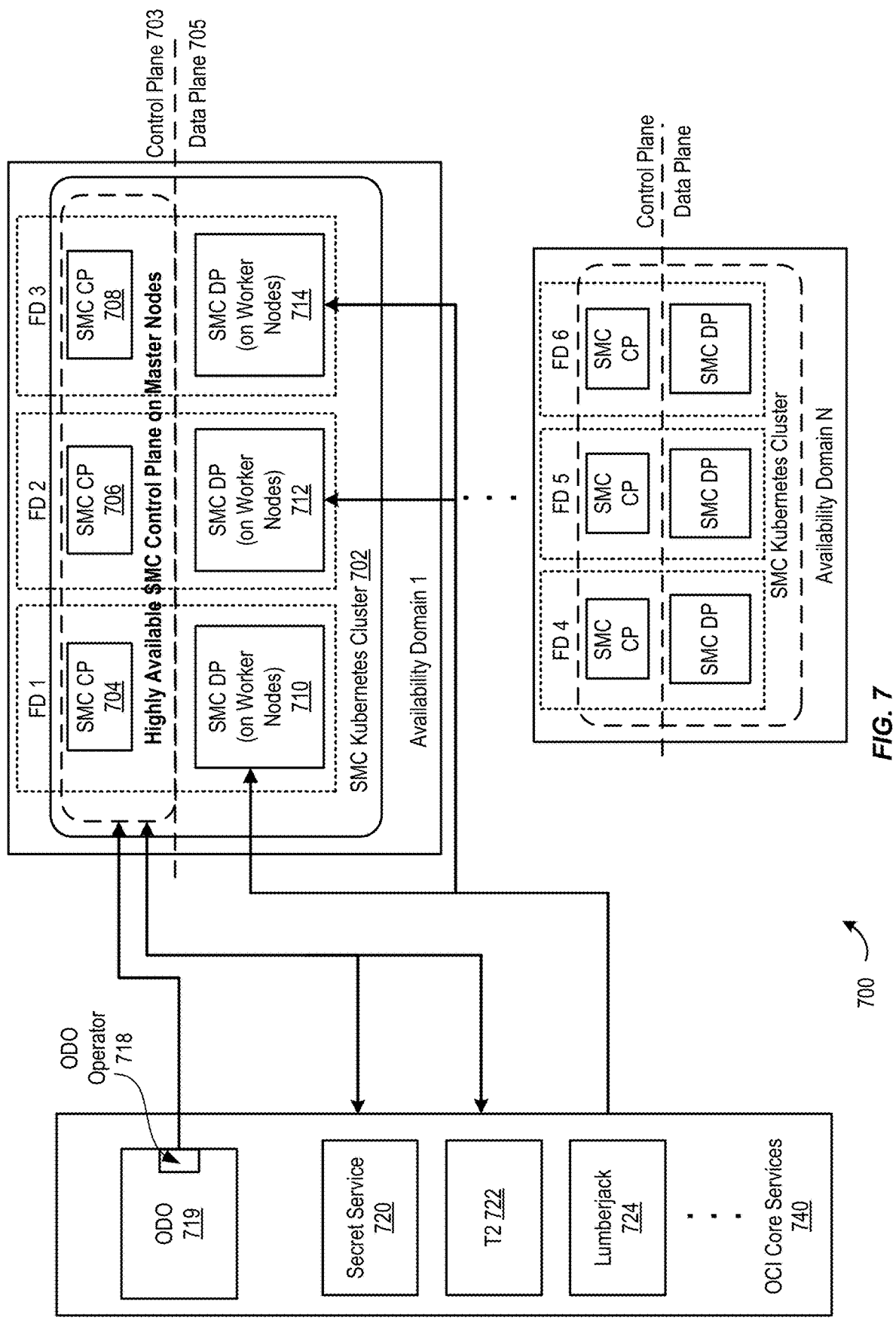
FIG. 7 is a block diagram illustrating an example substrate managed container (SMC) cluster, in accordance with at least one embodiment.

FIG. 7 illustrates a regional view of the SMC offering, in accordance with at least one embodiment. Within the SMC offering, one SMC cluster may be offered per Availability Domain (AD). By way of example SMC Kubernetes Cluster 702 (an example of SMC node(s) 114 of FIG. 1) may be offered via AD 1, while another SMC Kubernetes Cluster may be offered at AD N. Multiple fault domains (FDs) (e.g., FD 1, FD 2, and FD 3) may be provided via SMC Kubernetes Cluster 702. A fault domain is an asset set connected to the same power source. In some embodiments, control plane (CP) components (e.g., SMC CP 504, 506, and 508) may be evenly distributed across fault domains. SMC CP 504, 506, and 508 may include master node(s) 120 of FIG. 1 on which a Kubernetes control plane (e.g., Kubernetes control plane 118 of FIG. 1, Kubernetes control plane 302 of FIG. 3, etc.) executes. In some embodiments, three (or more) replicas of each SMC CP component may be used, preferably evenly distributed among the fault domains, for durability purposes, as depicted with SMC CP 704, 706, and 708.

ODO supports deploying by fault domain, where entire fault domains are deployed in series. This is incompatible with Kubernetes' topology spread constraints, which guarantee that deployments are smeared across fault domains. In some embodiments, each dynamic instance deployed to data plane 705 (e.g., SMC DP 710, 712, and 714, operating on SMC Kubernetes Cluster 702, the SMC node(s) 114 of FIG. 1) will be associated with a specific fault domain, and the SMC DP team may annotate all nodes with their fault domains. When a dynamic instance is created, it may contain a node selector for that fault domain, and the SMC CP (e.g., a scheduler such as scheduler 312 of FIG. 3) may be responsible for scheduling the pod to an appropriate node.

ODO operator 719 and a variety of OCI cores services 740 may be communicatively coupled to control plane 703. For example, ODO 719 may communicate with control plane 703 via ODO operator 718. ODO operator 718 may operate as part of ODO 719, or as a separate component (e.g., a client of control plane 703). For example, components of control plane 703 may communicate with secret service 720. Secret service 720 may be configured to enforce access by mapping a SMC DP node's client certificate to either a SCCP fleet or an ODO application. Secret service 720 may store these client certificates and SMC DPs may be configured with one or more agents or side car applications configured to fetch certificates from secret service and store the fetched certificates at the SMC DP. In some embodiments, certificate fetching may utilize a resource principal. A resource principal (also referred to as a "resource principal session token" or "RPST") may be a credential that serves as a proof of identity. An RPST may be issued by an identity provider and requested by ODO during a provisioning and deployment process. More details about resource principals, their acquisition, and use may be found in U.S. Provisional Patent Application, 63/381,710, file on Oct. 31, 2022, entitled "Utilizing Resource Principals with Substrate Managed Containers." At a high level, a side car application may provide a resource principal session token to secret service 720 to request access. Secret service 720 may send the RPST to the identity provider (e.g., another core service, not depicted here) for validation/authorization. If the identity provider authorizes the request, secret service 720 may provide the certificate(s) for the requesting SMC DP.

OCI cores services 740 may further include T2 722. T2 may include one or more metrics services that enable metrics to be viewed/plotted and accessible through a developer operations (devops) portal. Lumberjack 724 may include a logging service that enables logs to be viewed and filtered via the devops portal. Any suitable number of core services may be included in OCI core services 740 for managing capacity, deployment, metrics, logging, billing, access management, and the like.

Figure 8:
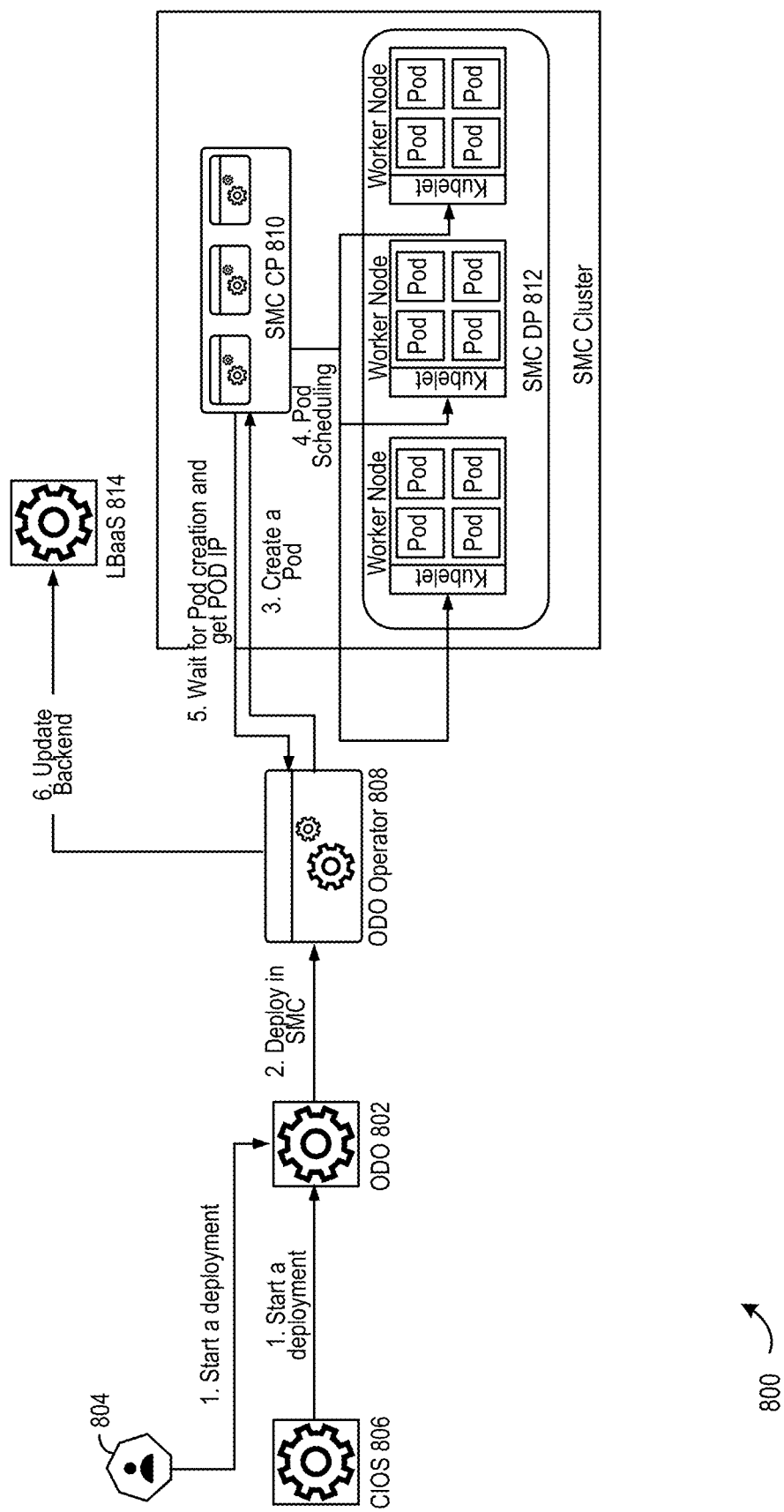
FIG. 8 illustrates a block diagram describing a general overview of the SMC infrastructure offering, in accordance with at least one embodiment.

FIG. 8 illustrates a block diagram 1000 describing a high-level flow illustrating operational steps of performing a deployment within the SMC infrastructure offering, in accordance with at least one embodiment.

At step 1, a deployment may be started. In some embodiments, a deployment request may be received by ODO 802 from user 804 via one or more user interfaces exposed by ODO 802. As another example, a deployment may be initiated through CIOS 806 (also referred to as "Shepherd Regional"), an example of CIOS 132 of FIG. 1, CIOS regional 2110, etc. CIOS 806 may be configured to perform automated deployments according to predefined "flocks" (e.g., configuration files) in which a desired state of the cloud computing environment is expressed in declarative statements. ODO 802 may receive a deployment request from the user 804 or CIOS 806 and may execute any suitable operations for identifying whether to fulfill the request using the static pool 104 of FIG. 1 (associated with deploying to a virtual machine) or the dynamic pool 114 of FIG. 1 (associated with deploying pods). In some embodiments, ODO 802 may determine that the request is to be fulfilled with the dynamic pool and may proceed to step 2. In some embodiments, ODO 802 may transmit the request to a load balancer (not depicted here) which can determine, based on a predefined rule set, that the request is to be fulfilled with container-based virtualization (e.g., pods) and may proceed to step 2.

At step 2, ODO 802 may transmit the request to ODO operator 808. ODO operator 808 may be a SMC client configured to communicate with SMC CP 810, an example of Kubernetes Control Plane 118 of FIG. 1, Kubernetes Control Plane 302 of FIG. 3, control plane 703 of FIG. 7. SMC CP 810 may be configured to operate in the manner described above in connection with Kubernetes control plane 302 of FIG. 3. SMC's tenancy model may be that of Namespace-as-a-Service. Each team may be assigned a namespace for which access control is limited to the namespace only, its workloads, and its Kubernetes objects.

By way of example, at step 3, ODO operator 808 may send a request to create one or more pods (each an example of pod 234 of FIG. 2). In some embodiments, the pod(s) may be "naked" (e.g., having no applications or corresponding files associated with them).

At step 4, these pods may be scheduled by the SMC CP 810 (e.g., by the scheduler 312 of FIG. 3). Scheduling a pod includes identifying placement of the pod at various worker nodes making up the SMC DP 812. Each worker node may execute a Kubelet, an example of Kubelet 312 of FIG. 3. Pod scheduling may be at the discretion of the SMC CP 810. IP addresses may be assigned to each pod so as to enable each pod to be addressable.

At step 5, a response may be provided from the SMC CP 810 to ODO operator 808. In some embodiments, a single response may be received identifying the respective IP address assigned to each pod. In some embodiments, multiple responses may be provided identifying one or more IP addresses assigned to respective pods of SMC DP 812.

At step 6, ODO operator 808 may provide the IP addresses of the pods of SMC DP 812 to a load balancer backend service (e.g., LBaaS 814). The LBaaS 814 may be configured to update the backends to include the new pod(s) of SMC DP 812.

SMC Control Plane

Figure 9:
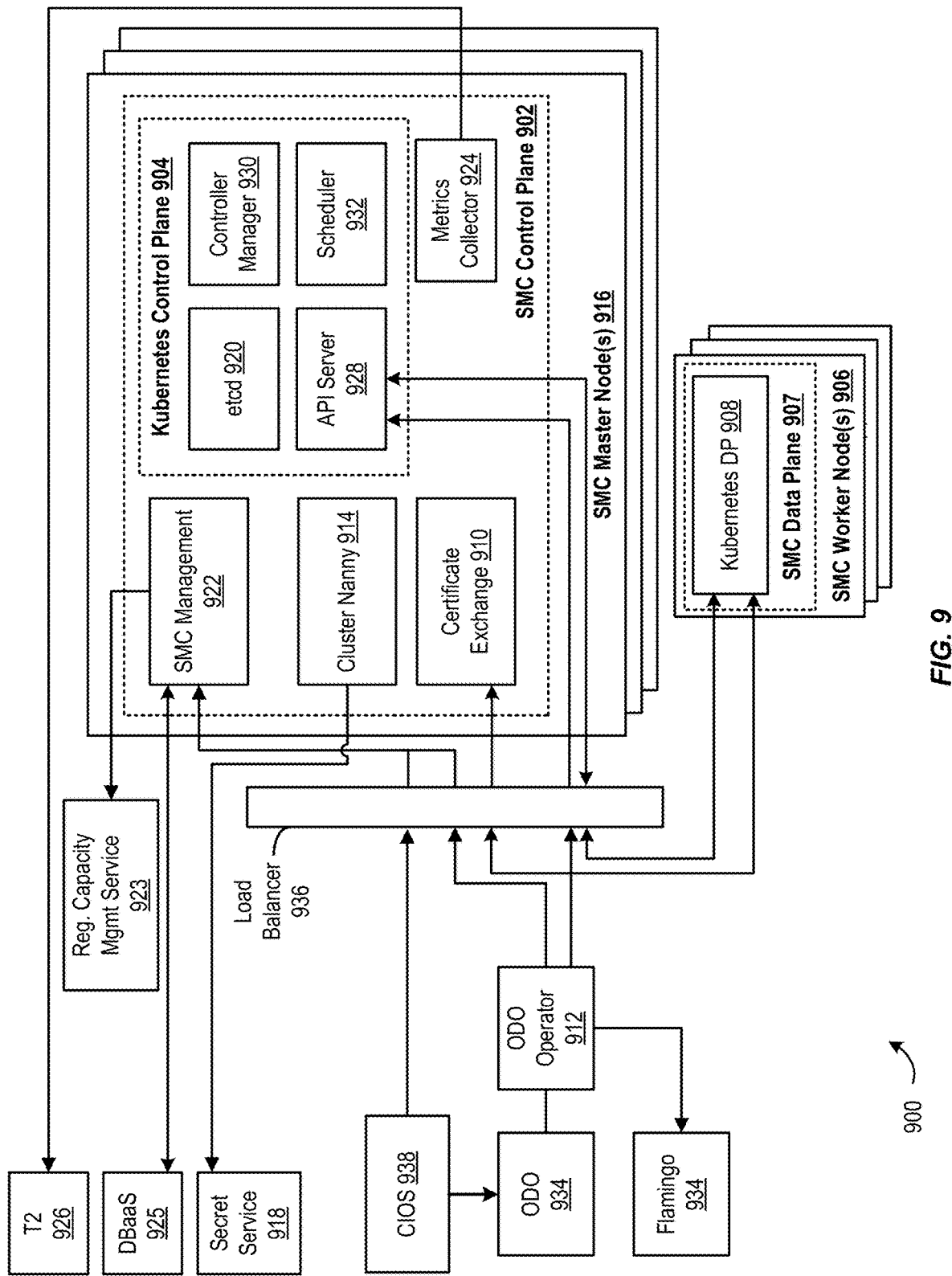
FIG. 9 illustrates a block diagram illustrating an example architecture for an SMC control plane, in accordance with at least one embodiment.

FIG. 9 illustrates a block diagram illustrating an example architecture 1100 for an SMC control plane (e.g., SMC control plane (CP) 902), in accordance with at least one embodiment. SMC control plane 902 may include a portion of a container orchestration platform (e.g., Kubernetes control plane 904, an example of the Kubernetes control plane 302 of FIG. 3 and 118 of FIG. 1). Kubernetes control plane 904 may operate in a similar manner as described above in connection with FIG. 3. In addition to the functionality provided by Kubernetes control plane 904, SMC CP 902 may be configured to handle certificate generation for the Kubernetes cluster (e.g., SMC worker node(s) 906, examples of the SMC Node(s) 114 of FIG. 1), certificate rotation, namespaces and quota management, and role-based access control (RBAC) rules assignment for access control. Each of the SMC worker node(s) 906 may host the SMC data plane 907 (e.g., the data plane 705 of FIG. 7), which may include Kubernetes data plane (DP) components (e.g., Kubernetes DP 908) which are discussed in further detail in FIG. 11.

As mentioned above in connection with FIG. 7, three replicas of each SMC CP component (preferably evenly distributed among the fault domains) may be used. This may comprise a 3-replica etcd set and high availability for the other CP components, which may be stateless. Etcd clusters are best replicated in odd counts due to the implementation details of the Raft consensus algorithm for achieving quorum and leader election. An even-numbered (N+1) etcd replica has no added benefit to fault-tolerance compared to an odd-numbered (N) one on the same topology. However, a greater number of replicas (e.g., five, seven, etc.) may be utilized in dense regions to withstand the load due to worker nodes' count and the number of generated event objects. As a cluster reaches the large-scale limits, dedicated etcd cluster instance may be set up for events storage and horizontally scale the control plane instances.

Individual SMC CP components may be deployed as separate ODO applications to the same pool of nodes. Therefore, each instance of the SMC CP components can be co-located on the same node and have access to the same file system, as shown in FIG. 9. This provides the benefit of simplifying the bootstrapping and certificate management of the cluster.

SMC CP 902 may include certificate exchange 910. In some embodiments, the certificate exchange 910 is a service that authenticates the worker nodes' kubelets and provides them with the configuration (e.g., kubeconfig) needed to join the SMC cluster. In some embodiments, the certificate exchange 910 may use PKI certificates of the OCI fleets that are deployed by the PKI service (not depicted) to the SMC worker node(s) 906. In some embodiments, the certificate exchange 910 only whitelists the SMC data plane fleet for security. In other words, once the certificate exchange 910 authenticates a Kubelet using the fleet OCID in the subject name and the certificate authority of the provided client certificate, the Kubelet is able to connect to CP and for the worker node to join the cluster. Certificate exchange 910 may also be configured to provide the kubeconfig for the ODO operator 912 (an example of the ODO operator 518 of FIG. 5 and 122 of FIG. 1). Certificate exchange 910 may be configured to validate ODO's service principal certificate and serve the kubeconfig for the ODO service account.

SMC CP 902 may include cluster nanny 914. The cluster nanny 914 may have multiple roles. First, the cluster nanny 914 may be configured to generate private keys and certificates for the cluster (e.g., SMC master node(s) 916, SMC worker node(s) 906, etc.), including certificate authority (CA) certificates and mTLS certificates (both client and server for Kubernetes CP 904, Kubernetes DP 908, API Server 928, etcd 920 communications, etc.), and upload the CA certificates to Secret Service 918 (an example of secret service 720 of FIG. 7). In some embodiments, the cluster nanny 914 may assign generate private keys and certificates. These certificates may be provided to an identity access management service (e.g., one of OCI core service(s) 740 of FIG. 7). The identity access management service may be configured to manage access control to cloud resources within the cloud computing environment. In some embodiments, the identity access management service may be configured to accept the certificates assigned by the cluster nanny 914 and utilize these certificates for to manage access control for the corresponding components. In some embodiments, the cluster nanny 914 may be configured to implement a rotation of the CA certificates, regenerate the certificates using the new CA, and update the CA certificates in Secret Service 918. The cluster nanny 914 may also be configured to perform periodic backups of etcd 920 (an example of etcd 308 of FIG. 3).

Each master node of SMC master node(s) 916 may include an instance of cluster nanny 914. A particular cluster nanny instance may be assigned as a leader Nanny (e.g., through a leader election process) and configured to handle CA certificates rotation and etcd backup to avoid conflicts. The leader may be configured to acquire an etcd lock using an etcd concurrency API. The other nanny instances may be configured to ensure that the node's CA certificate is in sync with the one maintained in secret service 918. If the CA certificate mismatches, the respective nanny may download the new certificate and regenerate the new private keys and certs based on the new CA cert.

SMC CP 902 may include SMC management 922. SMC management 922 may operate as an endpoint for registering namespaces and quotas for onboarding services. In some embodiments, namespace and quota information may be provided to a database service (DBaaS 925) for persistent storage. SMC management 922 may operate as the source of truth for SMC clients such as the ODO operator 912 about the cluster's quota and namespaces. Kubernetes Namespaces may be used as a grouping and isolation mechanism for service teams' resources in the SMC cluster. Unlike OCI Compartments, namespaces are non-hierarchical and therefore do not provide capabilities such as inheritance. Role based access control (RBAC) rules may be assigned to namespaces during creation. SMC management 922 may be configured to keep records of registered services' namespaces, their maximum quota caps, and the overall cluster utilization. SMC management 922 can prevent oversubscription of the SMC cluster by rejecting quota requests that exceed the capacity of the cluster or the maximum limit associated with a service. SMC management 922 can provide alarms to the region capacity management service 923 (e.g., a service configured to manage region capacity) as the cluster approaches the limit capacity to request additional capacity.

SMC CP 902 may include metrics collector 924. Metrics collector 924 may be configured to poll for the metrics published by the Kubernetes control plane 904 and push them to T2 926 (an example of T2 722 of FIG. 7) for monitoring and alarming. Metrics collector 924 may be configured to collect metrics from each application and submit those metrics to T2 722.

SMC CP 902 may include API server 928 (an example of API server 306 of FIG. 3) as part of Kubernetes control plane 904. API server 928 may be configured as a RESTFUL API for the Kubernetes control plane 904. API server 928 may be utilized to carry out cluster operations such as deployment and pod deletion and querying the cluster state and its objects. API server 928 may be stateless and may be utilized to use etcd 920 as storage. The ODO operator 912 may use API server 928 to initiate and manipulate deployments on the SMC cluster.

SMC CP 902 may include etcd 920 (an example of etcd 308 of FIG. 3) as part of Kubernetes control plane 904. Etcd 920 may be a distributed key/value storage used by Kubernetes control plane 904 to store all cluster data. Etcd 920 may rely on a RAFT Consensus Algorithm to elect a leader and achieve strong data consistency. The cluster nanny 914 may ensure regular backup of etcd 920 for disaster recovery.

SMC CP 902 may include controller manager 930 (an example of controller manager 310 of FIG. 3) as part of Kubernetes control plane 904. Controller manager 930 may include any suitable controller shipped with Kubernetes, such as Replication Controller and Namespace Controller, etc., as a part of its binaries. Controller manager 930 represents the Kubernetes control loop which automatically responds to new events by checking the API server 928 and performs operations to modify the cluster state to match the desired cluster state. For example, upon manual deletion of a pod (an event), the ReplicaSet Controller will try to spin up a new pod (modifying cluster state) for the replica count to match that of the Replica Spec (the desired state).

SMC CP 902 may include scheduler 932 (an example of scheduler 312 of FIG. 3) as part of Kubernetes control plane 904. Scheduler 932 may be configured to perform operations to assign pods to cluster nodes (e.g., SMC worker node(s) 906). Upon creating a new pod, scheduler 932 may compile a list of feasible nodes (a "candidate list") in which the pod can be placed. This is referred to as filtering. The nodes in the candidate list may be scored based on constraints and criteria such as resource requirements and node affinity. The pod may be assigned to the node with the highest score. The scheduler 932 may be configured to notify the API server 928 of the assignment decision. The API server 928 may handle communicating with the selected node's Kubelet to spawn the pod and deploy its containers.

ODO operator 912 may be an SMC client configured to handle deployment on the SMC cluster(s) and reconcile state with OCI's core services such as a Flamingo 934 (e.g., a load balancing service configured to manage any suitable number of load balancers such as load balancer 936). The ODO operator 912 may call the API server 928 (part of the Kubernetes control plane 604 of FIG. 6) in the SMC cluster to create pods (or workload objects, containers, etc.), and then waits for their successful creation as described above in connection with FIG. 6. If creation is successful, ODO operator 912 may receive the IP addresses assigned to the pods and may communicate these IP addresses to Flamingo 934. CIOS 938 may be used to initiate a deployment and/or to provide namespace and/or quota data.

Bootstrapping a Kubernetes cluster may include 1) generating CA certificates and private keys, 2) generating private keys and certificates for etcd nodes for peer communication, 3) generating private keys and mTLS server certificates for the API server, client certificates for API server to communicate with etcd, and client certificates for kubelets to communicate with API server, 4) generate other private keys and certificates such as front proxy (an aggregation server), 5) generate user accounts and configuration files for cluster administration, controller manager, scheduler, and kubelets.

Once the certificates, keys, and configuration data described above are created, a number of etcd instances may be started. Thereafter, the API server may be started, followed by the scheduler and controller manager. A copy of a Kubelet.conf configuration file generated by the certificate exchange may be copied to all worker nodes. This copy may be performed manually or automatically. Thereafter, each Kubelet may be started on the worker nodes.

Bootstrapping an SMC cluster may follow the same sequence as described above, but with SMC components performing the steps the Kubernetes leaves to the admins to perform. By way of example, cluster nanny 914 may be deployed first through ODO 934 (an example of ODO 102 of FIG. 1). Multiple instances of cluster nanny 914 may be deployed (potentially one at a time) on the SMC master node(s) 916. In some embodiments, cluster nanny 914 may be configured to check secret service 918 for valid CA certificates and private keys. If none are found, cluster nanny 914 may generate them and upload them to secret service 918. Otherwise, the cluster nanny 914 may download the secrets from secret service 918. Cluster nanny 914 may generate the rest of the certificates in the certs of the SMC master node(s) 916, which are accessible to all CP containers using the CA. Cluster nanny 914 may generate the user accounts and .conf files. These certificates and config files may now be available on the file system, which all CP services on the same node may share.

In some embodiments, instances of etcd 920 may be deployed next, each as an ODO application (e.g., one instance at a time). Each etcd instance may be deployed with hostnames of the peer cluster members. API server 928 may be deployed with hostnames of the peer cluster members. API server 928 may be deployed as an ODO application with access to the generated certificates on the file system. Scheduler 932, controller manager 930, and certificate exchange 910 may be deployed (e.g., one instance at a time) with access to the generated configuration files (e.g., .conf files) and certificates on the file system.

When a worker node is first deployed, a kubelet operating on the worker node may send a request to certificate exchange 910 using a fleet certificate. The certificate exchange 910 may authenticate the kubelet by: 1) verifying a root CA of the client certificate, and 2) determining that the fleet identifier (e.g., an OCID) in the subject name is whitelisted. Thereafter, the kubelet's worker node may the SMC cluster as one of SMC worker node(s) 906.

Automating CA rotation is more complex than the initial certificate generation during bootstrapping since it may require rebooting the Kubernetes CP services after generating the new certs without causing downtime. Except for etcd, Kubernetes CP components may not support dynamic certificate reloading. Both old and new CAs may to be accepted until all kubelets have updated their configuration files/client certificates by calling certificate exchange 910. This will be triggered with enough time buffer before the old CA expiry for kubelet configurations to be recycled with the new CA certificates.

Automated CA rotation may be performed as follows. Some time (e.g., a few weeks, etc.) before the CA certificates expire or when a force-rotate-CA flag is set to true, the leader cluster nanny (e.g., cluster nanny 914) of the SMC cluster (an acquirer of the distributed lock from etcd 920) may perform the following operations. The leader cluster nanny may: 1) back up the old certificates in secret service 918, 2) generate new CA certificates, 3) update CA certificates in secret service 918 while keeping the old CA information, and 4) trigger an ODO deployment for the SMC control plane 902. These steps may ensure that the control plane components are drained and reinitiated in a strict sequence to avoid service disruption.

When cluster nanny 914 is deployed, it may generate the cluster certificates and configs with the new CA. The cluster nanny 914 may update all service account tokens with the new CA. The etcd instances (e.g., including etcd 920) may reload the new certificates. API server 928 may be deployed and started with flags (e.g., "--client-ca-file" and "--kubelet-certificate-authority") set to both old and new CAs based on the values found in the secrets store maintained by secret service 918. Controller manager 930 may be deployed and started, which loads the new certificates. The scheduler 932 may be deployed and loaded with a flag (e.g., "--client-ca-file") set to both old and new CAs based on the values found in the secrets store maintained by secret service 918. After kubelet configs are updated (which can be determined by a metric tracked by certificate exchange 910 or by each kubelet). In some embodiments, the old certificates are deleted and removed from the records maintained by secret service 918 when they expire or when a force-delete-old-CA flag is deployed. Since the certificates may no longer be maintained in the records associated with secret service 918, the SMC control plane 902 may be loaded with only the new CA during the next boot.

One way to mitigate the risks of CA rotation or failure during certificate generation is to ensure that the process starts over a threshold time period (e.g., two weeks, three weeks, etc.) before the CA certificates expire. This ensures the old CA certificate is trusted until the new CA is successfully generated and all worker nodes and ODO operator instances have successfully been served with the updated kubeconfig. Any failure during the CA rotation sequence may result in an alarm being triggered to the SMC Operations team (after retrying) to manually intervene while the cluster continues to be fully functional as the old CA would continue to be trusted.

The cluster nanny 914 can be configured to make frequent backups of etcd 920 uploading them to an object store (not depicted here). The leader cluster nanny (the acquirer of a distributed lock from etcd 920) may perform the backups. The backup bucket in the object store (e.g., OCI Object Store) may be region replicated to account for region-wide outages. This introduces a dependency on object store that can be rectified in the future by creating replica backups on persistent volumes.

One goal using SMC clusters, is to ensure better utilization of the service enclave. This can be achieved by centrally managing service enclave capacity and assigning workloads to the nodes based on the runtime resource utilization of the worker nodes and the workloads' scheduling requirements. Scheduler 932 can provide the latter out of the box with great configurability. In conventional implementations, teams request capacity based on their projected peak load due to the lack of autoscaling and autoscaling rules. Since team capacity is dedicated to the use of their workloads, that leaves a large percentage of the capacity unutilized during non-peak times.

The worst-case scenario would be that all services will consume maximum utilization and will be scheduled in the same configuration as that of the current infrastructure. However, having all teams achieve peak load at the same time is unlikely and may be handled gracefully with autoscaling and auto-healing enabled. During those non-peak times, excess capacity can be utilized for running scheduled jobs or serverless tasks which can be evicted on peak load. Extra capacity may be reserved for worker nodes failover and SMC operational overhead.

There are three possible tenancy models in Kubernetes:
1. Namespace-as-a-Service: where each tenant is assigned one or more namespace(s) to which workloads are assigned. Cluster Resources are shared but all tenants. However, Network policies, RBAC rules, and resource quota are set per namespace.
2. Clusters-as-a-Service: where there is one cluster per tenant.
3. Control Plane-as-a-Service: where the cluster is shared. However, each tenant has a dedicated control plane. This constitutes a virtual cluster. This model is easiest to implement with a Super Cluster that is made of multiple Virtual Clusters.

In some embodiments, the tenancy model employed by SMC will be that of Namespace-as-a-Service. Each service team may be assigned a namespace for which access control is limited to the namespace only, its workloads, and its Kubernetes Objects.

Kubernetes may support secrets management. During deployments, ODO operator 912 may be configured to write the resource principal secret in the team's namespace, subsequently being mounted into the workload's pods. A side-car container or CSI plugin (e.g., resource principal agent 130 of FIG. 1) may be utilized to fetch required secrets to a mounted volume from secret service 918 using the resource principal as described above in connection with FIG. 1. A side car container or CSI plugin (e.g., KPKI provider 128 of FIG. 1) may also be provided for PKI certificates refreshing as described in FIG. 1.

Object labeling may be leveraged for several purposes, such as node affinity, defining workload's pod spread, and scheduling constraints. For example, by labeling nodes with the assigned fault domain, scheduling constraints may be defined to ensure even pod distribution among fault domains, ensuring high availability. In some embodiments, the scheduler 932 may attempt to spread the pods of the workload evenly among fault domains based at least in part on the node labels.

By labeling nodes with hardware features such as "NVMe" (e.g., Non-Volatile Memory Express), scheduling workloads may be assigned based on hardware requirements (or even OS requirements) if needed. For example, MyWorkload labeled pods could only be assigned to nodes with disktype as "NVMe." Although such a label may not prevent other workloads from being assigned to nodes with disktype "NVMe" even if they do not define a node affinity. For exclusive assignment to specific nodes, taints and tolerations can be employed. In which case, nodes with defined taint will only be assigned pods with tolerance to the taint. This is recommended for scarce hardware resources such as GPU nodes. To accommodate requirements such as colocation of microservices or low latency local cache, scheduling rules can be defined to cause workload pods to be assigned to nodes hosting pods of specific labels.

In some embodiments, pods can be deployed to a sandboxed environment such as Kata, which runs a dedicated kernel, provides network, I/O, and memory, and can utilize hardware-enforced isolation with virtualization VT extensions.

User groups in each team-assigned namespace can be bound to RBAC rules that grant minimum access control to facilitate operations. Each role may specify the authorizations to specific Kubernetes objects such as pods, secrets, etc. RBAC rules may be additive, and they can be defaulted to deny unless otherwise stated in the rule. An identity provider (e.g., a cores service of OCI core services 740 of FIG. 7) using, for example, a custom webhook for access management.

Secrets can be encrypted by passing an encryption configuration to API server 928 that controls how they are encrypted in etcd 920. The encryption key may be generated during cluster bootstrapping and is stored in secret service 918 similar to the cluster CA certificates.

Communications between SMC CP 902 and Kubernetes DP 908 (including kubelet 314 of FIG. 3 and kube proxy 318 of FIG. 3) may use HTTPS over mTLS.

Metrics collector 924 may be configured to collect application metrics and SMC data plane metrics (e.g., metrics associated with SMC worker node(s) 906 and/or Kubernetes DP 908). Application metrics may be collected by each application and submitted to T2 926. Some applications may rely on the availability of a host metrics collector to post metrics to T2 926. In some embodiments, these applications may need to change their submission via direct interaction with T2 926 using resource principals. SMC DP metrics may be collected on a per worker node basis. Kubernetes supports aggregation of metrics via deployment of a metrics-server. On the data plane side, metrics can be collected and posted to T2 926, independent of the node's communication with the control plane. Each Kubelet provides a rich set of metrics over a local port (e.g., local port 10250). These may be enabled, and when enabled, the kubelet can provide service, system and container metrics (cadvisor). The current metrics may be designed to work with a prometheus server. Therefore, these metrics may need to be converted to work with T2 926. In some embodiments, a prometheus server may be integrated into the SMC control plane 902 or within OCI as a whole. In this case, the metrics need not be converted.

Each team may be responsible for logging. Each workload may include a chainsaw/chainsaw2 agent (e.g., a logging agent) configured to send metrics to lumberjack (e.g., Lumberjack 724 of OCI core services 749 of FIG. 7). For SMC related logging, a similar design may be used. In some embodiments, SMC DP may build its own workload pods that can collect specific logs from the file system. In some embodiments, the operating system (e.g., Evergreen) utilized by the SMC DP components may provide a mechanism to collect logs that may be used, for example running a side car container in each pod.

Figure 10:
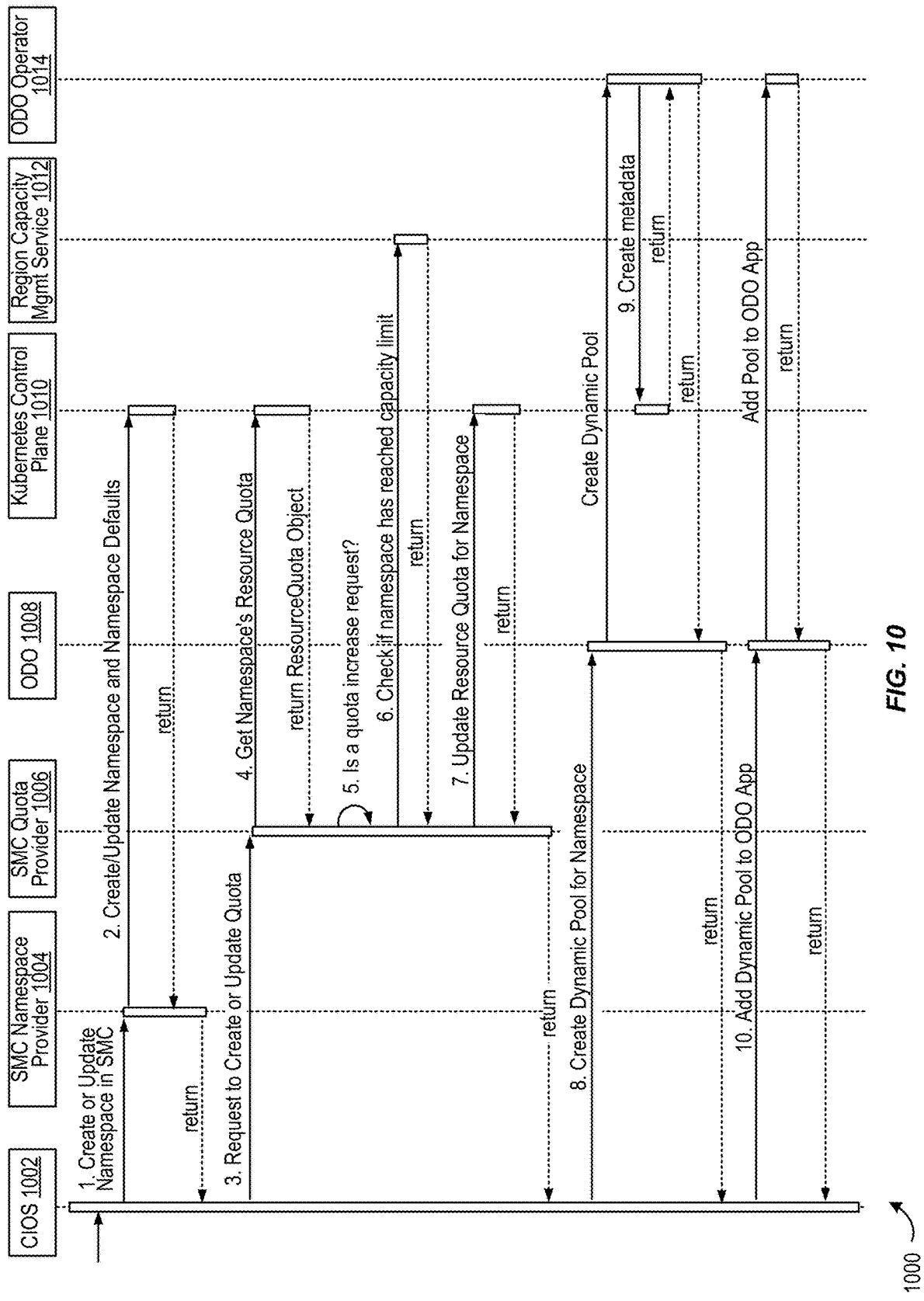
FIG. 10 illustrates a flow diagram illustrating an example method for performing namespace registration and quota requests, in accordance with at least one embodiment.

FIG. 10 illustrates a flow diagram illustrating an example method 1000 for performing namespace registration and quota requests, in accordance with at least one embodiment. The method 1000 may be performed using CIOS 1002 (an example of CIOS 132 of FIG. 1, CIOS 2110 of FIG. 21, etc.), SMC Namespace Provider 1004, SMC Quota Provider 1006, ODO 1008 (an example of ODO 934 of FIG. 9 and 102 of FIG. 1), Kubernetes control plane 1010 (an example of Kubernetes control plane 904 of FIG. 9), Region Capacity Management Service 1012 (an example of region capacity management service 923 of FIG. 9), and ODO operator 1014 (an example of ODO operator 912 of FIG. 9). In some embodiments, the functionality of SMC Namespace Provider 1004 and SMC Quota Provider 1006 may be provided by SMC management 922 of FIG. 9. Thus, in some cases, SMC Namespace Provider 1004 and/or SMC Quota Provider 1006 may operate as part of SMC management 922.

At step 1, CIOS 1002 may send (in response to user input and/or as part of a region build) a request to SMC Namespace Provider 1004 to create (or update) a namespace in SMC.

At step 2, SMC Namespace Provider 1004 may transmit a request to create (or update) the namespace and namespace defaults to Kubernetes control plane 1010 (e.g., via API server 928 of FIG. 9). Kubernetes control plane 1010 may create (or update) its corresponding namespace data and/or namespace defaults according to the request and return a response to SMC Namespace Provider 1004, which in turn may return a response to CIOS 1002. The response(s) may indicate the creation (or update) was successful or unsuccessful.

At step 3 (or at any suitable time), the CIOS 1002 may send (e.g., in response to user input and/or as part of a region build), a request to create or update quota values to SMC Quota Provider 1006. As described above, in some cases SMC management 922 may act as SMC Quota Provider 1006.

At step 4, SMC Quota Provider 1006 may transmit a request to obtain a given namespace's resource quota value(s). This request may be transmitted to Kubernetes control plane 1010 (e.g., via API server 928). Kubernetes control plane 1010 may be configured to return a resource quota object which identifies any suitable resource quota values for that namespace.

At step 5, SMC Quota Provider 1006 may be configured to identify whether the request received at step 3 is requested to increase quota.

If so, SMC Quota Provider 1006 may be check whether the namespace has reached a capacity limit at step 6. To perform this check, the SMC Quota Provider 1006 may request capacity limit information from the Region Capacity Management Service 1012 and receive any suitable corresponding data in return. Using the data provided by the Region Capacity Management Service 1012, the SMC Quota Provider 1006 may identify whether the namespace has reached its capacity limit. If it has, the increase may be denied. Otherwise, the method 1000 may proceed to step 7, where the resource quote for the namespace may be updated.

At step 8, CIOS 1002 may transmit data to create a dynamic pool for the namespace. This transmission may be transmitted to ODO 1008, which then in turn may transmit the data it received to ODO operator 1014.

At step 9, ODO operator 1014 may be configured to create the dynamic pool and any suitable corresponding metadata utilizing the Kubernetes control plane 1010. Kubernetes control plane 1010 may return any suitable data related to the dynamic pool to ODO operator 1014, which in turn may return that data to CIOS 1002 through ODO 1008.

At step 10, the CIOS 1002 may request that the dynamic pool be assigned to an ODO application by sending the request to ODO 1008, which may forward the request to ODO operator 1014. The ODO operator 1014 may deploy the application to the SMC clusters in the assigned namespace. This may enforce the quota limits and security roles assigned during the infrastructure deployment. ODO operator 1014 may return a response through ODO 1008 to CIOS 1002 indicating whether the assignment was successful and if the dynamic pool was added to the ODO application.

In summary, when a service is onboarded to SMC, a team may add SMC namespace and quota limits as resources (e.g., Terraform resources) to their infrastructure configuration (e.g., the team's "flock"). SMC Terraform providers can translate the resources into namespaces and quota limits creation/update requests to SMC namespace and Quota provider(s) (e.g., SMC management 922) via an API for each cluster in the execution target's region. The SMC namespace provider can create/update the namespaces by calling the API server (e.g., API server 928) in the cluster if needed. Upon namespace creation, the namespace is assigned quota caps that are not to be exceeded by the namespace's workloads. Teams can request a cap increase by submitting a manual ticket to the SMC operations team (who can then submit a quota cap increase via SMC quota provider 1006). The SMC quota provider 1006 (e.g., SMC management 922) may be configured to reject any quota limit increase that will cause service teams to exceed the defined quota cap. Also, Kubernetes control plane 1010 may be configured to fail deployments that require quotas more than the allowed namespace's assigned quota limit. The SMC quota provider 1006 (e.g., SMC management 922) may also be configured to reject any quota requests that cause the cluster to exceed its threshold capacity to prevent oversubscription. The threshold capacity may be set lower than the actual maximum of the cluster to provide reserve capacity for SMC-specific operations or node failover. The reserve nodes may have taints that prevent the scheduler (e.g., scheduler 932 of FIG. 9) from assigning pods to them except for workloads with tolerances to those taints. When approaching the cluster threshold, the SMC management 922 may be configured to create a ticket for the SMC operation team to request more capacity in the region's clusters. Additionally, the pod overhead may be set for the scheduler 932 to account for the system resource consumption of the container runtime when deciding on pod placement.

Figure 11:
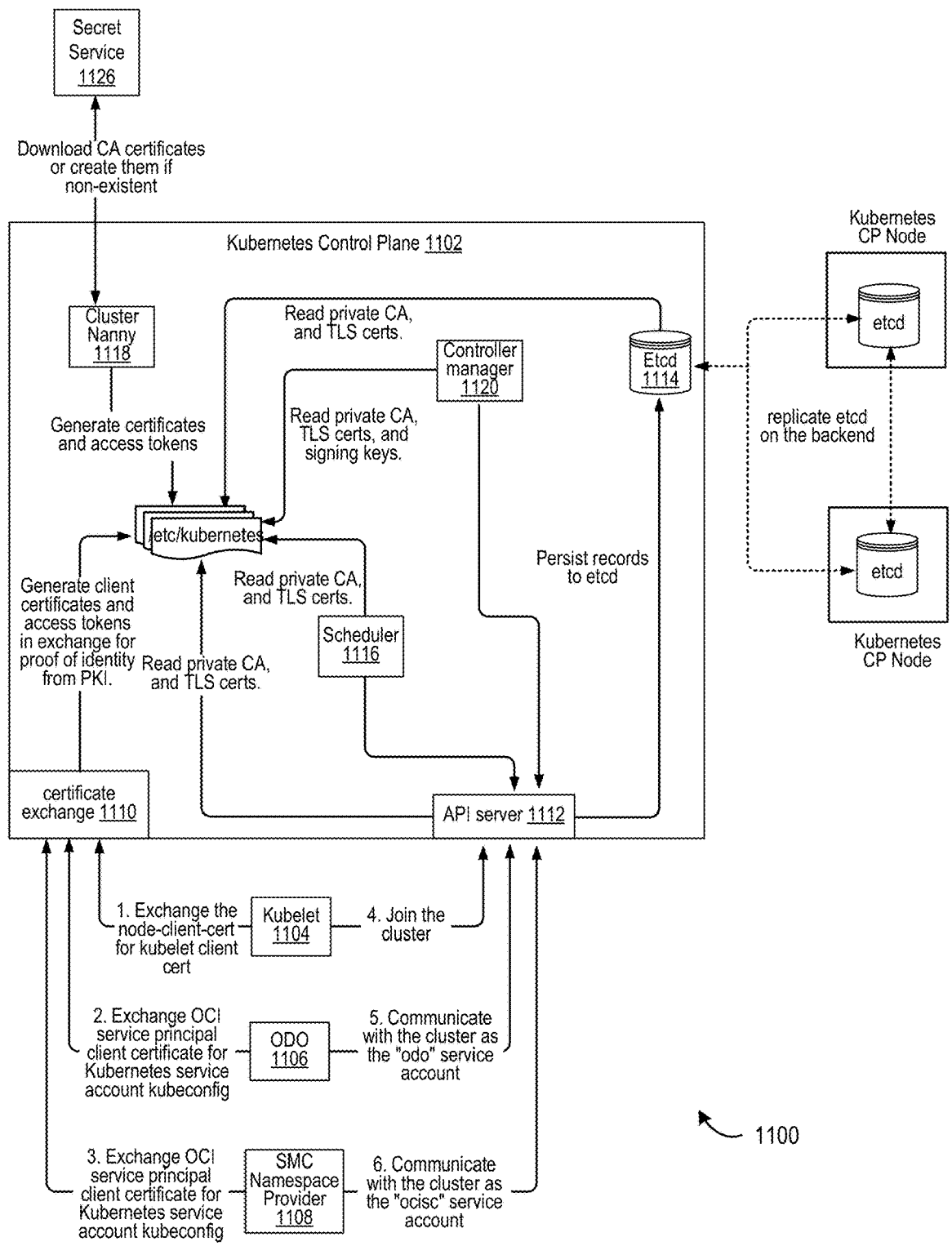
FIG. 11 illustrates a flow diagram illustrating an example method for performing key rotation, in accordance with at least one embodiment.

FIG. 11 illustrates a flow diagram illustrating an example method 1100 for performing key rotation, in accordance with at least one embodiment. The method 1100 may be performed by the components of Kubernetes control plane 1102 (an example of the Kubernetes control plane 904 of FIG. 9, 302 of FIG. 3, and 118 of FIG. 1). The Kubernetes control plane (CP) 1102 may be in communication with kubelet 1104 (an example of kubelet 116 of FIG. 1 executing on SMC node(s) 114 of FIG. 1, a set of data plane nodes of the SMC cluster). ODO 1106 (an example of ODO 934 of FIG. 9 and 102 of FIG. 1) and SMC namespace provider 1108 (an example of the SMC management 922 of FIG. 9) may be in communication with Kubernetes CP 1102 as well. At any suitable time, cluster nanny 1118 (an example of the cluster nanny 914 of FIG. 9) may be configured to check secret service 1126 (an example of secret service 918 of FIG. 9) for valid CA certificates and private keys. If none are found, cluster nanny 1118 may generate them and upload them to secret service 1126. Otherwise, the cluster nanny 1118 may download the secrets from secret service 1126. Cluster nanny 1118 may generate the rest of the certificates, the user accounts, access tokens, and .conf files. These certificates, token, and .conf files may now be available on the file system, which all CP services on the same node may share.

When a worker node is first deployed, the kubelet 1104 may send a request to certificate exchange 1110 using a fleet certificate at step 1. The certificate exchange 1110 may authenticate the kubelet by: 1) verifying root CA of the client certificate, and 2) determining that the fleet OCID in the subject name is whitelisted. Thereafter, the kubelet's worker node joins the SMC cluster at step 2.

Automating CA rotation is more complex than the initial certs generation during bootstrapping since it requires rebooting the Kubernetes CP services after generating the new certs without causing downtime. Except for etcd, Kubernetes CP components may not support dynamic certificate reloading. Both old and new CAs may be accepted until all kubelets have updated their configuration files/client certificates by calling certificate exchange 1110. This may be triggered with enough time buffer before the old CA expiry for kubelet configurations to be recycled with the new CA certificates.

The cluster nanny 1118 (a leader cluster nanny) may: 1) back up the old certificates in secret service 1126, 2) generate new CA certificates, 3) update CA certificates in secret service 1126 while keeping the old CA information, and 4) trigger an ODO deployment for the SMC Control Plane. These steps ensure that the Control Plane's components are drained and reinitiated in a strict sequence to avoid service disruption.

When cluster nanny 1118 is deployed, it can generate the cluster certificates and configs with the new CA. The cluster nanny 1118 may update all service account tokens with the new CA. The etcd instances (including etcd 914) may reload the new certificates. When API server 912 (an example of API server 928 of FIG. 7) is deployed and started with flags (e.g., "--client-ca-file" and "--kubelet-certificate-authority") set to both old and new, or at any suitable time, may read private CA and TLS certificates. Controller manager 920 (an example of controller manager 930 of FIG. 7) may be deployed and started, which loads the new certificates. The scheduler 916 (an example of controller manager 732 of FIG. 7) may be deployed and loaded with a flag (e.g., "--client-ca-file") set to both old and new CAs based on the values found in the secrets store maintained by secret service 1126. After Kubelet configs are updated (which can be determined by a metric tracked by certificate exchange 1110 or by each Kubelet). In some embodiments, the old certificates are deleted and removed from the records maintained by secret service 1126 when they expire or when a force-delete-old-CA flag is deployed. Since the certificates are no longer maintained in the records associated with secret service 918, the SMC control plane 902 will be loaded with only the new CA during the next boot.

Subsequently, at step 1, the kubelet 1104 may exchange the node-client-cert for a kubelet client certificate by providing the node-client-cert to certificate exchange 1110 (an example of certificate exchange 910 of FIG. 9). ODO 1106 may likewise exchange an OCI service principal client certificate for a Kubernetes service account "kubeconfig" at step 2. SMC namespace provider 906 may exchange the OCI service principal client certificate for the kubeconfig at step 3.

At step 4, the kubelet 1104 may transmit data to API server 912 to join the cluster. ODO 1106 may communicate with the cluster as the "odo" service account at step 5, and the SMC namespace provider 1108 may communicate with the cluster as the "ocisc" service account at step 6.

SMC Data Plane

Figure 12:
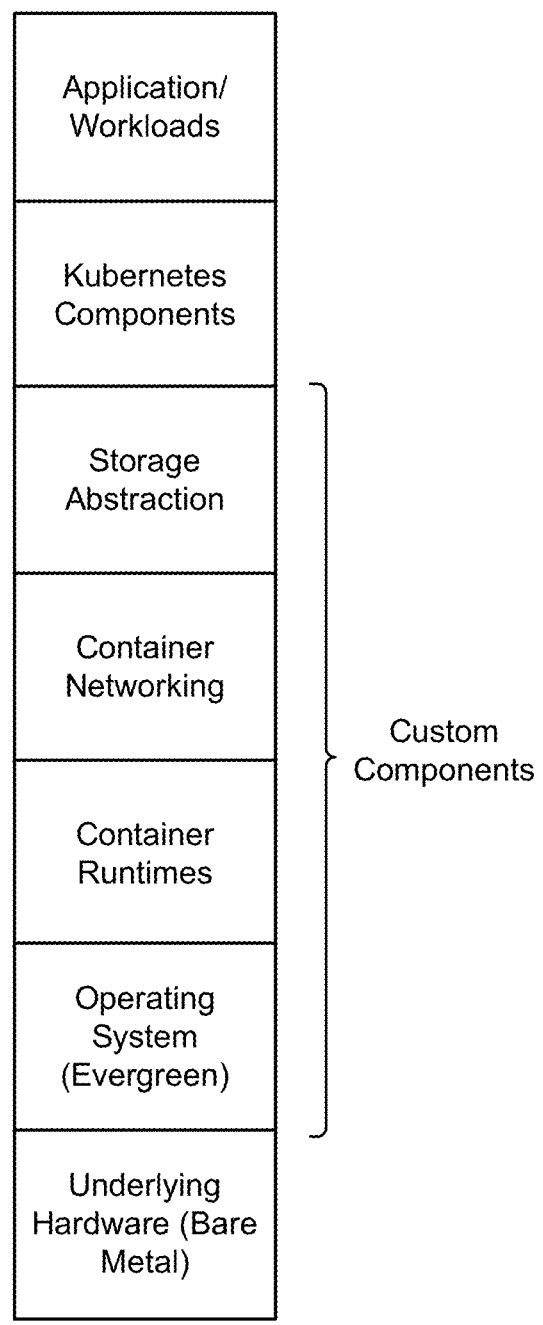
FIG. 12 is a block diagram that depicts the data plane as a stack of components, according to at least one embodiment.

Moving on to the SMC data plane. The SMC data plane can be seen as a stack of components. FIG. 12 is a block diagram that depicts the data plane as a stack of components (e.g., stack 1200), according to at least one embodiment. These components may be sourced from Oracle Linux and the OKE team (which in turn sources some of these components from Oracle Linux in addition to Kubernetes upstream components). As can be seen in FIG. 12, the data plane abstracts the underlying hardware and OS details. The details of the underlying OS, container runtime, network interface, storage are abstracted. Only the underlying computer architecture, which impacts build binaries is exposed.

The data plane provides the following functionality. First the data plane interacts with the Kubernetes control plane (e.g., Kubernetes control plane 904 of FIG. 9, 302 of FIG. 3, 118 of FIG. 1, etc.) to carry out a variety of operations. These operations may include, but are not limited to: spawning new pods, communicating the status of pods and nodes, providing up to date metrics about the DP nodes to the control plane, working with the networking interface (CNI, discussed below) to associated networking with pods, working with the storage interface (CSI, discussed below) to provide persistent storage to pods, enforcing limits and quotas for each pod, injecting specific devices into pods as needed, and the like. The data plane may be configured to provide secret injection capabilities into the pods, and it may pull images from specific registries (a region Docker registry as depicted in FIG. 13) for execution in the pods.

Figure 13:
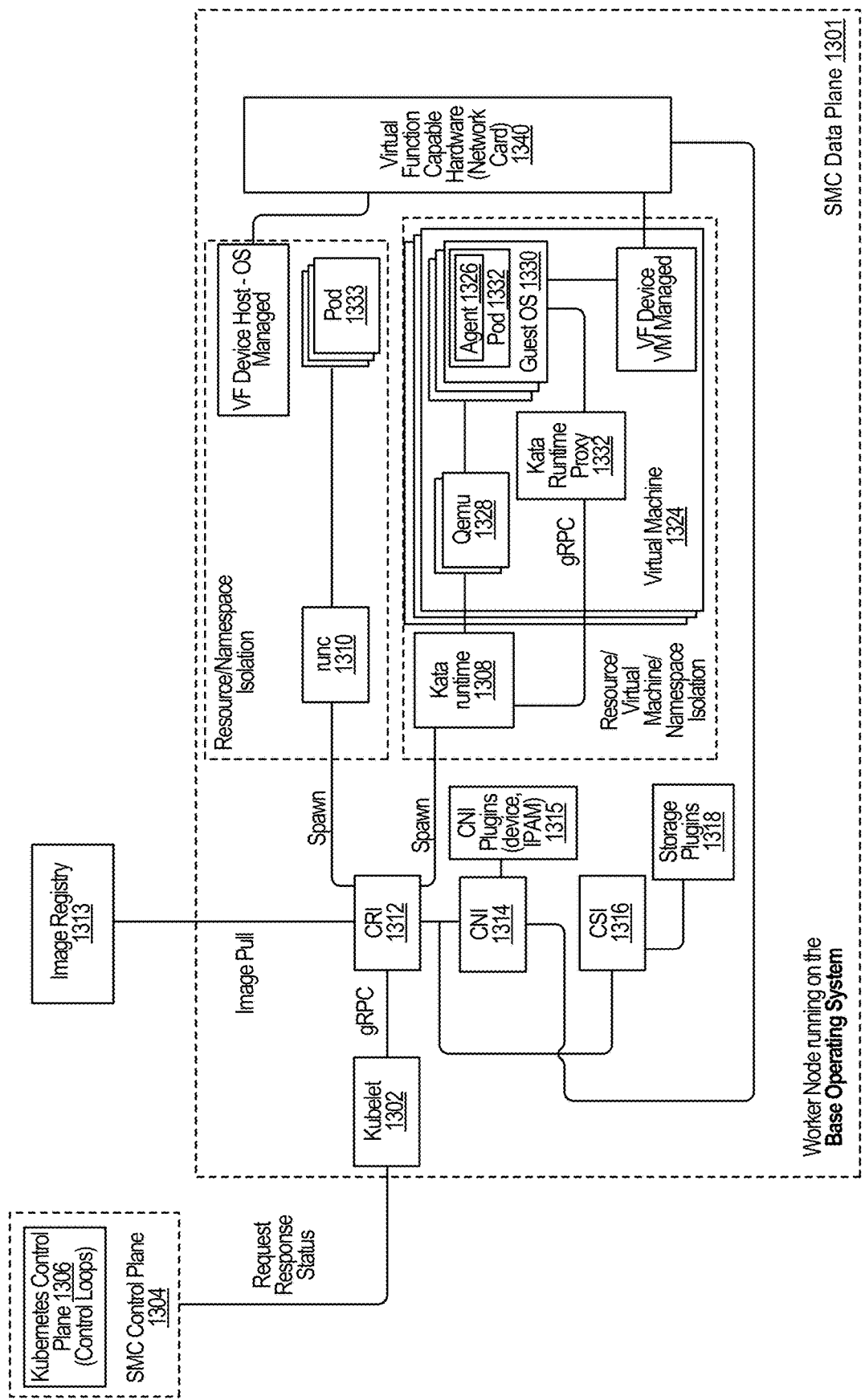
FIG. 13 illustrates a block diagram illustrating an example architecture for an SMC data plane, in accordance with at least one embodiment.

FIG. 13 illustrates a block diagram illustrating an example architecture 1300 for an SMC data plane (e.g., SMC data plane 1301), in accordance with at least one embodiment. The SMC data plane 1301 (an example of the data plane 907 of FIG. 9, 705 of FIG. 7, etc.) has several independent components that may work together to address the needs of launching workloads (e.g., containers) in a pod deployed at one of the computing nodes (e.g., SMC worker node(s) 906, each an example of the SMC node(s) 114 of FIG. 1) managed by SMC control plane 1304. SMC control plane 1304 may be an example of the SMC control plane 902 of FIG. 9. As depicted, SMC control plane 1304 may include Kubernetes control plane 1306, an example of the Kubernetes control plane 904 of FIG. 9. The kubelet 1302 (an example of the kubelet 118 of FIGS. 1, 312 and 314 of FIG. 3, etc.) may be the primary point of contact both to and from the SMC control plane 1104 (including the Kubernetes control plane 1106, where control loops run, and where the API server is hosted). The Kubelet 1102 may be configured to use a secure communication channel to the SMC control plane 1104 and/or Kubernetes control plane 1106.

In some embodiments, kubelet 1302 may present the SMC control plane 1304 (and/or Kubernetes CP 1306) authorization credentials, which grant it the privileges to carry out the communication. The SMC control plane 1304 (e.g., the certificates) may be configured to provide the credentials to a certificate authority (e.g., an identity provider of the cloud computing environment, not depicted) which may be configured to validate the credentials (e.g., that the credentials have been signed by the certificate authority, or the like) and that one or more access policies associated with that credential authorizes such privileges.

In some embodiments, the kubelet 1302 may collect metrics and post these to T2 722 of FIG. 7. These metrics may be communicated independent of the SMC control plane 1304. These metrics may be communicated over a local port (e.g., port 10250). The kubelet 1302 can provide service, system and container metrics (cadvisor). In some embodiments, these metrics may be converted to be compatible with T2 722.

The kubelet 1302 may communicate with a container runtime (e.g., kata runtime 1308, runc 1310, etc.) via a container runtime interface 1312 to manage pods. In some embodiments, the container runtime interface 1312 may be configured to pull an image from and an image registry (e.g., image registry 1313, a Docker registry in the region).

The container runtime interface 1312 may be configured to communicate with the kubelet 1302 over gRPC (an open source, high performance remote procedure call) to provide the means to actually launch pods and containers. Communications between the kubelet 1302 and the Kubernetes control plane 1306 may be protected by a TLS certificate issued during setup and the credentials can be securely rotated (e.g., by the cluster nanny 914 of FIG. 9). The container runtime interface 1312 (e.g., CRI-O. hereinafter also referred to as "crio") may provide the ability to run pods/containers via various runtimes, such as runc 1310 and/or Kata runtime 1308. Runc 1310 may be configured as the default runtime that allows spawning of containers via clone/unshare system calls. Runc 1310 may enable resource/namespace isolation. Kata runtime 1308 may be an example of Kata Containers, an open-source container runtime which is configured to provider light weight virtual machines (micro-VMs) that seamlessly plug into the Kubernetes ecosystem. Kata runtime 1308 may enable resource/virtual machine/namespace isolation.

One challenge when running a platform such as SMC is the need to balance the need for higher density versus security. In general SMC provides higher density. CRI 1312 may be used to allow containers to execute via different runtimes (e.g., runc 1310, which is configured to run the container inside a namespace of the operating system versus Kata runtime 1308, which is configured to run the container inside a micro-VM). The container runtime interface 1312 may be configured to determine which runtime to use for a given container based at least in part on the type of isolation warranted. It may be desirable to run containers via the namespace primitive for maximum density, but for some workloads VM boundary of isolation may be desirable. The container runtime interface 1312 may utilize any suitable combination of 1) topological sort of dependencies, including transitional dependencies, 2) determining services with secrets in memory and/or the filesystem, 3) determining services with long-standing secrets that do not get refreshed often, 4) determining services that can have a controlling influence on other services (e.g., services that launch new machines and/or control their placement or hardware, services that image and set up internal network cards and/or machine images for bare metal hardware, etc.), 5) determining service inputs (e.g., whether the service accepts a wide variety of inputs, whether the inputs are well defined and controlled, etc.), 6) determining whether the service has local inter-process communication with another co-located container/service, 7) determining whether the service runs with elevated privileges. These factors can be individually scored, and the scores weighted. An algorithm can be used to compute an overall score from the weighted scored. If the overall score exceeds a threshold, then the CRI 1312 may be configured to isolate via VM boundaries. This may cause a particular runtime (e.g., Kata runtime 1308) to be selected for the container.

By way of example, a container process may be spawned by agent 1326, an agent process running as a daemon inside the virtual machine 1324. The agent 1326 may run a gRPC server in the guest OS 1330 using a VIRTIO serial or VSOCK interface which QEMU 1328 may expose as a socket file on the host. VIRTIO refers to a para-virtual input/output standard designed to enable communication between the host and the guest, or more specifically, between QEMU 1328 and the guest kernel of guest OS 1330. QEMU 1328 refers to a machine emulator that can run operating systems and program for one machine on a different machine. QEMU 1328 can be used as a virtualizer in collaboration with kernel components to virtualize guests. VSOCK refers to a VIRTIO based sockets interface. In some embodiments, a hypervisor or a different virtualizer may be utilized.

Kata runtime 1308 may use a gRPC protocol to communicate with the agent 1326. Using gRPC, the Kata runtime 1308 may send container management commands to the agent 1326. The communication link may also be used to carry I/O streams (stdout, stderr, stdin) between the containers and the container runtime interface 1312.

For any given container, all potentially executed commands within that container, together with their related I/O streams, may go through the VIRTIO serial or VSOCK interface exported by QEMU 1328. Kata runtime 1308 may be configured to listen and respond to one side (e.g., the hypervisor side) with the agent 1326 in the guest OS 1330 on the other side of the communication link.

In the VIRTIO serial case, a proxy (e.g., Kata runtime proxy 1332) instance is launched for each virtual machine to handle multiplexing and demultiplexing those commands. Both QEMU 1328 and the guest kernel (e.g., Guest OS 1330) may be configured to support a VIRTIO serial or a VSOCK interface. On the host, each container process's removal may be handled by a reaper (e.g., common) in the higher layers of the container stack. A common file system may be shared between the host and guest (e.g., using virtiofs/virtio-9p, etc.). Kata runtime 1308 may provide a virtual function IO (VFIO) mechanism to inject PCI pass-through devices (e.g., PCI device(s) 1403 of FIG. 14) into a virtual machine (e.g., virtual machine 1405 of FIG. 14, an example of the virtual machine 1324). This mechanism is used for networking as describe further below.

A Virtual Function is associated with singe root, IO virtualization (SR-IOV) PCI, a standard that allows a single PCI card to be virtualized into smaller components and handed over as an independent entity to perform operations on the card. This plugin enables the configuration and usage of SR-IOV VF networks in containers and orchestrators like Kubernetes. VFIO refers to a mechanism by which Linux allows PCI passthrough of cards.

Evergreen (operating on guest OS 1330) may be used as the base operating system for the SMC Data Plane. Evergreen may include an immutable root file system (/usr) with mutation capabilities in /etc, /opt, /var and /home. This reduces the attack surface of the operating system, reduces the burden on scanning agents like anti-virus agents. Evergreen may provide atomic rollbacks to protect against bad deployments. Changes and updates made on the base operating system image may not visible until the next reboot (upgrades/updates require reboot). Atomic changes and visibility of those changes allows for uniformity among fleet instances. Evergreen provides the stack with the latest version of Oracle Linux (OL8) and simplifies patching and updates. Any changes or updates cause a new version of the filesystem to be checked out and updated. This makes it easier to fallback to a previous good configuration when needed.

All containers in the pod 1332 and/or pod 1333 may be configured to share the same network space. The container networking interface (CNI) 1314 may be responsible for creating the necessary interface, moving it to the network namespace of the container, and performing lifecycle management of the interface and its state. Kubernetes CNI design allows for IP access management (IPAM) on the host node via multiple mechanisms (dhcp, host-local, etc.). CNI 1314 may configure virtual function capable hardware such as network card 1340, an example of network card 1402 of FIG. 14. SNI 1314 may manage endpoints corresponding to the containers of a namespace to enable that distributed containers associated with a deployed service (corresponding to a given namespace) may communicate with one another.

Container storage interface (CSI) 1316 may be configured to utilize storage plugins 1318 to manage workload storage (e.g., storage that stores workload data of the pod 1332 and containers running therein. CSI 1316, using storage plugins may enable communication with OCI core service(s) 740 of FIG. 7, specifically an object storage and/or block storage service, to store workload data. CSI 1316 may be configured to store and retrieve workload data such that workload data is accessible to all containers managed by the SMC control plane 1304 and/or Kubernetes control plane 1306.

Figure 14:
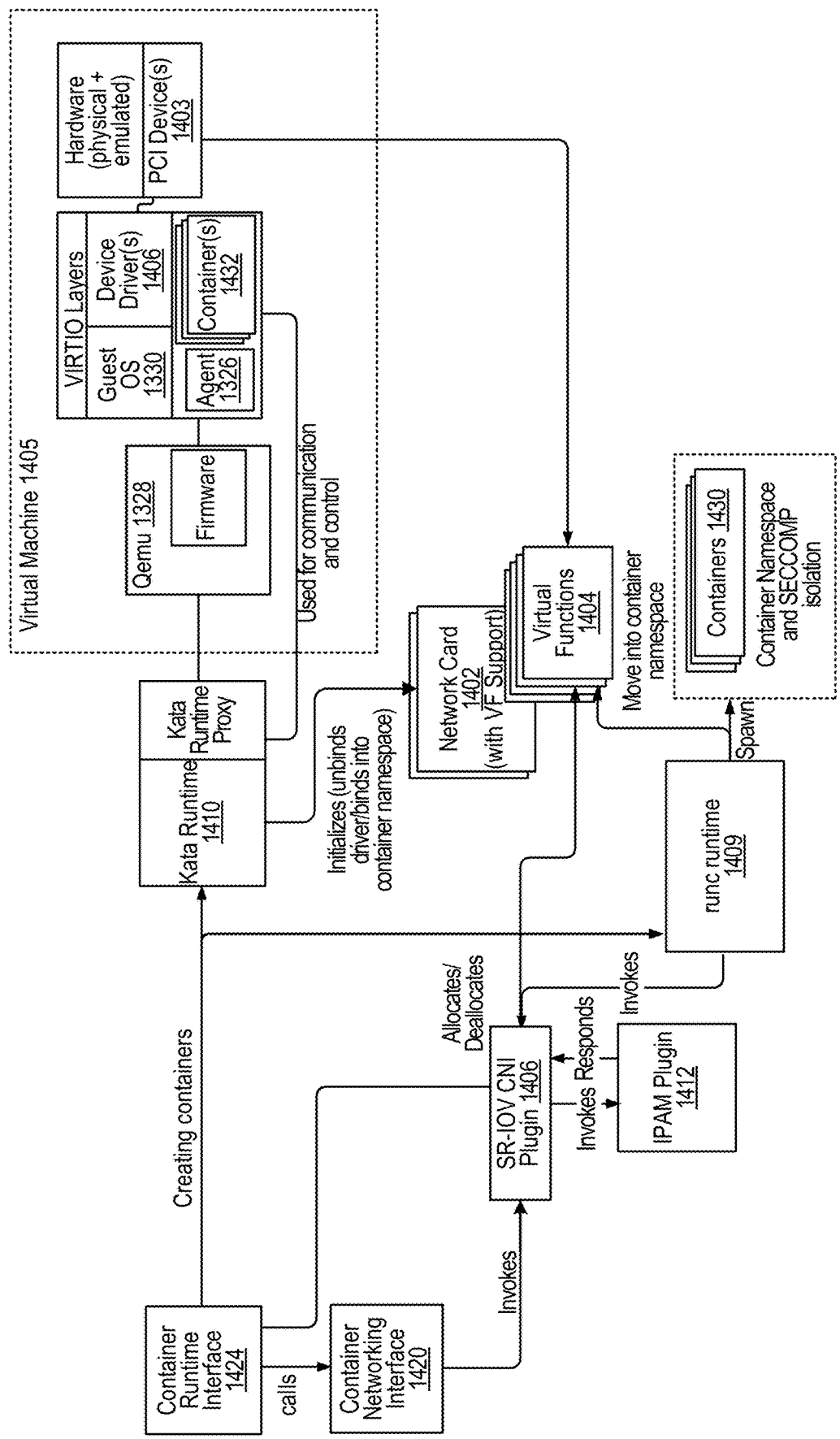
FIG. 14 illustrates a block diagram illustrating an example architecture and method for providing container runtime networking functionality, in accordance with at least one embodiment.

FIG. 14 illustrates a block diagram illustrating an example architecture 1400 and method for providing container runtime networking functionality (e.g., via CNI 1314 of FIG. 13), in accordance with at least one embodiment. The components depicted in FIG. 14 may be part of the SMC data plane 1301 of FIG. 13. Virtual Functions (VFs) support in a networking device provides a rich set of capabilities, largely higher throughput management, better bandwidth management, and security features like spoof detection. FIG. 14 shows example container runtime components and how they may integrate to provide networking functionality. To utilize the virtual functions of the network card (e.g., network card 1402, PCI device(s) 1403, etc.), a Linux kernel with support for PCI virtual functions, VFIO, and a network card driver with support for virtual functions may be used. A virtual function refers to a virtualized task or software implementation of a network function (e.g., networking functionality conventionally carried out by dedicated hardware) that is deployable on virtual machines and other virtual resources. An initialization script may also be utilized that initializes the network card 1402, creates the virtual functions (e.g., virtual functions 1404), and sets up their corresponding mac address. Setting up mac addresses may be unique to the substrate. A SR-IOV plugin 1406 (with changes for allocation/deallocation of VFs 1404) may be used. In the case of using Kata runtime 1410 (an example of Kata runtime 1308 of FIG. 13), there may be an additional complexity involved with unbinding the device (e.g., PCI device(s) 1403) from the host driver (e.g., device driver(s) 1406), passing it through to the VM, doing PCI hot-plugging of the device (e.g., replacing the device while the system remains up) with support from the firmware, and then initializing the card again (PCI device(s) 1403) inside the Virtual Machine 1405.

The network layout of the bare metal box may include two network cards (e.g., including network card 1402) on separate IP address ranges. Each card may have, for example, 128 VFs and a proposed subnet size of 128 IP addresses. In some cases, there could be more VFs than IP addresses. This may limit the density/packing of pods on a single machine. When there are more VFs than IPs, the number of pods per machine may be limited (e.g., to 120, etc.).

The initialization component may assume that there is enough IPs to cover all the VFs and the VFs are sufficient in number to meet the density requirements. For IP address management (IPAM) to work in this environment, dynamic host configuration protocol (DHCP) may be used for IPAM management. Two tasks of initialization may include 1) creating and initializing all VFs 1404 for each network card (e.g., network card 1402), detecting the subnet IP address ranges for each card, and 2) setting up the MAC addresses for each VF interface so that they can be utilized by the IPAM plugin 1412.

After boot time network initialization, additional tasks may be completed for container instantiation (e.g., of container(s) 1432). First, an unused VF from VFs 1404 may be identified for use. Second, the VF may be added to the container (of container(s) 1432). Third, an IP address, subnet, default gateway, and DNS config may be provided to the container.

Figure 15:
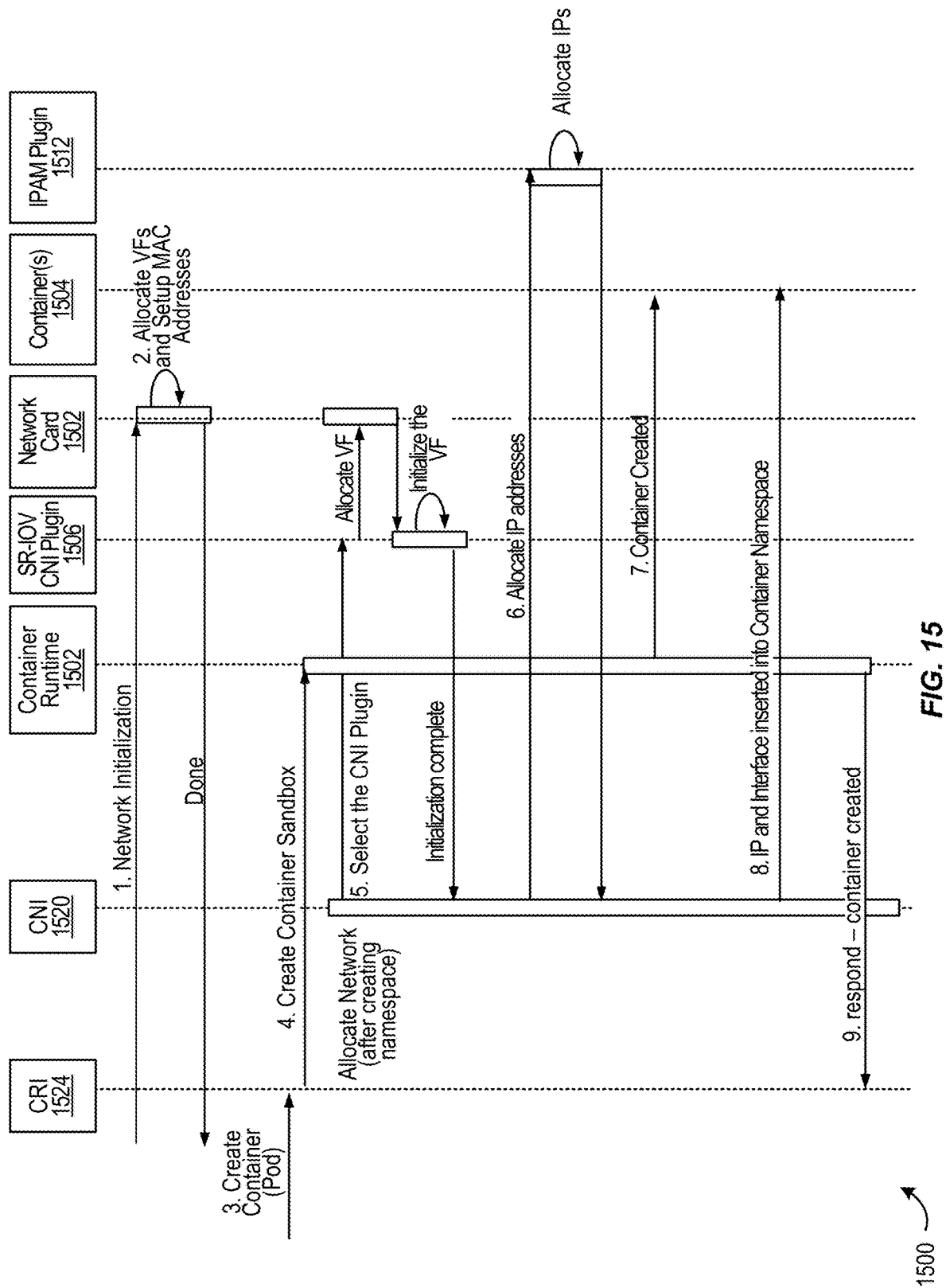
FIG. 15 illustrates a block diagram illustrating a method for creating a container (e.g., a pod) using the components of FIG. 14, in accordance with at least one embodiment.

In some embodiments, the addition and later removal of the VF may be managed by the SR-IOV plugin 1406. In some embodiments, the allocation of IP address, subnet, routes and DNS config may be managed by a core CNI plugin (e.g., one of CNI plugins 1315 of FIG. 13). VF selection may be managed by a customized fork of the SR-IOV plugin 1406. The features added to fork may include state management of the VFs and reconciliation of the state of the overall machine. In some embodiments, when a host reboots and comes up and pods are respawned, it may be the case that they may need to retain their IP addresses. Rebooting a machine can cause of lot of state change (IP address changes need to be propagated to the load balancers, control plane components, etc.). Given a network topology where each pod can communicate with another pod via their physical IP address, retaining IPs allows any broken communication to continue if needed via retries after reboot. In some embodiments, even if a host is rebooted, and pods are respawned, they retain their previously assigned IP address. FIG. 15 illustrates a block diagram illustrating a method 1500 for creating a container (e.g., a pod) using the components of FIG. 14, in accordance with at least one embodiment.

At step 1, the network may be initialized. As part of the initialization process, network card 1502 (e.g., network card 1402 of FIG. 14) may be initialized. The network card 1502 may be configured to allocate VFs (e.g., VFs 1404 of FIG. 14) and set up MAC addresses at step 2 for each VF interface so that they may be utilized by the IPAM plugin 1512 (e.g., an example of the IPAM plugin 1412 of FIG. 14). Once VFs are allocated and the MAC address assigned, the network card 1502 can provide any suitable signal to indicate the process is concluded.

At step 3, a container (e.g., a pod) can be created. In some embodiments, CRI 1514 (an example of CRI 1424 of FIG. 14, CRI 1312 of FIG. 13, etc.) may receive (e.g., from kubelet 1302 of FIG. 13) data indicating that creation of one or more containers (e.g., one or more pods) is requested.

At step 4, a container sandbox may be created in response to a request being transmitted from CRI 1524 to container runtime 1502 (e.g., runc runtime 1409 of FIG. 14, an example of runc 1310 of FIG. 13, or Kata runtime 1410, an example of Kata runtime 1308 of FIG. 13). A namespace may be created for container(s) 1504 (e.g., containers 1430 if runc runtime 1409 is used, or containers 1432 if Kata runtime 1410 is used). The method may proceed to allocating the network after namespace creation is complete.

At step 5, the SR-IOV CNI plugin 1506 (one of CNI plugins 1315 of FIG. 13) may be selected by CNI 1520 (an example of CNI 1314 of FIG. 13). SR-IOV CNI plugin 1506 may allocate virtual functions 1404 of FIG. 14 at network card 1402 of FIG. 14 and initialize the virtual functions. SR-IOV CNI plugin 1506 may inform CNI 1520 that initialization is complete.

At step 6, CNI 1520 may allocate IP addresses via the IPAM plugin 1512. The IPAM plugin (an example of the plugins 1315 of FIG. 13, IPAM plugin 1412 of FIG. 14, etc.) may be configured to allocate the IP addresses to the container(s) 1504

At step 7, the container runtime 1502 (e.g., in response to the request at step 4) may execute operations to create container(s) 1504.

At step 8, CNI 1520 may execute operations to insert the IP address and specify the interface needed into the namespace associated with the container(s) 1504. In some embodiments (e.g., if a service is implemented by multiple containers), CNI 1520 may. In some embodiments, CNI 1520 may assign the IP address to each of the containers that implement the service. In some embodiments, CNI 1520 manages respective endpoints within the plurality of containers, such that those containers may be communicatively connected with one another through the respective endpoints.

At step 9, container runtime 1502 may return to CRI 1524 a response indicating the container has been created. CRI 1524 in turn may provide a response to kubelet 1302 of FIG. 13.

Figure 16:
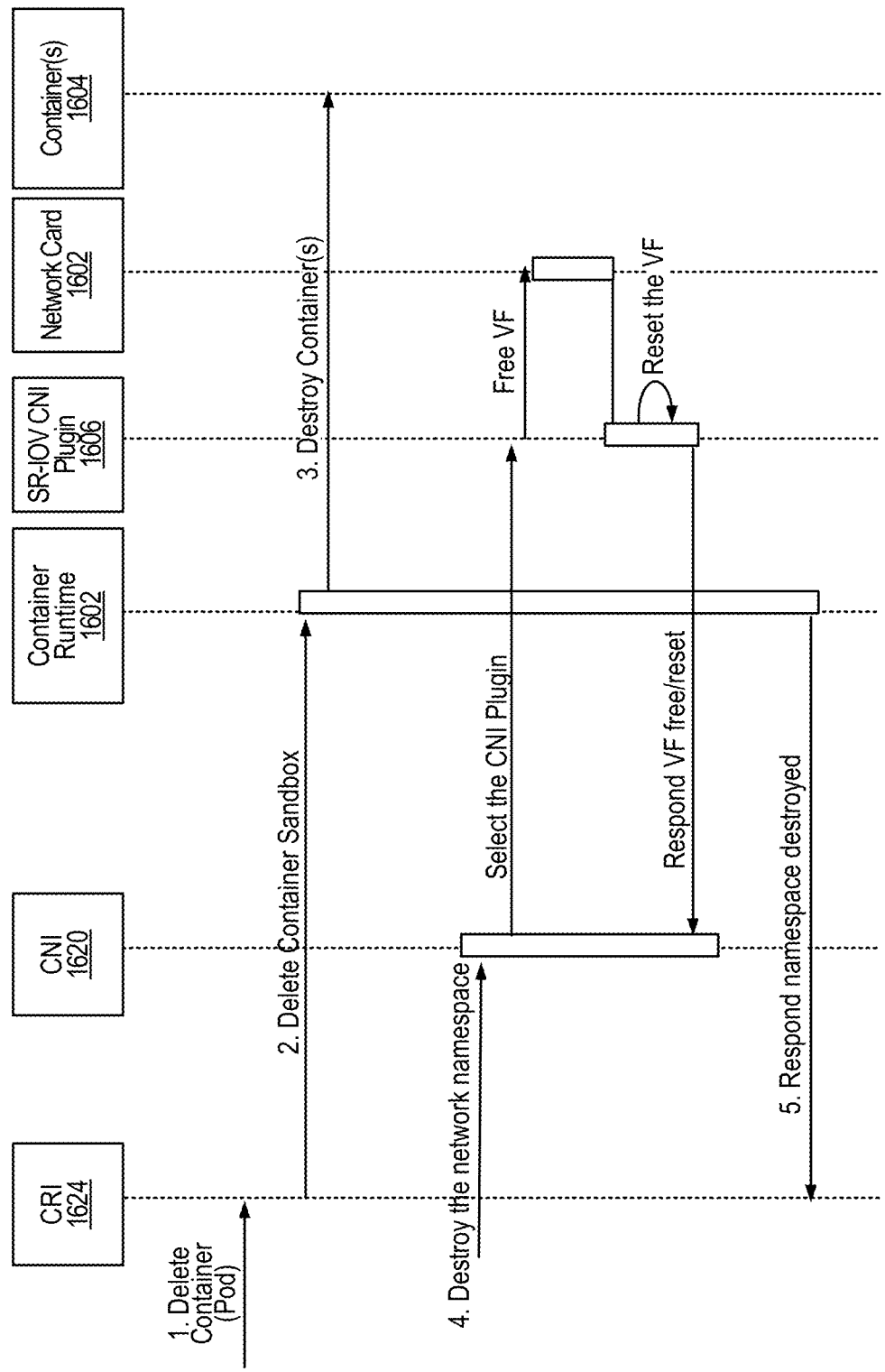
FIG. 16 illustrates a block diagram illustrating a method for deleting a container (e.g., a pod) using the components of FIG. 14, in accordance with at least one embodiment.

FIG. 16 illustrates a block diagram illustrating a method 1600 for deleting a container (e.g., a pod) using the components of FIG. 14, in accordance with at least one embodiment.

At step 1, CRI 1624 (e.g., CRI 1424 of FIG. 14) may receive (e.g., from kubelet 1302 of FIG. 13) data indicating deletion of one or more containers (e.g., one or more pods) is requested.

At step 2, a container sandbox may be deleted in response to a request being transmitted from CRI 1624 to container runtime 1602 (e.g., runc runtime 1409, an example of runc 1310 of FIG. 13, or Kata runtime 1410, an example of Kata runtime 1308 of FIG. 13).

At step 3, container runtime 1302 may execute operations for destroying container(s) 1304 (e.g., containers 1230 if runc runtime 1209 is used, or containers 1232 if Kata runtime 1410 is used).

At step 4, CRI 1624 may execute operations to destroy the network namespace by transmitting data to CNI 1620 (e.g., CNI 1420 of FIG. 14). CNI 1620 may select the SR-IOV CNI plugin 1606 (e.g., SR-IOV CNI plugin 1406 of FIG. 14) which may in turn free the virtual functions at the network card 1602 (e.g., network card 1402 of FIG. 14) and reset the virtual functions at the SR-IOV CNI plugin 1406. The SR-IOV CNI plugin 1406 may respond to the CNI 1620 that the virtual functions are free/reset.

At step 5, the SR-IOV CNI plugin 1406 may respond to the CRI 1624 with data indicating the network namespace was destroyed.

Figure 17:
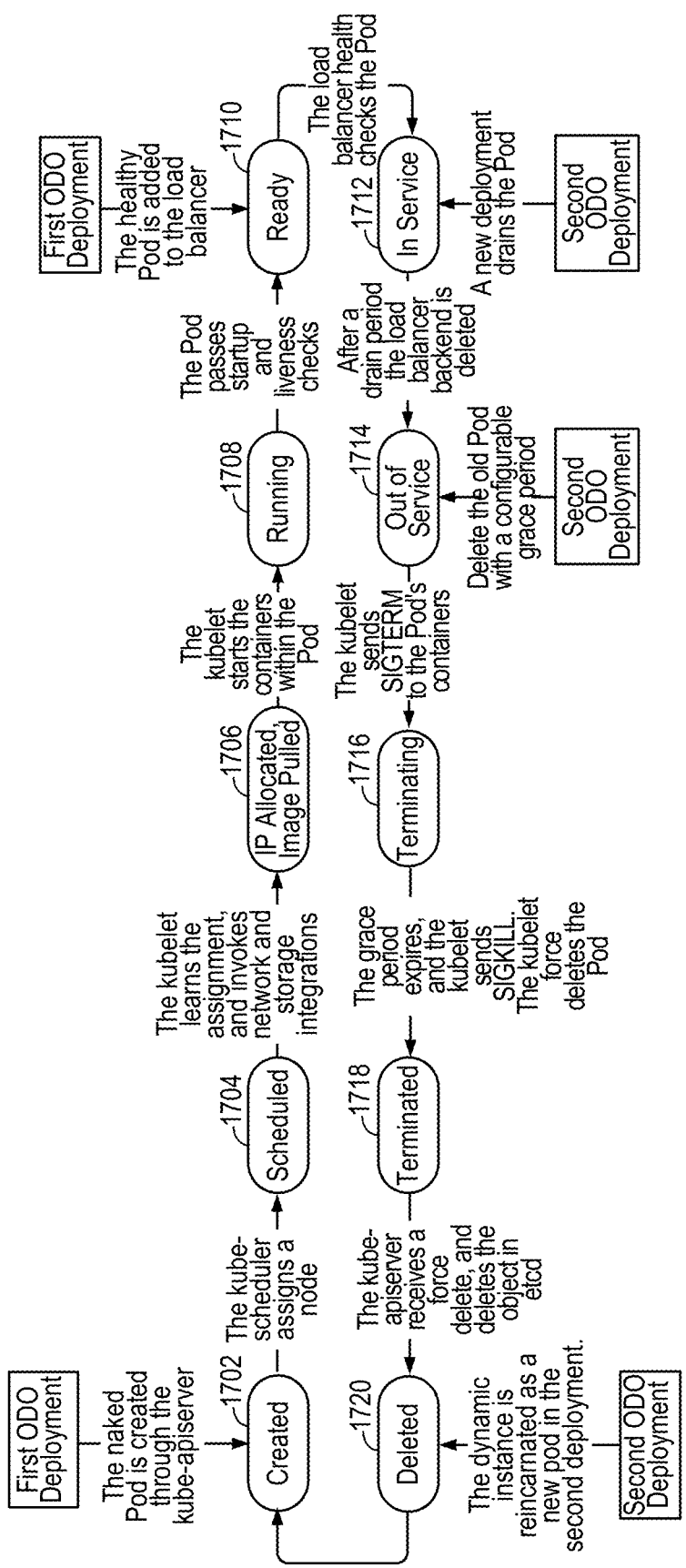
FIG. 17 illustrates a block diagram illustrating lifecycle for a container (e.g., of a pod), in accordance with at least one embodiment.

FIG. 17 illustrates a block diagram 1700 illustrating an example lifecycle for a container (e.g., a pod), in accordance with at least one embodiment. During a first deployment of ODO, a naked pod is created through a kube-apiserver (e.g., API server 928 of FIG. 9). The kube-scheduler (e.g., scheduler 932 of FIG. 9) may assign (e.g., schedules) the node at 1704. At 1706, the kubelet (e.g., kubelet 1302 of FIG. 13) learns the assignment and invokes networking integrations (e.g., method 1500 of FIG. 15) which causes the IP address for the pod to be allocated and the image for the pod to be pulled (e.g., from object storage) at 1706.

At 1708, the kubelet starts the containers within the pod (e.g., the containers with the image pulled at 1706). Once running, the pod executes startup and liveness checks as described at step 15 of FIG. 6. If those checks pass, the pod is considered ready at 1710. If this is the first ODO deployment of the pod, the healthy pod is added to the load balancer. The load balancer may perform health checks on the pod while the pod is in service at 1712.

A second ODO deployment is initiated, and this deployment drains the pod. After a drain period, the load balancer backend is deleted, and the pod may be considered out of service at 1714. The kubelet sends a signal (e.g., a SIGTERM command) to the pod's containers to terminate at 1716. After a grace period expires and the kubelet sends a SIGKILL command, the kubelet force deletes the pod and the state of the pod moves to terminated at 1718.

The kube-apiserver receive a force delete and deletes the object in etcd at 1720. Later, the dynamic instance may be reincarnated as a new pod in the second deployment.

Figure 18:
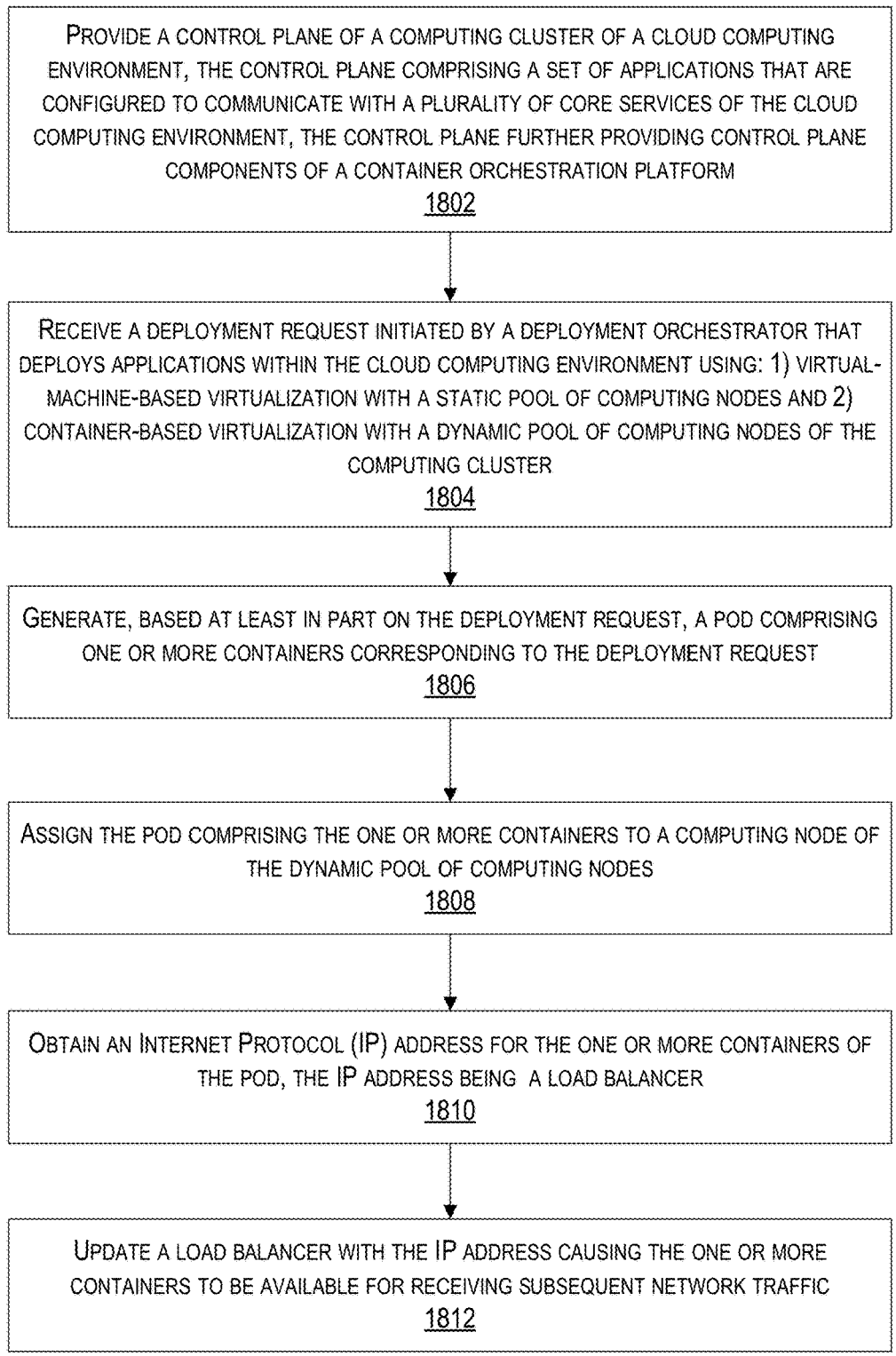
FIG. 18 is a block diagram illustrating an example method for utilizing an SMC control plane for container virtualization, in accordance with at least one embodiment.

FIG. 18 is a block diagram illustrating an example method 1800 for utilizing an SMC control plane for container virtualization, in accordance with at least one embodiment. Method 1800 may be performed by one or more components of the SMC control plane 121 of FIG. 1 or subcomponents thereof discussed in connection with FIG. 9. The operations of method 1800 may be performed in any suitable order. More or few operations than those depicted in FIG. 18 may be included in method 1800.

The method 1800 may begin at 1802, where a control plane (e.g., SMC control plane 121 of FIG. 1) of a computing cluster of a cloud computing environment is provided. In some embodiments, the control plane comprises a set of applications that are configured to communicate with a plurality of core services of the cloud computing environment (e.g., OCI core service(s) 740 of FIG. 7). In some embodiments, the control plane further provides control plane components of a container orchestration platform (e.g., container orchestration platform 300 of FIG. 3, a Kubernetes orchestrator).

At 1804, a deployment request initiated by a deployment orchestrator (e.g., ODO 102 of FIG. 1), may be received. The deployment orchestrator may deploy application with the cloud computing environment, using: 1) virtual-machine-based virtualization with a static pool of computing nodes (e.g., static pool 104 of FIGS. 1) and 2) container-based virtualization with a dynamic pool of computing nodes (e.g., dynamic pool 112) of the computing cluster.

At 1806, a pod (e.g., pod 234 of FIG. 2) may be generated (e.g., by container orchestration platform 300) based at least in part on the deployment request. The pod may comprise one or more containers (e.g., containers 220-224 of FIG. 2) and may correspond to the deployment request. In some embodiments, At 1808, the pod comprising the one or more containers may be assigned (e.g., by scheduler 312 of FIG. 3) to a computing node of the dynamic pool of computing nodes (e.g., one of SMC node(s) 114 of FIG. 1).

At 1810, an Internet Protocol (IP) address for the one or more containers of the pod may be obtained. In some embodiments, the IP address may be inserted into the container namespace as described in connection with FIG. 15. The control plane may obtain the IP address assigned to the pod/containers from the namespace associated with the pod/containers.

At 1812, a load balancer (e.g., load balancer 936) may be updated (e.g., by API server 928, by workflow worker 502 of FIG. 5, etc). with the IP address. In some embodiments, the update causes the one or more containers to be available for receiving subsequent network traffic.

Figure 19:
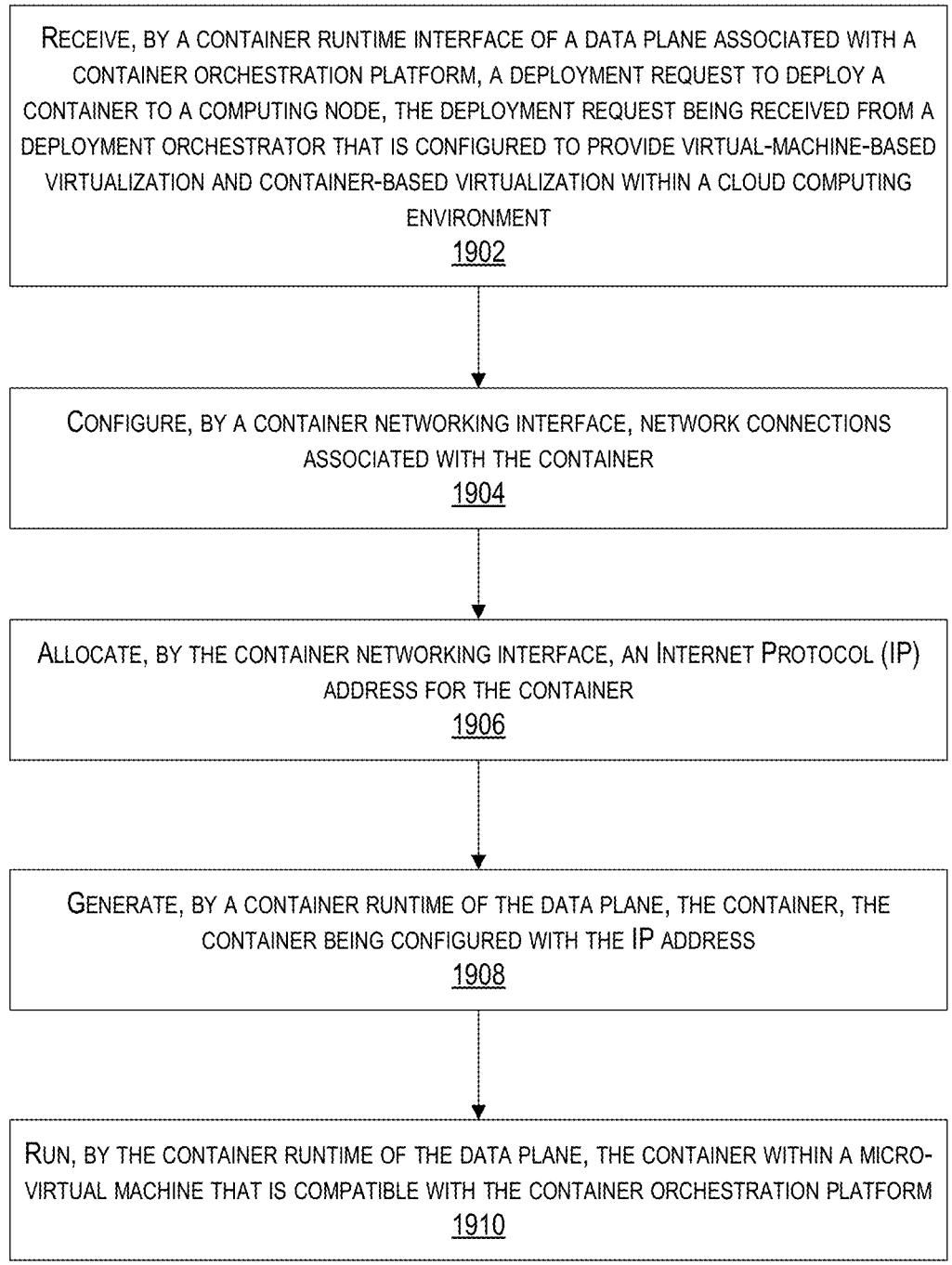
FIG. 19 is a block diagram illustrating an example method for using an SMC data plane to run containers in micro-virtual machines, in accordance with at least one embodiment.

FIG. 19 is a block diagram illustrating an example method 1900 for using an SMC data plane to run containers in micro-virtual machines, in accordance with at least one embodiment. Method 1900 may be performed by one or more components of the SMC data pane 1301 of FIG. 13 or subcomponents thereof discussed in connection with FIGS.

13-16. The operations of method 1900 may be performed in any suitable order. More or few operations than those depicted in FIG. 19 may be included in method 1900.

The method 1900 may begin at 1902, a deployment request to deploy a container to a computing node may be received by a container runtime interface (CRI 1312 of FIG. 13) of a data plane (e.g., SMC data plane 1301) associated with a container orchestration platform (e.g., container orchestration platform 300 of FIG. 3). In some embodiments, the deployment request may be received from a deployment orchestrator (e.g., ODO 102 of FIG. 1) that is configured to provide virtual-machine-based virtualization and container-based virtualization within a cloud computing environment.

At 1904, network connections associated with the container may be configured by a container networking interface (e.g., CNI 1314 of FIG. 13). In some embodiments, the container networking interface may perform the operations discussed in connection with FIG. 15.

At 1906, the container networking interface may allocate an Internet Protocol (IP) address for the container.

At 1908, a container runtime of the data plane (e.g., the Kata runtime 1308 of FIG. 3, an example of the container runtime 1502 of FIG. 2) may generate the container and configure the container with the IP address.

At 1910, the container runtime (e.g., Kata runtime 1308 of FIG. 3) may run the container within a micro-virtual machine that is compatible with the container orchestration platform.

Figure 20:
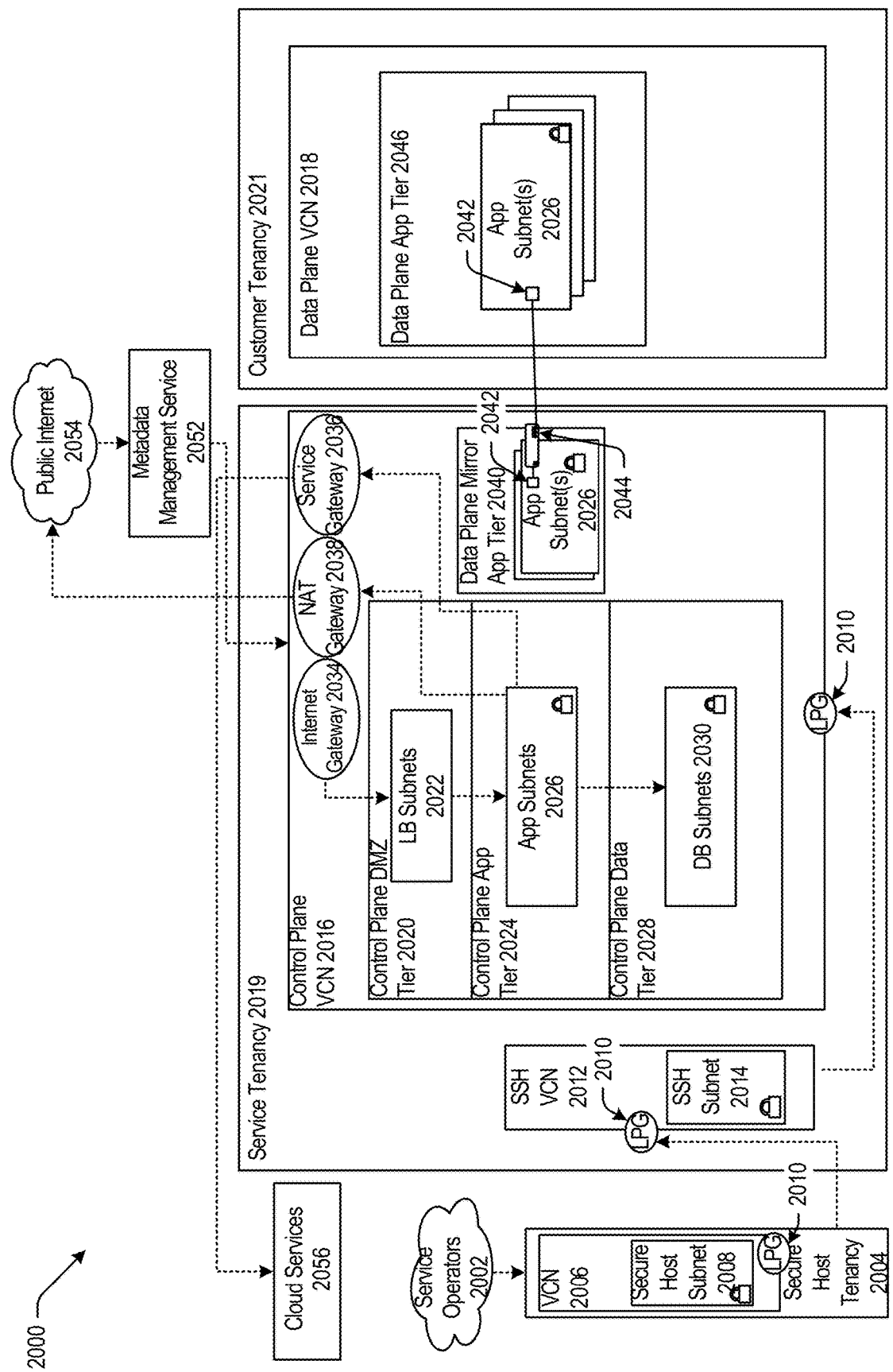
FIG. 20 is a block diagram illustrating a pattern for implementing a cloud infrastructure as a service system, according to at least one embodiment.

FIG. 20 is a block diagram 2000 illustrating another example pattern of an IaaS architecture, according to at least one embodiment. Service operators 2002 can be communicatively coupled to a secure host tenancy 2004 that can include a virtual cloud network (VCN) 2006 and a secure host subnet 2008. The VCN 2006 can include a local peering gateway (LPG) 2010 that can be communicatively coupled to a secure shell (SSH) VCN 2012 via an LPG 2010 contained in the SSH VCN 2012. The SSH VCN 2012 can include an SSH subnet 2014, and the SSH VCN 2012 can be communicatively coupled to a control plane VCN 2016 via an LPG 2010 contained in the control plane VCN 2016. The control plane VCN 2016 can be contained in a service tenancy 2019, and the data plane VCN 2018 can be contained in a customer tenancy 2021 that may be owned or operated by users, or customers, of the system.

The control plane VCN 2016 can include a control plane DMZ tier 2020 that can include LB subnet(s) 2022, a control plane app tier 2024 that can include app subnet(s) 2026, a control plane data tier 2028 that can include database (DB) subnet(s) 2030. The LB subnet(s) 2022 contained in the control plane DMZ tier 2020 can be communicatively coupled to the app subnet(s) 2026 contained in the control plane app tier 2024 and an Internet gateway 2034 that can be contained in the control plane VCN 2016, and the app subnet(s) 2026 can be communicatively coupled to the DB subnet(s) 2030 contained in the control plane data tier 2028 and a service gateway 2036 and a network address translation (NAT) gateway 2038. The control plane VCN 2016 can include the service gateway 2036 and the NAT gateway 2038.

The control plane VCN 2016 can include a data plane mirror app tier 2040 that can include app subnet(s) 2026. The app subnet(s) 2026 contained in the data plane mirror app tier 2040 can include a virtual network interface controller (VNIC) 2042 that can execute a compute instance 2044. The compute instance 2044 can facilitate communication between the app subnet(s) 2026 of the data plane mirror app tier 2040 and the app subnet(s) 2026 that can be contained in a data plane app tier 2046 via the VNIC 2042 contained in the data plane mirror app tier 2040 and the VNIC 2042 contained in the data plane app tier 2046.

The Internet gateway 2034 contained in the control plane VCN 2016 can be communicatively coupled to a metadata management service 2052 that can be communicatively coupled to public Internet 2054. Public Internet 2054 can be communicatively coupled to the NAT gateway 2038 contained in the control plane VCN 2016. The service gateway 2036 contained in the control plane VCN 2016 can be communicatively couple to cloud services 2056.

In some examples, the data plane VCN 2018 can be contained in the customer tenancy 2021. In this case, the IaaS provider may provide the control plane VCN 2016 for each customer, and the IaaS provider may, for each customer, set up a unique compute instance 2044 that is contained in the service tenancy 2019. Each compute instance 2044 may allow communication between the control plane VCN 2016, contained in the service tenancy 2019, and the data plane VCN 2018 that is contained in the customer tenancy 2021. The compute instance 2044 may allow resources, that are provisioned in the control plane VCN 2016 that is contained in the service tenancy 2019, to be deployed or otherwise used in the data plane VCN 2018 that is contained in the customer tenancy 2021.

In other examples, the customer of the IaaS provider may have databases that live in the customer tenancy 2021. In this example, the control plane VCN 2016 can include the data plane mirror app tier 2040 that can include app subnet(s) 2026. The data plane mirror app tier 2040 can reside in the data plane VCN 2018, but the data plane mirror app tier 2040 may not live in the data plane VCN 2018. That is, the data plane mirror app tier 2040 may have access to the customer tenancy 2021, but the data plane mirror app tier 2040 may not exist in the data plane VCN 2018 or be owned or operated by the customer of the IaaS provider. The data plane mirror app tier 2040 may be configured to make calls to the data plane VCN 2018 but may not be configured to make calls to any entity contained in the control plane VCN 2016. The customer may desire to deploy or otherwise use resources in the data plane VCN 2018 that are provisioned in the control plane VCN 2016, and the data plane mirror app tier 2040 can facilitate the desired deployment, or other usage of resources, of the customer.

In some embodiments, the customer of the IaaS provider can apply filters to the data plane VCN 2018. In this embodiment, the customer can determine what the data plane VCN 2018 can access, and the customer may restrict access to public Internet 2054 from the data plane VCN 2018. The IaaS provider may not be able to apply filters or otherwise control access of the data plane VCN 2018 to any outside networks or databases. Applying filters and controls by the customer onto the data plane VCN 2018, contained in the customer tenancy 2021, can help isolate the data plane VCN 2018 from other customers and from public Internet 2054.

In some embodiments, cloud services 2056 can be called by the service gateway 2036 to access services that may not exist on public Internet 2054, on the control plane VCN 2016, or on the data plane VCN 2018. The connection between cloud services 2056 and the control plane VCN 2016 or the data plane VCN 2018 may not be live or continuous. Cloud services 2056 may exist on a different network owned or operated by the IaaS provider. Cloud services 2056 may be configured to receive calls from the service gateway 2036 and may be configured to not receive calls from public Internet 2054. Some cloud services 2056 may be isolated from other cloud services 2056, and the control plane VCN 2016 may be isolated from cloud services 2056 that may not be in the same region as the control plane VCN 2016. For example, the control plane VCN 2016 may be located in "Region 1," and cloud service "Deployment 1," may be located in Region 1 and in "Region 2." If a call to Deployment 1 is made by the service gateway 2036 contained in the control plane VCN 2016 located in Region 1, the call may be transmitted to Deployment 1 in Region 1. In this example, the control plane VCN 2016, or Deployment 1 in Region 1, may not be communicatively coupled to, or otherwise in communication with, Deployment 1 in Region 2.

Figure 21:
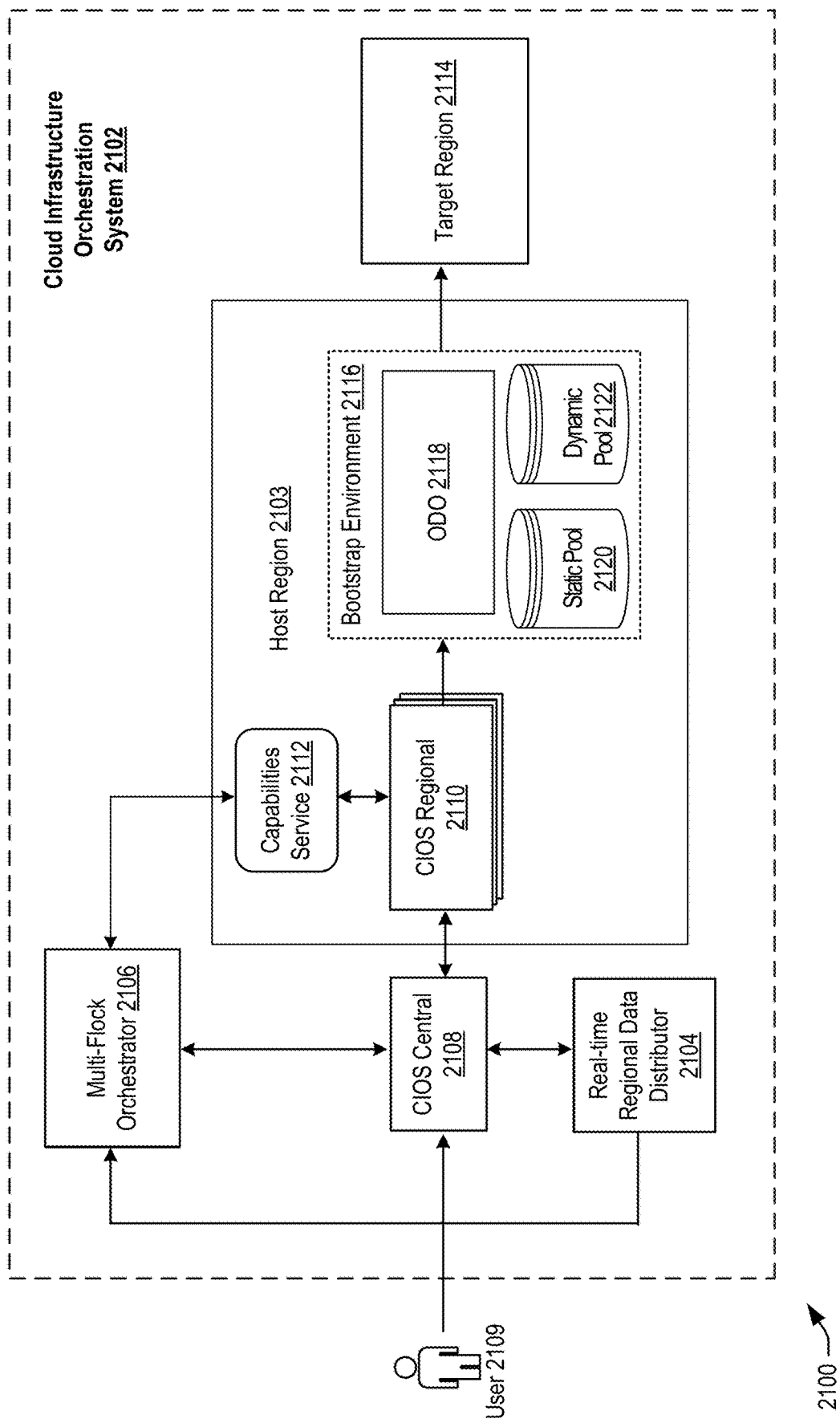
FIG. 21 is a block diagram of an environment in which a Cloud Infrastructure Orchestration Service (CIOS) may operate to bootstrap services in a region, in accordance with at least one embodiment.

FIG. 21 is a block diagram of an environment in which a Cloud Infrastructure Orchestration Service (CIOS) 2102 (an example of CIOS 132 of FIG. 1) may operate to dynamically provide bootstrap services in a region, according to at least one embodiment. CIOS 2102 can include, but is not limited to, the following components: Real-time Regional Data Distributor (RRDD) 2104, Multi-Flock Orchestrator (MFO) 2106, CIOS Central 2108, CIOS Regional 2110, and Capabilities Service 2112. Specific functionality of CIOS Central 2108 and CIOS Regional 2110 is provided in more detail in U.S. application Ser. No. 17/016,754, filed Sep. 10, 2020, entitled "Techniques for Deploying Infrastructure Resources with a Declarative Provisioning Tool," the entire contents of which are incorporated in its entirety for all purposes. Specific functionality of CIOS 2102 is provided in more detail in U.S. Provisional Application No. 63/315,005, entitled "Techniques for Building Data Centers in Cloud Regions," filed, Feb. 28, 2022, the entire contents of which are incorporated in its entirety for all purposes. In some embodiments, any suitable combination of the components of CIOS 2102 may be provided as a service. In some embodiments, some portion of CIOS 2102 may be deployed to a region (e.g., a data center represented by host region 2103). In some embodiments, CIOS 2102 may include any suitable number of cloud services (not depicted in FIG. 21) discussed in further detail in U.S. application Ser. No. 17/016,754.

Real-time Regional Data Distributor (RRDD) 2104 may be configured to maintain and provide region data that identifies realms, regions, execution targets, and availability domains. In some cases, the region data may be in any suitable form (e.g., JSON format, data objects/containers, XML, etc.). Region data maintained by RRDD 2104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 2104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 2108 or CIOS Regional 2110 has paused internal interactions with the regional stack, likely due to an operational issue. A "deprecated" state may indicate the region has been deprecated and is likely unavailable and/or will not be contacted again.

CIOS Central 2108 is configured to provide any suitable number of user interfaces with which users (e.g., user 2109) may interact with CIOS 2102. By way of example, users can make changes to region data via a user interface provided by CIOS Central 2108. CIOS Central 2108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 2102. CIOS Central 2108 may implement a control plane configured to manage any suitable number of CIOS Regional 2110 instances. CIOS Central 2108 can provide one or more user interfaces for presenting region data, enabling the user 2109 to view and/or change region data. CIOS Central 2108 can be configured to invoke the functionality of RRDD 2104 via any suitable number of interfaces. Generally, CIOS Central 2108 may be configured to manager region data, either directly or indirectly (e.g., via RRDD 2104). CIOS Central 2108 may be configured to compile flock configs to inject region data as variables within the flock configs.

Each instance of CIOS Regional 2110 may correspond to a module configured to execute bootstrapping tasks that are associated with a single service of a region. CIOS Regional 2110 can receive desired state data from CIOS Central 2108. In some embodiments, desired state data may include a flock config that declares (e.g., via declarative statements) a desired state of resources associated with a service. CIOS Central 2108 can maintain current state data indicating any suitable aspect of the current state of the resources associated with a service. In some embodiments, CIOS Regional 2110 can identify, through a comparison of the desired state data and the current state data, that changes are needed to one or more resources. For example, CIOS Regional 2110 can determine that one or more infrastructure components need to be provisioned, one or more artifacts deployed, or any suitable change needed to the resources of the service to bring the state of those resources in line with the desired state. As CIOS Regional 2110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 2112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 2112 may provide an interface with which capabilities data may be requested. Capabilities Service 2112 may provide one or more interfaces (e.g., application programming interfaces) that enable it to transmit capabilities data to MFO 2106 and/or CIOS Regional 2110 (e.g., each instance of CIOS Regional 2110). In some embodiments, MFO 2106 and/or any suitable component or module of CIOS Regional 2110 may be configured to request capabilities data from Capabilities Service 2112.

In some embodiments, Multi-Flock Orchestrator (MFO) 2106 may be configured to drive region build efforts. In some embodiments, MFO 2106 can manage information that describes what flock/flock config versions and/or artifact versions are to be utilized to bootstrap a given service within a region (or to make a unit of change to a target region). In some embodiments, MFO 2106 may be configured to monitor (or be otherwise notified of) changes to the region data managed by Real-time Regional Data Distributor 2104. In some embodiments, receiving an indication that region data has been changed may cause a region build to be triggered by MFO 2106. In some embodiments, MFO 2106 may collect various flock configs and artifacts to be used for a region build. Some, or all, of the flock configs may be configured to be region agnostic. That is, the flock configs may not explicitly identify what regions to which the flock is to be bootstrapped. In some embodiments, MFO 2106 may trigger a data injection process through which the collected flock configs are recompiled (e.g., by CIOS Central 2108). During recompilation, operations may be executed (e.g., by CIOS Central 2108) to cause the region data maintained by Real-time Regional Data Distributor 2104 to be injected into the config files. Flock configs can reference region data through variables/parameters without requiring hard-coded identification of region data. The flock configs can be dynamically modified at run time using this data injection rather than having the region data be hard-coded, and therefore, and more difficult to change.

Multi-Flock Orchestrator 2106 can perform a static flock analysis in which the flock configs are parsed to identify dependencies between resources, execution targets, phases, and flocks, and in particular to identify circular dependencies that need to be removed. In some embodiments, MFO 2106 can generate any suitable number of data structures based on the dependencies identified. These data structures (e.g., directed acyclic graph(s), linked lists, etc.) may be utilized by the Cloud Infrastructure Orchestration Service 2102 to drive operations for performing a region build. By way of example, these data structures may collectively define an order by which services are bootstrapped within a region. If circular dependencies (e.g., service A requires service B and vice versa) exist and are identified through the static flock analysis and/or graph, MFO may be configured to notify any suitable service teams that changes are required to the corresponding flock config to correct these circular dependencies. MFO 2106 can be configured to traverse one or more data structures to manage an order by which services are bootstrapped to a region. MFO 2106 can identify (e.g., using data obtained from Capabilities Service 2112) capabilities available within a given region at any given time. MFO 2106 can this data to identify when it can bootstrap a service, when bootstrapping is blocked, and/or when bootstrapping operations associated with a previously blocked service can resume. Based on this traversal, MFO 2106 can perform a variety of releases in which instructions are transmitted by MFO 2106 to CIOS Central 2108 to perform bootstrapping operations corresponding to any suitable number of flock configs. In some examples, MFO 2106 may be configured to identify that one or more flock configs may require multiple releases due to circular dependencies found within the graph. As a result, MFO 2106 may transmit multiple instruction sets to CIOS Central 2108 for a given flock config to break the circular dependencies identified in the graph.

In some embodiments, a user can request that a new region (e.g., target region 2114) be built. This can involve bootstrapping resources corresponding to a variety of services. In some embodiments, target region 2114 may not be communicatively available (and/or secure) at a time at which the region build request is initiated. Rather than delay bootstrapping until such time as target region 2114 is available and configured to perform bootstrapping operations, CIOS 2102 may initiate the region build using a virtual bootstrap environment 2116. Virtual bootstrap environment (ViBE) 2116 may be an overlay network that is hosted by host region 2103 (a preexisting region that has previously been configured with a core set of services including ODO 2118, an example of ODO 102 of FIG. 1, and which is communicatively available and secure). MFO 2106 can leverage resources of the host region 2103 to bootstrap resources to the ViBE 2116 (generally referred to as "building the ViBE"). By way of example, MFO 2106 can provide instructions through CIOS Central 2108 that cause an instance of CIOS Regional 2110 within a host region (e.g., host region 2103) to bootstrap another instance of CIOS Regional within the ViBE 2116. Once the CIOS Regional within the ViBE is available for processing, bootstrapping the services for the target region 2114 can continue within the VIBE 2116. When target region 2114 is available to perform bootstrapping operations, the previously bootstrapped services within ViBE 2116 may be migrated to target region 2114. Utilizing these techniques, CIOS 2102 can greatly improve the speed at which a region is built by drastically reducing the need for any manual input and/or configuration to be provided.

ODO 2118 may be configured to perform the operations discussed in connection with FIGS. 1-11 for bootstrapping (e.g., provisioning and deploying) various resources to the target region 2114. In some embodiments, ODO 2118 may utilize static pool 2120 and dynamic pool 2122 in the manner described in connection with FIG. 1 to deploy resources across a variety of hosting environments. In some embodiments, the target region 2114 may be a Dedicated Region at Customer Cloud (DRCC) or Private Label Cloud (PLC). In some embodiments, the techniques described herein enable resources of the cloud computing environment to be migrated from the static pool 2120 and heavyweight resources (e.g., virtual machines) to a dynamic pool that utilizes lightweight resources (e.g., micro-VMs, Kubernetes pods, etc.). Utilizing the dynamic pool (e.g., for the service enclave) may drastically reduce the footprint needed for core services enabling these techniques to be employed on limited capacity environments such as a DRCC or PLC.

Figure 22:
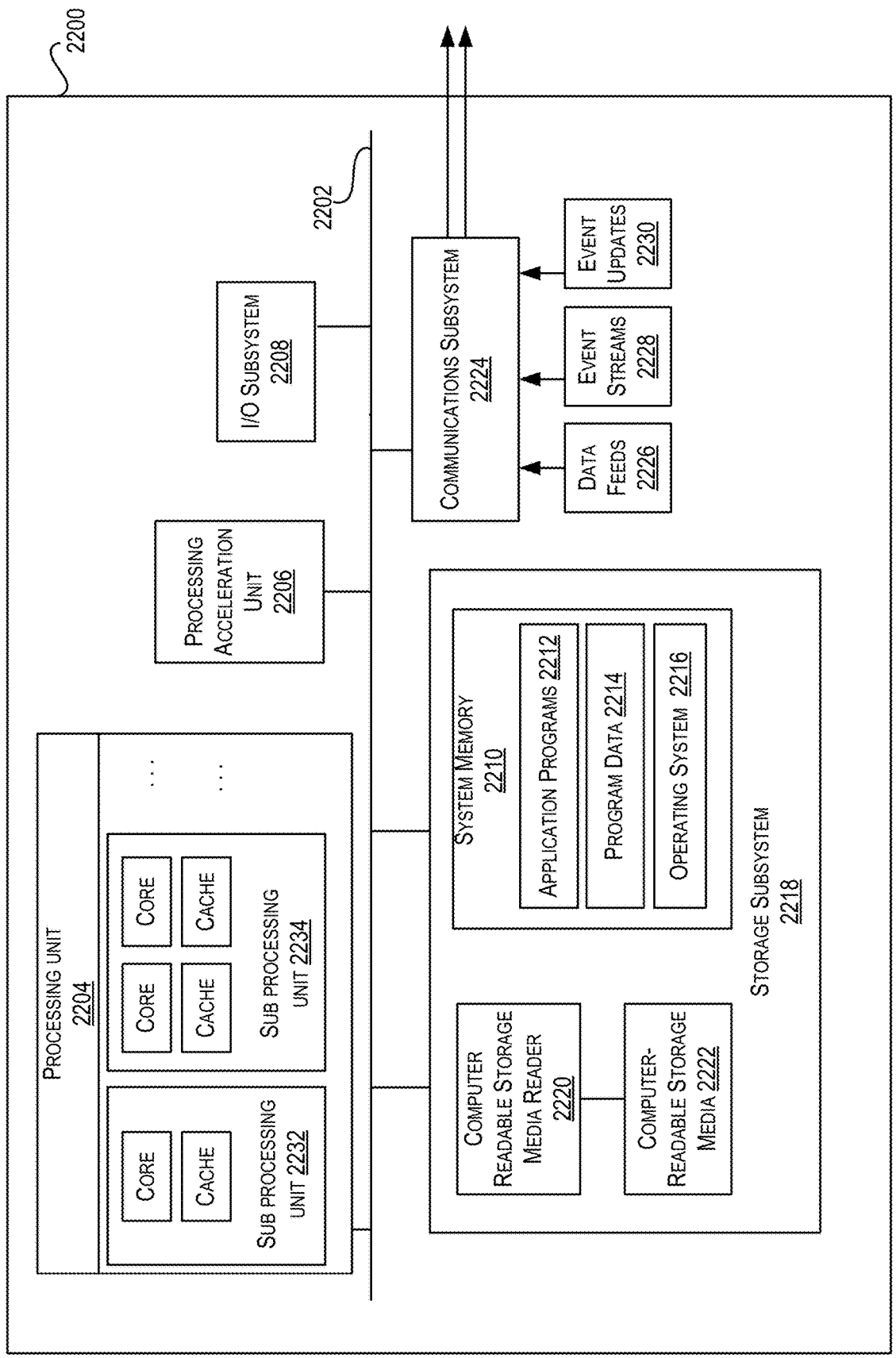
FIG. 22 is a block diagram illustrating an example computer system, according to at least one embodiment.

FIG. 22 illustrates an example computer system 2200, in which various embodiments may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random-access memory (SRAM) or dynamic random-access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 2218 may also provide a tangible computer-readable storage medium for storing the basic programming and data constructs that provide the functionality of some embodiments. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present disclosure.

Storage subsystem 2200 may also include a computer-readable storage media reader 2220 that can further be connected to computer-readable storage media 2222. Together and optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, by a container runtime interface of a container orchestration system, a request to deploy a container to a computing node, the request being received from a deployment orchestrator that is configured to provide virtual-machine-based virtualization and container-based virtualization within a cloud computing environment;
   allocating, by the container networking interface of the container orchestration system, an Internet Protocol (IP) address for the container;
   selecting, by the container runtime interface, a container runtime from a first container runtime or a second container runtime based at least in part on determining an isolation type for the container, the first container runtime being selected as the container runtime based on determining a first isolation type for the container, the second container runtime being selected as the container runtime based on determining a second isolation type for the container; and
   executing, by the container runtime, the container, the container being isolated within a micro-virtual machine when the first container runtime is selected as the container runtime, the container being isolated based at least in part on a namespace when the second container runtime is selected as the container runtime.

2. The computer-implemented method of claim 1, further comprising configuring, by the container networking interface, network connections associated with the container.

3. The computer-implemented method of claim 1, wherein the second container runtime, when selected, isolates the container in a first network namespace from one or more containers that are associated with a second network namespace.

4. The computer-implemented method of claim 1, further comprising:
   generating, by the container networking interface, a network namespace for the container; and
   inserting, by the container networking interface, the IP address in the network namespace for the container.

5. The computer-implemented method of claim 1, wherein the container is a first container of a service that is implemented by a plurality of containers, and wherein the container networking interface assigns the IP address to each of the plurality of containers that implement the service.

6. The computer-implemented method of claim 5, wherein the container networking interface manages respective endpoints within the plurality of containers, and wherein the plurality of containers are communicatively connected with one another through the respective endpoints.

7. The computer-implemented method of claim 1, wherein the container is a first container, and wherein the container orchestration system further comprises a container storage interface that provides, to a second container managed by the container orchestration system, access to workload data associated with the first container.

8. A container orchestration system comprising one or more memories storing computer-executable instructions that, when executed by one or more processors of the container orchestration system, cause the one or more processors to:
receive, by a container runtime interface of the container orchestration system, a request to deploy a container to a computing node, the request being received from a deployment orchestrator that is configured to provide virtual-machine-based virtualization and container-based virtualization within a cloud computing environment;
allocate, by a container networking interface of the container orchestration system, an Internet Protocol (IP) address for the container;
select, by the container runtime interface, a container runtime from a first container runtime or a second container runtime based at least in part on determining an isolation type for the container, the first container runtime being selected as the container runtime based on determining a first isolation type for the container, the second container runtime being selected as the container runtime based on determining a second isolation type for the container; and
execute, by the container runtime, the container, the container being isolated within a micro-virtual machine when the first container runtime is selected as the container runtime, the container being isolated based at least in part on a namespace when the second container runtime is selected as the container runtime.

9. The container orchestration system of claim 8, wherein executing the computer-executable instructions further causes the one or more processors to configure, by the container networking interface, network connections associated with the container.

10. The container orchestration system of claim 8, wherein the second container runtime, when selected, isolates the container in a first network namespace from one or more containers that are associated with a second network namespace.

11. The container orchestration system of claim 8, wherein executing the computer-executable instructions further causes the one or more processors to:
generate, by the container networking interface, a network namespace for the container; and
insert, by the container networking interface, the IP address in the network namespace for the container.

12. The container orchestration system of claim 8, wherein the container is a first container of a service that is implemented by a plurality of containers, and wherein the container networking interface assigns the IP address to each of the plurality of containers that implement the service.

13. The container orchestration system of claim 12, wherein the container networking interface manages respective endpoints within the plurality of containers, and wherein the plurality of containers are communicatively connected with one another through the respective endpoints.

14. The container orchestration system of claim 8, wherein the container is a first container, and wherein the container orchestration system further comprises a container storage interface that provides, to a second container managed by the container orchestration system, access to workload data associated with the first container.

15. A non-transitory computer readable medium storing computer-executable instructions that, when executed by one or more processors, cause the one or more processors to:
receive, by a container runtime interface of a container orchestration system, a request to deploy a container to a computing node, the request being received from a deployment orchestrator that is configured to provide virtual-machine-based virtualization and container-based virtualization within a cloud computing environment;
allocate, by a container networking interface of the container orchestration system, an Internet Protocol (IP) address for the container;
select, by the container runtime interface, a container runtime from a first container runtime or a second container runtime based at least in part on determining an isolation type for the container, the first container runtime being selected as the container runtime based on determining a first isolation type for the container, the second container runtime being selected as the container runtime based on determining a second isolation type for the container; and
execute, by the container runtime, the container, the container being isolated within a micro-virtual machine when the first container runtime is selected as the container runtime, the container being isolated based at least in part on a namespace when the second container runtime is selected as the container runtime.

16. The non-transitory computer readable medium of claim 15, wherein executing the computer-executable instructions further causes the one or more processors to configure, by the container networking interface, network connections associated with the container.

17. The non-transitory computer readable medium of claim 15, wherein the second container runtime, when selected, isolates the container in a first network namespace from one or more containers that are associated with a second network namespace.

18. The non-transitory computer readable medium of claim 15, wherein executing the computer-executable instructions further causes the one or more processors to:
generate, by the container networking interface, a network namespace for the container; and
insert, by the container networking interface, the IP address in the network namespace for the container.

19. The non-transitory computer readable medium of claim 15, wherein the container is a first container of a service that is implemented by a plurality of containers, and wherein the container networking interface assigns the IP address to each of the plurality of containers that implement the service, wherein the container networking interface manages respective endpoints within the plurality of containers, and wherein the plurality of containers are communicatively connected with one another through the respective endpoints.

20. The non-transitory computer readable medium of claim 15, wherein the container is a first container, and wherein the container orchestration system further comprises a container storage interface that provides, to a second container managed by the container orchestration system, access to workload data associated with the first container.

* * * * *

UNITED STATES PATENT AND TRADEMARK OFFICE
CERTIFICATE OF CORRECTION

Page 1 of 1

PATENT NO. : 12,267,253 B2
APPLICATION NO. : 18/672907
DATED : April 1, 2025
INVENTOR(S) : Lee et al.

It is certified that error appears in the above-identified patent and that said Letters Patent is hereby corrected as shown below:

On the Title Page

Item [57], Line 14, delete "pane" and insert -- plane --, therefor.

In the Specification

In Column 8, Line 46, delete "ODO," and insert -- ODO. --, therefor.

In Column 21, Line 47, delete "'strartupProbe'" and insert -- 'startupProbe' --, therefor.

In Column 21, Line 67, delete "In some embodiments,".

In Column 23, Line 39, delete "decision" and insert -- decision. --, therefor.

In Column 31, Line 54, delete "disktype "NVMe"" and insert -- disktype="NVMe" --, therefor.

In Column 36, Line 34, delete "FIGS." and insert -- FIG. --, therefor.

In Column 38, Line 23, delete "common)" and insert -- conmon) --, therefor.

In Column 40, Line 67, delete "1504" and insert -- 1504. --, therefor.

In Column 42, Line 37, delete "FIGS. 1) and 2)" and insert -- FIG. 1 and --, therefor.

In Column 42, Lines 44-45, delete "In some embodiments,".

In Column 42, Line 66, delete "pane" and insert -- plane --, therefor.

In Column 48, Line 32, delete "VIBE" and insert -- ViBE --, therefor.

Signed and Sealed this
First Day of July, 2025

Coke Morgan Stewart
*Acting Director of the United States Patent and Trademark Office*